US011376979B2

(12) United States Patent
Chakraborty et al.

(10) Patent No.: US 11,376,979 B2
(45) Date of Patent: Jul. 5, 2022

(54) SYSTEM AND METHOD FOR CHARGING A NETWORK OF MOBILE BATTERY-OPERATED UNITS ON-THE-GO

(71) Applicant: UNIVERSITY OF FLORIDA RESEARCH FOUNDATION, INCORPORATED, Gainesville, FL (US)

(72) Inventors: Prabuddha Chakraborty, Gainesville, FL (US); Swarup Bhunia, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 396 days.

(21) Appl. No.: 16/782,531

(22) Filed: Feb. 5, 2020

(65) Prior Publication Data

US 2020/0262305 A1 Aug. 20, 2020

Related U.S. Application Data

(60) Provisional application No. 62/807,909, filed on Feb. 20, 2019.

(51) Int. Cl.
*B60L 53/36* (2019.01)
*B60L 53/66* (2019.01)
(Continued)

(52) U.S. Cl.
CPC ............... *B60L 53/36* (2019.02); *B60L 53/18* (2019.02); *B60L 53/57* (2019.02); *B60L 53/665* (2019.02); *B60L 58/12* (2019.02);
*G01C 21/3438* (2013.01); *G06Q 10/047* (2013.01); *G06Q 20/145* (2013.01); *G06Q 50/06* (2013.01);
(Continued)

(58) Field of Classification Search
CPC .......... B60L 53/68; B60L 53/36; B60L 53/57; B60L 58/12; B60L 53/665; B60L 53/18; B60L 2200/10; B60L 2200/32; B60L 2240/12; G01C 21/34; G01C 21/3438; G06Q 10/04; G06Q 20/14; G06Q 10/047; G06Q 20/145; G06Q 50/06; B60K 6/28;
(Continued)

(56) References Cited

U.S. PATENT DOCUMENTS 10,879,741 B2 * 12/2020 Soryal .................... H04W 4/029
2020/0006988 A1 * 1/2020 Leabman ................. H05B 3/34

\* cited by examiner

*Primary Examiner* — Robert L Deberadinis
(74) *Attorney, Agent, or Firm* — Alston & Bird LLP

(57) ABSTRACT

Apparatus, systems, and methods described herein relate generally to on-the-go entity-to-entity charging in transportation systems. A method can include determining charge levels, current positions, and transport speeds for an electric vehicle (EV), identifying one or more EVs in need of charging, and mobilizing a nearby EV for on-the-go peer-to-peer charging. A processor, with a memory including computer program code, can be configured to receive current charge level data for mobile battery-powered entities, identify one or more EVs to be charged and one or more other EVs that have excess charge to transfer, and send charging instructions to the EVs. A routing and charge transaction scheduling algorithm can be used to optimize the route of one or more battery-powered entities and to schedule charge transactions between EVs and/or a charging entity.

20 Claims, 31 Drawing Sheets

(51) Int. Cl.
*G01C 21/34* (2006.01)
*G06Q 10/04* (2012.01)
*G06Q 20/14* (2012.01)
*B60L 53/57* (2019.01)
*B60L 53/18* (2019.01)
*G06Q 50/06* (2012.01)
*B60L 58/12* (2019.01)
*B60K 6/28* (2007.10)

(52) U.S. Cl.
CPC .............. *B60K 6/28* (2013.01); *B60L 2200/10* (2013.01); *B60L 2200/32* (2013.01); *B60L 2240/12* (2013.01); *B60Y 2200/91* (2013.01); *B60Y 2200/92* (2013.01); *B60Y 2300/91* (2013.01)

(58) Field of Classification Search
CPC ............ B60Y 2200/91; B60Y 2200/92; B60Y 2300/91
See application file for complete search history.

SYSTEM AND METHOD FOR CHARGING A NETWORK OF MOBILE BATTERY-OPERATED UNITS ON-THE-GO

CROSS-REFERENCE TO RELATED APPLICATIONS

This application claims priority to and the benefit of U.S. Provisional Application No. 62/807,909, filed Feb. 20, 2019 and entitled "System And Method For Charging Network Of Mobile Battery-Operated Units On-The-Go," the entire contents of which is hereby incorporated herein by reference in its entirety for all purposes.

BACKGROUND

As transportation solutions are further developed that rely at least in part on mobile battery power, there remain many barriers to large-scale implementation of at least partially battery-powered entities. This application presents various solutions to some of the barriers, in response to a long-felt need in the industry.

SUMMARY

Apparatus, systems, and methods described herein relate generally to entity-to-entity charging of mobile battery-powered entities. For example, according to a first embodiment, a method can be provided that comprises determining that a mobile battery-powered entity is within a pre-determined proximity of another mobile battery-powered entity, determining a charge level and a transport speed of the mobile battery-powered entity, determining the charge level and the transport speed of the other mobile battery-powered entity, in an instance in which the charge level of the mobile battery-powered entity is below a pre-determined (e.g., configurable) charge level and less than the charge level of the other mobile battery-powered entity, causing the mobile battery-powered entity to receive an electric charge from the other mobile battery-powered entity, and in an instance in which the charge level of the other mobile battery-powered entity is below the pre-determined (e.g., configurable) charge level and less than the charge level of the other mobile battery-powered entity, causing the other mobile battery-powered entity to receive the electric charge from the mobile battery-powered entity.

According to a second embodiment, an apparatus can be provided that comprises at least one processor and at least one memory including computer program code, the at least one memory and the computer program code configured to, with the processor, cause the apparatus to at least receive current charge level data for a plurality of mobile battery-powered entities, determine, based on the current charge level data, one or more mobile battery-powered entities of the plurality of mobile battery-powered entities to be charged, determine, based on the current charge level data, one or more other mobile battery-powered entities of the plurality of mobile battery-powered entities to be caused to charge the one or more mobile battery-powered entities; and cause, while the one or more mobile battery-powered entities and are being transported within a pre-determined proximity of the one or more other mobile battery-powered entities, the one or more other mobile battery-powered entities to charge the one or more mobile battery-powered entities.

According to a third embodiment, a method can be provided that comprises receiving current charge level data for a plurality of mobile battery-powered entities, determining, based on the current charge level data, one or more mobile battery-powered entities of the plurality of mobile battery-powered entities to be charged, determining, based on the current charge level data, one or more other mobile battery-powered entities of the plurality of mobile battery-powered entities to be caused to charge the one or more mobile battery-powered entities, and causing, while the one or more mobile battery-powered entities and are being transported within a pre-determined proximity of the one or more other mobile battery-powered entities, the one or more other mobile battery-powered entities to charge the one or more mobile battery-powered entities.

According to a fourth embodiment, a method can be provided that comprises wirelessly transmitting, from a mobile battery-powered entity while the mobile battery-powered entity is being transported through a predefined area, a current charge level to a computing device, receiving an indication from the computing device as to whether the mobile battery-powered entity is to charge another mobile battery-powered entity, to be charged by the other mobile battery-powered entity, or neither charge nor be charged by the other mobile battery-powered entity, and in an instance in which the indication received indicates that the mobile battery-powered entity is either to charge or be charged by the other mobile battery-powered entity: determining a geospatial location and a transport speed of the mobile battery-powered entity, receiving the geospatial location and the transport speed of the other mobile battery-powered entity, causing the mobile battery-powered entity to speed lock with the other mobile battery-powered entity based on the geospatial location and the transport speed of the mobile battery-powered entity and the other mobile battery-powered entity, in an instance in which the indication received indicates that the mobile battery-powered entity is to charge the other mobile battery-powered entity, causing the mobile battery-powered entity to transmit a charge to the other mobile battery-powered entity, and in an instance in which the indication received indicates that the mobile battery-powered entity is to be charged by the other mobile battery-powered entity, causing the mobile battery-powered entity to receive the charge from the other mobile battery-powered entity.

According to a fifth embodiment, a method can be provided that comprises determining a charge level, a current position, and a transport speed for a mobile battery-powered entity in a transportation network; determining the charge level, the current position, and the transport speed for another mobile battery-powered entity in the mobile charging network; and, in an instance in which the charge level of the mobile battery-powered entity is below a pre-determined charge level and less than the charge level of the other mobile battery-powered entity, causing the mobile battery-powered entity to receive an electric charge from the other mobile battery-powered entity while the mobile battery-powered entity and the other mobile battery-powered entity continue traveling through the transportation network. In some embodiments, the method can further comprise determining that the mobile battery-powered entity is within a pre-determined proximity of the other mobile battery-powered entity. In some embodiments, the method can further comprise, in an instance in which the charge level of the mobile battery-powered entity is below a pre-determined charge level and less than the charge level of the other mobile battery-powered entity, transmitting route instructions and transport speed instructions to the other mobile battery-powered entity; determining whether the other mobile battery-powered entity has complied with the route instructions and the transport speed instructions; and if the other mobile battery-powered entity has complied with the route instructions and the transport speed instructions, transmitting charge transfer instructions to the other mobile battery-powered entity. In some embodiments, the method can further comprise causing the other mobile battery-powered entity to transfer an electric charge to the mobile battery-powered entity according to the charge transfer instructions. In some embodiments, the charge transfer instructions can comprise one or more of the current position of the mobile battery-powered entity, a current charge level for the mobile battery-powered entity, a charge capacity for the mobile battery-powered entity, a charge transfer rate capacity for the mobile battery-powered entity, charging cable configurational information, transport speed information for the mobile battery-powered entity, pre-determined route information for the mobile battery-powered entity, a destination for the mobile battery-powered entity, vehicle identification information for the mobile battery-powered entity, or charge transfer payment information for the mobile battery-powered entity. In some embodiments, the method can further comprise, in an instance in which the charge level of the other mobile battery-powered entity is below the pre-determined charge level and less than the charge level of the other mobile battery-powered entity, causing the other mobile battery-powered entity to receive the electric charge from the mobile battery-powered entity. In some embodiments, the method can further comprise, in an instance in which the charge levels of the mobile battery-powered entity and the other mobile battery-powered entity are both below the pre-determined charge level, causing deployment of at least one charging vehicle or at mobile charging station. In some embodiments, the mobile battery-powered entity and the other mobile battery-powered entity are selected from among battery-powered terrestrial vehicles, battery-powered aerial vehicles, battery-powered aquatic vehicles, charge relay vehicles, and charge storage vehicles. In some embodiments, the method can further comprise updating a charge distribution map of the transportation network to include one or more of the charge level, current position, and transport speed for the mobile battery-powered entity and the other mobile battery-powered entity.

According to a sixth embodiment, a method can be provided that comprises receiving current position information and current charge level data for a plurality of mobile battery-powered entities; determining, based on the current position information and the current charge level data, one or more mobile battery-powered entities of the plurality of mobile battery-powered entities to be charged; and determining, based on the current charge level data, one or more other mobile battery-powered entities of the plurality of mobile battery-powered entities to transfer charge to the one or more mobile battery-powered entities. In some embodiments, the method can further comprise determining whether the one or more mobile battery-powered entities are within a pre-determined proximity of corresponding ones of the one or more other mobile battery-powered entities. In some embodiments, the method can further comprise, in an instance in which the one or more mobile battery-powered entities are within the pre-determined proximity of corresponding ones of the one or more other mobile battery-powered entities, transmitting route instructions and transport speed instructions to the one or more other mobile battery-powered entities; determining whether the one or more other mobile battery-powered entities have complied with the route instructions and the transport speed instructions; and if the one or more other mobile battery-powered entities have complied with the route instructions and the transport speed instructions, transmitting charge transfer instructions to the one or more other mobile battery-powered entities. In some embodiments, the method can further comprise causing the one or more other mobile battery-powered entities to transfer an electric charge to a corresponding one of the one or more mobile battery-powered entities according to the charge transfer instructions. In some embodiments, the charge transfer instructions comprise one or more of the current position of the mobile battery-powered entity, a current charge level for the mobile battery-powered entity, a charge capacity for the mobile battery-powered entity, a charge transfer rate capacity for the mobile battery-powered entity, charging cable configurational information, transport speed information for the mobile battery-powered entity, pre-determined route information for the mobile battery-powered entity, a destination for the mobile battery-powered entity, vehicle identification information for the mobile battery-powered entity, or charge transfer payment information for the mobile battery-powered entity. In some embodiments, the method can further comprise, in an instance in which the charge levels of the mobile battery-powered entity and the other mobile battery-powered entity are both below the pre-determined charge level, causing deployment of at least one charging vehicle or at mobile charging station. In some embodiments, the plurality of mobile battery-powered entities are selected from among battery-powered terrestrial vehicles, battery-powered aerial vehicles, battery-powered aquatic vehicles, charge relay vehicles, and charge storage vehicles. In some embodiments, the method can further comprise updating a charge distribution map of the transportation network to include one or more of the charge level, current position, and transport speed for the mobile battery-powered entity and the other mobile battery-powered entity.

According to a seventh embodiment, an apparatus is provided that comprises at least one processor and at least one memory including computer program code, the at least one memory and the computer program code configured to, with the processor, cause the apparatus to at least: receive current position information and current charge level data for a plurality of mobile battery-powered entities; determine, based on the current position information and the current charge level data, one or more mobile battery-powered entities of the plurality of mobile battery-powered entities to be charged; and determine, based on the current charge level data, one or more other mobile battery-powered entities of the plurality of mobile battery-powered entities to transfer charge to the one or more mobile battery-powered entities. In some embodiments, the at least one memory and the computer program code are configured to, with the processor, cause the apparatus to at least: determine whether the one or more mobile battery-powered entities are within a pre-determined proximity of corresponding ones of the one or more other mobile battery-powered entities; in an instance in which the one or more mobile battery-powered entities are within the pre-determined proximity of corresponding ones of the one or more other mobile battery-powered entities, transmit route instructions and transport speed instructions to the one or more other mobile battery-powered entities; determine whether the one or more other mobile battery-powered entities have complied with the route instructions and the transport speed instructions; and, if the one or more other mobile battery-powered entities have complied with the route instructions and the transport speed instructions, transmit charge transfer instructions to the one or more other mobile battery-powered entities. In some embodiments, the at least one memory and the computer program code are configured to, with the processor, cause the apparatus to at least: cause the one or more other mobile battery-powered entities to transfer an electric charge to a corresponding one of the one or more mobile battery-powered entities according to the charge transfer instructions, said charge transfer instructions comprising one or more of the current position of the mobile battery-powered entity, a current charge level for the mobile battery-powered entity, a charge capacity for the mobile battery-powered entity, a charge transfer rate capacity for the mobile battery-powered entity, charging cable configurational information, transport speed information for the mobile battery-powered entity, pre-determined route information for the mobile battery-powered entity, a destination for the mobile battery-powered entity, vehicle identification information for the mobile battery-powered entity, or charge transfer payment information for the mobile battery-powered entity.

According to an eight embodiment, a method is provided for distributing charge within a system of battery-powered vehicles. In some embodiments, the method can comprise receiving current position information, destination information, and current charge level data for a plurality of mobile battery-powered entities; and determining, based upon at least the current position information, the destination information, and the current charge level data, route instructions, speed instructions, and charge transfer instructions for each of the plurality of mobile battery-powered entities. In some embodiments, the method can further comprise generating, based upon at least the current position information, the destination information, and the current charge level data, for the plurality of mobile battery-powered entities, a charge distribution map of the system. In some embodiments, the method can further comprise identifying, based upon at least the optimal route and charge transfer instructions for each of the plurality of mobile battery-powered entities and the current charge level data for the plurality of mobile battery-powered entities, one or more charge deficient regions within the system of battery-powered vehicle; and, in an instance in which one or more charge deficient regions exist, identifying one or more charging vehicles or mobile charging stations to deploy within the system. In some embodiments, the method can further comprise transmitting the route instructions, speed instructions, and charge transfer instructions to one or more mobile battery-powered entities of the plurality of mobile battery-powered entities; determining whether the one or more mobile battery-powered entities have complied with the route instructions and the speed instructions; and if the one or more mobile battery-powered entities have complied with the route instructions and the speed instructions, transmitting the charge transfer instructions to the one or more mobile battery-powered entities. In some embodiments, the method can further comprise causing the one or more mobile battery-powered entities to transfer an electric charge to a corresponding one or more other mobile battery-powered entities according to the charge transfer instructions. In some embodiments, the charge transfer instructions can comprise one or more of a current position of the corresponding mobile battery-powered entity, a current charge level for the corresponding mobile battery-powered entity, a charge capacity for the corresponding mobile battery-powered entity, a charge transfer rate capacity for the corresponding mobile battery-powered entity, charging cable configurational information for the corresponding mobile battery-powered entity, transport speed information for the corresponding mobile battery-powered entity, pre-determined route information for the corresponding mobile battery-powered entity, a destination for the corresponding mobile battery-powered entity, vehicle identification information for the corresponding mobile battery-powered entity, or charge transfer payment information for the corresponding mobile battery-powered entity. In some embodiments, the plurality of mobile battery-powered entities can be selected from among battery-powered terrestrial vehicles, battery-powered aerial vehicles, battery-powered aquatic vehicles, charge relay vehicles, and charge storage vehicles. In some embodiments, the method can further comprise receiving, from the plurality of mobile battery-powered entities and the one or more charging vehicles or mobile charging stations, updated current position information, updated destination information, and updated current charge level data; and updating the charge distribution map of the system to include one or more of an updated charge level, an updated current position, and an updated speed for the plurality of mobile battery-powered entities and the one or more charge vehicles or mobile charging stations.

According to a ninth embodiment, an apparatus can be provided for charge distribution within a system of mobile battery-powered entities. In some embodiments, the apparatus can comprise at least one processor and at least one memory including computer program code. In some embodiments, the at least one memory and the computer program code can be configured to, with the processor, cause the apparatus to at least: receive current position information, destination information, and current charge level data for a plurality of mobile battery-powered entities and one or more mobile charging stations; generate, based upon at least the current position information, the destination information, and the current charge level data, for the plurality of mobile battery-powered entities and the one or more mobile charging stations, a charge distribution map; and determine, based upon at least the charge distribution map, route instructions, speed instructions, and charge transfer instructions for one or more mobile battery-powered entities of the plurality of mobile battery-powered entities. In some embodiments, the at least one memory and the computer program code are configured to, with the processor, cause the apparatus to at least: transmit the route instructions and speed instructions to the one or more mobile battery-powered entities; determine whether the one or more mobile battery-powered entities have complied with the route instructions and the speed instructions; and, in an instance in which the one or more mobile battery-powered entities have complied with the route instructions and the speed instructions, transmit the charge transfer instructions to the one or more mobile battery-powered entities. In some embodiments, the at least one memory and the computer program code are configured to, with the processor, cause the apparatus to at least: identify, based upon at least the charge distribution map, one or more charge deficient regions within the charge distribution map; and, in an instance in which one or more charge deficient regions exist, transmit deployment instructions to the one or more charging vehicles or mobile charging stations.

BRIEF DESCRIPTION OF THE DRAWINGS

The accompanying drawings, which constitute a part of the description, illustrate embodiments of the present invention and, together with the description thereof, serve to explain the principles of the present invention.

DETAILED DESCRIPTION

Figure 1:
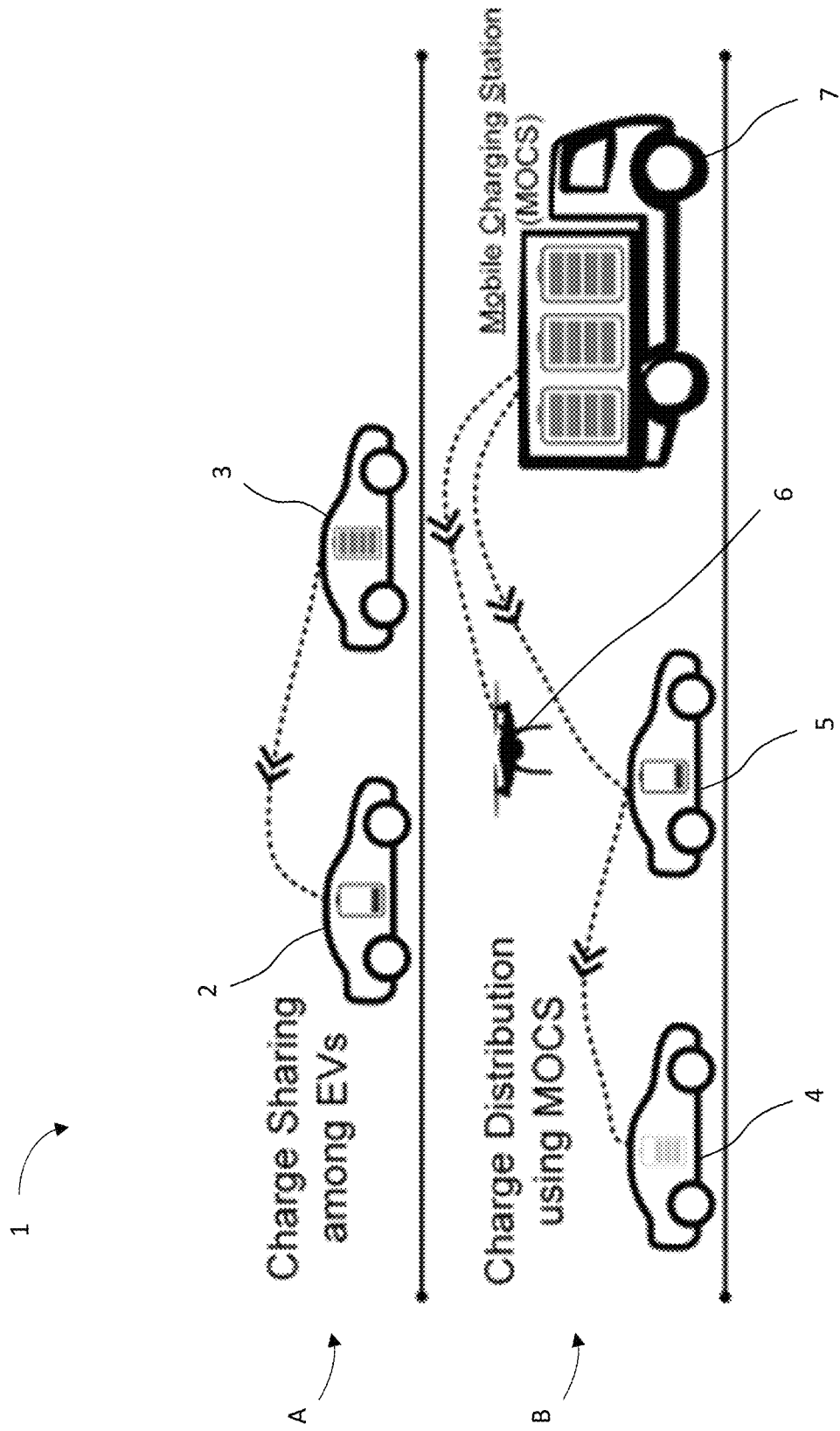
FIG. 1 provides an example approach for on-the-go peer-to-peer charging of vehicles along a roadway, according to some embodiments discussed herein.

Electric vehicles have existed for a while but have never enjoyed mainstream adoption. Now, with a global desire to reduce the carbon footprint of transportation systems and many leading auto manufacturers entering the electric vehicle (EV) space, EVs have become more appealing and affordable. Nevertheless, the adoption of EVs remains slow, mainly due to consumer concerns regarding battery life, battery range, and limited access to charging stations. Inefficient charging cycles or complete discharge of a battery reduces its life, making it imprudent to travel the full range provided by the battery without any recharging in the middle. Even though major cities in developed countries have charging stations, the amount is still unable to support a large EV population. Charging stations in remote regions are few and far between. Most of the existing charging stations are Level-2 (220V) which typically require long waiting periods to charge a vehicle. Level-3 charging stations or DC fast charging (DCFC) (440V) stations are a faster alternative; however, they are limited and very expensive to build. With these concerns in mind, research has been conducted into several potential solutions, including innovations in EV battery technologies, but concluded that the battery range and charging time remains the most critical barrier, novel solutions like charging via solar-powered roads, however these approaches are not applicable, efficient, cost-effective, and/or politically doable in all countries, regions, or geographies.

Current methods for charging a battery for a battery-powered entity (e.g., vehicle, drone, vessel, robotic system, etc.) typically require that the battery-powered vehicle be parked in a fixed location during charging, and the user of the battery-powered entity must typically initiate charging of the battery-powered entity manually. This typically requires a great deal of time for charging and reflects a large inconvenience to the user of the battery-powered entity. As a further example of current hurdles to large-scale implementation, there are currently a limited number of charging ports at fixed charging locations for battery-powered entities, meaning that use of the charging ports typically operates on a first come, first serve basis. In other words, a first battery-powered entities having a battery at 90% charge capacity might be connected by the user for any reason before a user of a second battery-powered entities having a battery at 20% charge capacity without any priority given to the battery-powered entities having a lower charge capacity. Thus, there is currently no way to determine at a system level which battery-powered entities should be charged and at which charging location. As an additional example of current hurdles to large-scale implementation, the system of battery-powered entities currently includes a variety of different entity types, however none of the various entity types can be charged at the same fixed charging location, meaning redundant charging stations might be necessary at many locations to accommodate the various entity types. Therefore, there is a long-felt need in the industry for a system, method, and apparatus for charging battery-powered entities without relying on fixed charging stations, considering the need for and optimization of charge power to battery-powered entity within complex vehicle networks, and enabling either homogeneous or heterogeneous charging of battery-powered entities while they are "on-the-go," being transported through the system, in motion, in use, or the like.

As such, according to the current systems and approaches for charging EVs, EVs have a range that is limited by battery capacity and charge density, among other factors, which can restrict the effectiveness and suitability of EVs for long-distance driving. Even with enough charging stations, the charging stations are properly located along a driver's intended route, and rapid charging is used at every charging station along a driver's intended route, the travel time is impacted due to frequent, long halts for charging. Further, while the driver's intended route may have sufficient number of charging stations, all perfectly distributed and located along the driver's intended route, the driver is still forced to maintain their intended route and may not deviate unless they previously plan their deviation from the intended route to ensure there are sufficient charging stations located along the new route which deviates from the intended route.

Also, most of the modern high-end EVs are using Lithium-ion batteries, for which complete discharging and charging, or inefficient charging cycles can cause the Lithium-ion batteries to age at an accelerated rate. Hence, a long-distance drive without recharging the battery is undesirable for EVs. While improving the battery capacity is undoubtedly helpful, it could significantly increase the price of the EV. Besides, increasing battery capacity also may not solve the core problem of having to stop at a designated station to recharge.

As research continues to progress with regard to lithium-ion batteries that have a higher charge capacity or charge density, among other characteristics, the price per kilowatt-hour (kWh) for lithium-ion batteries is being reduced, but at a comparatively slow rate, making it difficult to increase the battery capacity of EVs without a drastic price increase. In addition, even drastically increasing the battery capacity of EVs will likely only solve some of the problem and may well only be possible for very high-end EVs due to the elevated cost of such advanced battery technologies. Even high-end EVs may have a maximum range of 300 to 370 miles but suffer from high charging times. Even with a 220V charging station, it often takes about 10 hours for a full charge. Although 440V stations may reduce the charging time, the amount of charging stations expected to be required to support a large EV fleet would be enormous and costly.

Currently, there are only limited stationary charging stations, even in urban areas of the wealthiest countries in the World. The overall number of stationary charging stations are few compared to refueling stations for vehicles with internal combustion engines (ICEs) and mostly limited to urban areas. EVs, especially high-end EVs, will suffer long charging times are level-1 or level-2 charging stations.

A brute force solution to the battery range and charging problem could be to build a high concentration of very high speed (Level-3) charging stations to allow fast charging anywhere in the World. However, dense and uniformly placed Level-3 stations costing $100,000 each is not feasible. Furthermore, the local power grids must be able to handle the large amount of power that must be transferred in a short amount of time for these stations. Also, there are currently very few level-3 stations (a.k.a. DC Fast Charging [DCFC] stations), making it infeasible to sustain a big EV fleet. Furthermore, building a large number of DCFC stations to sustain a big EV fleet is financially infeasible as each charging unit costs between about $10,000 U.S. Dollars (USD) and about $40,000 USD. Even if such DCFC stations could be built and distributed across a geography, there will still be many instances in which a higher density of EV drivers are clustered around a limited supply of DCFC units at one or more local DCFC stations while other DCFC stations in other areas go relatively unused. The immobility of the fixed location charging system, coupled with the unpredictable and dynamic nature of EV traffic patterns in EV charging systems makes it impossible to quickly adjust charging supply to changes in charging demand.

Another possible solution is to charge vehicles on the fly directly from the roadway. However, in initial implementations in France and elsewhere, roadways fitted with solar panels and designed to charge vehicles on the fly were only able to produce about 80,000 kWh per year due at least in part to the inherent dependency on suitable weather. Converting every road in the world into an electric/solar road is a big financial undertaking, rendering the solution infeasible. Likewise, roadways for on-the-fly EV charging that are powered by the grid are inefficient as every portion of the roadway must be powered by costly and environmentally impacting grid electricity, which is dependent upon the regional or local grid mixture and the inherent environmental impacts and costs associated therewith.

As such, provided herein are apparatuses, systems, computer program products, and methods for entity-to-entity charging of mobile battery-powered entities. According to some embodiments, a method can comprise determining that a mobile battery-powered entity is within a pre-determined proximity of another mobile battery-powered entity, determining a charge level and a transport speed of the mobile battery-powered entity, determining the charge level and the transport speed of the other mobile battery-powered entity, in an instance in which the charge level of the mobile battery-powered entity is below a pre-determined (e.g., configurable) charge level and less than the charge level of the other mobile battery-powered entity, causing the mobile battery-powered entity to receive an electric charge from the other mobile battery-powered entity, and in an instance in which the charge level of the other mobile battery-powered entity is below the pre-determined (e.g., configurable) charge level and less than the charge level of the other mobile battery-powered entity, causing the other mobile battery-powered entity to receive the electric charge from the mobile battery-powered entity.

According to other embodiments, an apparatus can comprise at least one processor and at least one memory including computer program code, the at least one memory and the computer program code configured to, with the processor, cause the apparatus to at least receive current charge level data for a plurality of mobile battery-powered entities, determine, based on the current charge level data, one or more mobile battery-powered entities of the plurality of mobile battery-powered entities to be charged, determine, based on the current charge level data, one or more other mobile battery-powered entities of the plurality of mobile battery-powered entities to be caused to charge the one or more mobile battery-powered entities; and cause, while the one or more mobile battery-powered entities and are being transported within a pre-determined proximity of the one or more other mobile battery-powered entities, the one or more other mobile battery-powered entities to charge the one or more mobile battery-powered entities.

According to yet other embodiments, a method can comprise receiving current charge level data for a plurality of mobile battery-powered entities, determining, based on the current charge level data, one or more mobile battery-powered entities of the plurality of mobile battery-powered entities to be charged, determining, based on the current charge level data, one or more other mobile battery-powered entities of the plurality of mobile battery-powered entities to be caused to charge the one or more mobile battery-powered entities, and causing, while the one or more mobile battery-powered entities and are being transported within a pre-determined proximity of the one or more other mobile battery-powered entities, the one or more other mobile battery-powered entities to charge the one or more mobile battery-powered entities.

According to still other embodiments, a method can comprise wirelessly transmitting, from a mobile battery-powered entity while the mobile battery-powered entity is being transported through a predefined area, a current charge level to a computing device, receiving an indication from the computing device as to whether the mobile battery-powered entity is to charge another mobile battery-powered entity, to be charged by the other mobile battery-powered entity, or neither charge nor be charged by the other mobile battery-powered entity, and in an instance in which the indication received indicates that the mobile battery-powered entity is either to charge or be charged by the other mobile battery-powered entity: determining a geospatial location and a transport speed of the mobile battery-powered entity, receiving the geospatial location and the transport speed of the other mobile battery-powered entity, causing the mobile battery-powered entity to speed lock with the other mobile battery-powered entity based on the geospatial location and the transport speed of the mobile battery-powered entity and the other mobile battery-powered entity, in an instance in which the indication received indicates that the mobile battery-powered entity is to charge the other mobile battery-powered entity, causing the mobile battery-powered entity to transmit a charge to the other mobile battery-powered entity, and in an instance in which the indication received indicates that the mobile battery-powered entity is to be charged by the other mobile battery-powered entity, causing the mobile battery-powered entity to receive the charge from the other mobile battery-powered entity.

As used herein, the terms "data," "content," "information," and similar terms may be used interchangeably, according to some example embodiments of the present invention, to refer to data capable of being transmitted, received, operated on, displayed, and/or stored. Thus, use of any such terms should not be taken to limit the spirit and scope of the disclosure. Further, where a computing device is described herein to receive data from another computing device, it will be appreciated that the data may be received directly from the other computing device or may be received indirectly via one or more computing devices, such as, for example, one or more servers, relays, routers, network access points, base stations, and/or the like.

As used herein, the term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a floppy disk, a flexible disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used herein, the term "circuitry" refers to all of the following: (a) hardware-only circuit implementations (such as implementations in only analog and/or digital circuitry); (b) to combinations of circuits and computer program product(s) comprising software (and/or firmware instructions stored on one or more computer readable memories), such as (as applicable): (i) to a combination of processor(s) or (ii) to portions of processor(s)/software (including digital signal processor(s)), software, and memory(ies) that work together to cause an apparatus, such as a mobile phone or server, to perform various functions described herein); and (c) to circuits, such as, for example, a microprocessor(s) or a portion of a microprocessor(s), that require software or firmware for operation, even if the software or firmware is not physically present. This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, other network device, and/or other computing device.

As used herein, the term "mobile entity" refers to any entity, vehicle, device, apparatus, system, equipment, or the like that is capable of and configured to move during at least some of the course of normal use or operation of the same. The terms "entity," "battery-powered entity," "mobile entity," "mobile battery-powered entity," "vehicle," "equipment," "vessel," and similar terms may be used interchangeably, according to some example embodiments of the present invention, to refer to any means of transportation, conveyance, transference, shipment, or passage in the physical world.

As used herein, the term "battery-powered" refers to an entity, such as a mobile entity, that is partially or fully powered using a battery collocated with the entity. For purposes of the present disclosure, the battery collocated with and at least partially powering such entities are considered to be rechargeable, replaceable, or both.

As used herein, "on-the-go" refers to activities that occur while terrestrial entities, aerial entities, aquatic entities, relay entities, charging entities, and other entities within the system that participate in or facilitate a charge transaction are in motion.

As used herein, the term "charging network" refers to discrete, disperse entities (such as mobile entities, stationary entities, devices, telecommunications equipment, a power supply, and the like) configured to participate, under at least partial guidance or direction from a centralized computing device, in one or more charge transactions.

As used herein, the term "computing device" refers to a specialized, centralized device, network, or system, comprising at least a processor and a memory device including computer program code, and configured to provide guidance or direction related to the charge transactions carried out in one or more charging networks.

As used herein, the term "charge transaction" refers to an instance of communicating a replenishing supply of electric charge to a battery-powered entity within a charging network.

As used herein, the term "battery" refers to any electrochemical cell capable of storing charged particles (such as electrons and/or protons) and/or generating a current of electrons (such as from ion exchange due to a reduction/oxidation reaction in the battery). The terms "battery," "rechargeable-battery," "charge storage device," "electrochemical cell," "power pack," "battery stack," and similar terms may be used interchangeably, according to some example embodiments of the present invention, to refer to means of generating and/or storing electrical charge.

As used herein, the terms "about," "substantially," and "approximately" generally mean plus or minus 10% of the value stated, e.g., about 250 µm would include 225 µm to 275 µm, about 1,000 µm would include 900 µm to 1,100 µm.

In some embodiments, to allow for efficient charge sharing, a cloud-based control system is provided that comprises a charge transaction scheduling unit, a rerouting unit, and a database for storing information from EVs. In some embodiments, EVs can interact with each other and the control system. The control system can instruct some EVs to share charge with some other EVs, can reroute some specific EVs to bring charge providers and receivers together, can speed lock EVs to allow seamless charge sharing, and/or can detach a charge provider/receiver for overall network charge optimization. To allow the charge scheduler to operate, the EVs can send information to the control system periodically. By way of example only, EV-to-EV synchronization for charge sharing can be carried out by dividing a road system into sections having separate control systems doing the micromanagement, or management of different sections of the road system. In some embodiments, the system can use a global control system to manage the separate control systems that are managing the different sections of the road system, e.g., for handling hand-off of EVs between different sections, for managing charge sharing between different sections, and/or the like. In some embodiments, sharing charge between EVs can distribute the total charge in the network among all the entities.

In some embodiments, without an outside-the-network charge source, the network may experience a slow overall charge decay, which may increase the percentage of EV halts. As used herein, EV halts are instances in which an EV must stop in the road system, either at a charging station, to wait for another EV to arrive to provide a replenishing charge, or because the EV's charge has run out and further progress is not possible. In some embodiments, in an effort to reduce EV halts across the road system, one or more Mobile Charging Stations (MoCS) can be mobilized. In some embodiments, MoCS can introduce a high volume of charge into the network. In some embodiments, a MoCS can charge one or more EVs in a particular lane of traffic, can charge a depleted MoCS, can charge a stationary charging station, can find and provide charge to a halted EV that does not have any remaining charge, and/or the like.

In some embodiments, in order to identify charge deprived regions in the road system, the control unit can maintain a charge distribution map that is updated at a regular interval. In some embodiments, MoCS can be mobilized to charge deprived regions of the road system or a particular section of the road system, e.g., if the constraints of the algorithm permit.

Furthermore, described herein are scalable peer-to-peer vehicle charging solutions that are both low cost and easily to implement with minimal changes to the EVs. According to some embodiments, vehicles will share charge and sustain each other to reach their respective destinations. In some embodiments, a set of cloud-based schedulers may be used to automatically and dynamically monitor participants (e.g., EVs, etc.), decide which participants will be charge providers and receivers (or on standby), and/or control charging locally, regionally, or at a system level.

In some embodiments, based, for instance, on the charge transaction and subsequent reroute decisions, the cloud-based control system can instruct the EVs to carry out charge transfer operations. With this scheme in place, the total charge in the EV network may eventually spread out across all the EVs. However, even in a dynamic network with EVs entering and leaving, as observed through simulation, the total charge of the network will slowly deplete. As such, according to some embodiments, to keep the EVs in a state of perpetual motion, a system may include one or more Mobile Charging Stations (MoCS), to bring in a considerable amount of outside charge into the EV network. In some embodiments, EVs may then be responsible for the fine-grained distribution of the outside charge deposited by the MoCS. In some embodiments, a local, remote, distributed, cloud, or networked controller or the like may be used to make such charge scheduling decisions. In some embodiments, such a controller may employ a scheduling algorithm that controls the charge transactions and decides when and where to insert a new MoCS. In some embodiments, the effectiveness of a scheduling algorithm may be quantitatively analyzed using a Simulator of Urban Mobility (SUMO) traffic simulator. As demonstrated later in this disclosure, the scheduling algorithms presented herein are fast, scalable, and efficient in dealing with battery-related problems present in modern EVs. The hereinbelow described systems, methods, algorithms, processes, apparatuses, and computer programs address at least some of the long-felt needs in the EV industry by introducing solutions to address EV charging issues by implementing an on-the-go peer-to-peer EV charge sharing scheme, providing a complete framework to enable electric vehicles to share charges as guided by, e.g., a cloud-based control system, provide systems and methods which utilize mobile charging stations, which fit seamlessly into the described framework, to counteract system charge depletion and/or address local, intra-system charge depletion and charge imbalances, provide algorithms for charge transaction scheduling and MoCS insertion that may also control the EVs for optimal rerouting and charge sharing, and provide an approach for quantitatively analyzing the effectiveness of the described systems, algorithms, methods, apparatuses, and computer programs using extensive simulations in SUMO.

Embodiments described herein relate generally to methods, systems, apparatuses, and associated algorithms for autonomous on-the-go charging of a network of battery-operated mobile entities, including, but not limited to, autonomous/semi-autonomous/manual vehicles, aerial vehicles such as drones, equipment, aquatic vehicles, charging vehicles, relay vehicles, robots, and the like, while the mobile entities are being transported within the system. The system can comprise a plurality of battery-powered vehicles of one or more vehicle types, the plurality of battery-powered vehicles being in wireless communication with one or more computing devices, including one or more servers, one or more relays, one or more routers, one or more network access points, one or more base stations, one or more clouds, one or more processors, the Internet, other such apparatuses or combinations thereof. A computing device can be configured to receive and transmit signals, data, files, or the like from or to battery-powered vehicles. Signals sent and received by the computing devices may include signaling information in accordance with an air interface standard of an applicable cellular system, and/or any number of different wireless networking and/or communications techniques, comprising but not limited to a fifth-generation (5G) wireless network or the like, a Wi-Fi, wireless local access network (WLAN) techniques such as Institute of Electrical and Electronics Engineers (IEEE) 802.11, 802.16, and/or the like. In addition, these signals may include vehicle characteristic data, sensor feedback data, vehicle generated/requested data, user generated/requested data, control instructions, global positioning system (GPS) position, battery status, destination, route information, road conditions, weather conditions, and/or the like. The system can be configured such that charging of battery-powered vehicles can be controlled by the computing device.

The plurality of battery-powered vehicles can comprise at least one of one or more battery-powered terrestrial vehicles, one or more battery-powered aerial vehicles, one or more battery-powered aquatic vehicles, and/or one or more charging vehicles. In some embodiments, battery-powered terrestrial vehicles can comprise but are not limited to automobiles, passenger trucks, cargo vans, transport trucks, eighteen-wheelers, lulls, dump trucks, tractors, motorcycles, snowmobiles, trains, buses, lorries, tanks, trailers, trolleys, scooters, electric bicycles, electric scooters, trams, all-terrain vehicles, recreational vehicles, electric unicycles, electric tricycle, cultivator, harvester, mower, wagon, bulldozer, grader, loader, forklift, crane, paver, loader, street sweeper, garbage truck, front-end loader, feller buncher, backhoe, excavator, any other suitable terrestrial vehicles, equipment, or apparatuses, and any variants or combinations thereof.

In some embodiments, battery-powered aerial vehicles can comprise but are not limited to any fixed wing or rotorcraft, unmanned aerial vehicles, unmanned aerial systems, unmanned combat aerial vehicles, drones, remote-controlled vehicles, airplanes, turbojets, turbofan craft, propeller planes, jet engine aircraft, helicopters, quadcopters, autogyros, cyclogyros, ornithopters, Flettner aircraft, hovercraft, monoplanes, biplanes, rocket-powered aircraft, spacecraft, motor gliders, ducted fan aircraft, airships, personal air vehicles, electric flying vehicles, tilting ducted fan aircraft, any other suitable aerial vehicles, equipment, or apparatuses, and any variants or combinations thereof. In some embodiments, battery-powered aquatic vehicles can comprise but are not limited to any fan-powered aquatic vehicles, jet-powered aquatic vehicles, propeller powered aquatic vehicles, hydrojet powered aquatic vehicles, airboats, barges, cruise ships, cutter, ferry, sloop, scow, freighter, hydroplane, hydrofoil, houseboat, jet ski, jetboat, ketch, naval ship, pontoon, pleasure craft, personal water craft, tanker, tugboat, towboat, trawler, yachts, submarines, any other suitable aquatic vehicles, equipment, or apparatuses, and any variants or combinations thereof.

In some embodiments, charging vehicles can comprise any vehicle or other mobile entity capable of receiving, storing, and/or transmitting an electric charge. In some embodiments, a charging vehicle can be similar to any of the battery-powered aerial vehicles, battery-powered terrestrial vehicles, and/or the battery-powered aquatic vehicles.

In some embodiments in which the system includes a plurality of battery-powered terrestrial vehicles, the system can further include one or more terrestrial charging vehicles. In some other embodiments in which the system includes a plurality of battery-powered aerial vehicles, the system can further include one or more aerial charging vehicles. In some other embodiments in which the system includes a plurality of battery-powered aquatic vehicles, the system can further include one or more aquatic charging vehicles. In some embodiments in which the system includes a plurality of battery-powered terrestrial vehicles and a plurality of battery-powered aerial vehicles, the system can further include one or more terrestrial charging vehicles and one or more aerial charging vehicles. In some other embodiments in which the system includes at least two of a) a plurality of battery-powered terrestrial vehicles, b) a plurality of battery-powered aerial vehicles, and/or c) a plurality of battery-powered aquatic vehicles, the system can comprise one or more of terrestrial, aerial, and/or aquatic charging vehicles, respectively.

In some embodiments, battery-powered mobile entities can be configured to be charged by a charging vehicle and/or another battery-powered mobile entity. In some embodiments, a charging network can comprise a first mobile battery-powered entity, such as a first automobile, can be configured to be electrically coupled to a second mobile battery-powered entity, such as a second automobile in order for the first battery-powered entity to receive or transmit electric charge from or to the second battery-powered entity. In other words, in some embodiments, the first automobile can be configured to establish a charging connection to the second automobile in order for the first automobile to charge or be charged by the second automobile. In some embodiments, the first vehicle can additionally or alternatively be configured to be electrically coupled to a charge vehicle such that a replenishing charge can be communicated from a charge vehicle to the first automobile and from the first vehicle to the second vehicle. In some embodiments, the first automobile, having sufficient charge to both operate and charge the second automobile, can be configured to be releasably, electrically coupled to the second automobile to communicate a replenishing supply of electric charge to the second automobile, in particular, to the battery of the second automobile. Likewise, in some embodiments, an automobile, having sufficient charge to both operate and charge a nearby unmanned aerial vehicle, can be configured to be releasably coupled and/or electrically coupled to the unmanned aerial vehicle to communicate a replenishing supply of electric charge to the unmanned aerial vehicle. As such, any one or more mobile entities described herein can be caused to communicate a replenishing supply of electric charge to any one or more other mobile entities, of any type or mode of transport, within the systems described.

Such charge transactions can be coordinated by a computing device, e.g., a cloud that comprises one or more servers connected to the charged and/or charging mobile entities via a wireless connection. In some embodiments, one or more of a charging entity, a relay entity, and a charged entity involved in a charge transaction can be informationally coupled to the computing device such that information about the charge transaction can be communicated to the computing device. Likewise, the computing device can be informationally coupled to one or more of a charging entity, a relay entity, and a charged entity involved in a charge transaction such that information, signals, suggested actions, and/or commands related to the charging transaction can be communicated to one or more of the charging entity, the relay entity, and the charged entity. In some embodiments, such informational coupling can be carried out wirelessly via a computing device, satellite, relay tower, cell tower, WiFi hotspot, transceiver, transponder, receiver, other suitable telecommunications equipment, or combinations thereof.

In some embodiments, the computing device, such as a server or a cloud computing environment, can be configured to maintain the charge distribution map based upon available sources of charging, entities may need charging, and other relevant aspects and information related to the preparation and enactment of a charge transaction schedule. In other words, in some embodiments, the cloud computing environment or the like can use algorithms or other means for scheduling charge transactions between of heterogeneous or homogeneous mobile entities within a charging network.

In some embodiments, the charging network can comprise tens, hundreds, thousands, millions, or more of any sort or type or mode of transport of mobile entities described herein. In some embodiments, the charging network can also include charging entities, such as mobile and/or stationary charging entities. In some embodiments, the mobile charging entities can be charging trucks, charging aerial vehicles, charging aquatic vessels, or the like. In some embodiments, the mobile charging entity can comprise a charge storage device, such as a battery, a stack of batteries, a power bank, or any other suitable means for storing electric charge as ions or electrons, for generating electrons from chemical reactions such as redox reactions, or the like. By way of example only, and in no way meaning to limit the scope of this disclosure, some of the suitable battery types/chemistries that can be used include but are not limited to zinc-carbon, zinc-chloride, alkaline, nickel oxyhydroxide, lithium-containing, lithium-based, lithium-copper oxide, lithium-ion disulfide, lithium-manganese dioxide, lithium-carbon fluoride, lithium-chromium oxide, lithium-silicon, mercury oxide, zinc-air, Zamboni pile, silver oxide, magnesium, nickel-cadmium, lead-acid, nickel-metal hydride, nickel-zinc, silver-zinc, lithium-iron-phosphate, lithium ion, solid state batteries, aluminum air, Daniell cells, Li—$CoO_2$, Li—$MnO_2$, Li—$Mn_2O_4$, Li—$BF_4$, Li—$NiMnCoO_2$, Li—$FePO_4$, Li—$NiCoAlO_2$, $Li_4$—$Ti_5Oi_2$, Li—$FeS_2$, Li—$SOCl_2$, Li—$SOCl_2$—BrCl, Li—$SO_2Cl_2$, Li-$SO_2$, Li—$I_2$, Li—$Ag_2CrO_4$, Li—$Ag_2V_4O_{11}$, Li—CuO, Li—$Cu_4O(PO_4)_2$, Li—CuS, Li—PbCuS, Li—FeS, Li—$Bi_2Pb_2O_5$, Li—$Bi_2O_3$, Li—$V_2O_5$, Li—$CoO_2$, Li—$NiCoO_2$, Li—$CuCl_2$, Li/Al—$MnO_2$, Li/Al—$V_2O_5$, Li—Se, other suitable chemistries and configurations, variants thereof, and any combination thereof.

In some embodiments, the scheduling, commencement, and/or termination of, payment for, and record-keeping for charge transactions within a charging network or a plurality of charging networks can be governed by at least one or more centralized computing devices (e.g., a cloud). In some embodiments, the one or more computing devices can be configured to track the plurality of vehicles and dynamically authorize charging according to a charge-distribution map. In some embodiments, a computing device can, once, intermittently, or in real-time, generate the charge-distribution map, e.g., with the use of one or more scheduling algorithms. In some embodiments, if the computing device is a cloud computing environment in communication with a plurality of battery-powered vehicles or other battery-powered entities, the cloud can maintain an updated charge-distribution map, receive from the battery-powered entities updated GPS position, speed of travel, type of vehicle/entity, road/weather conditions, and other useful information, and employ an efficient charge scheduling algorithm to schedule charging instances between entities that are controllable within the system. In other words, the battery-powered vehicles transmit, e.g., in real-time, sufficient pertinent information to the cloud such that the cloud computing environment is able to use one or more charge-scheduling algorithms to schedule the next instances of charging between entities within the system and to update the charge-distribution map.

In some embodiments, a first mobile entity may not have the capability to, at least temporarily, communicate with the computing device (e.g., cloud), but may have the capability to communicate with a second mobile entity nearby the first mobile entity, the second mobile entity having the capability to communicate with the computing device. In such an embodiment, it might be helpful for the second mobile entity to relay the information from the first mobile entity to the computing device and to relay other information from the computing device to the first mobile entity. In such embodiments, the second mobile entity acts as a relay entity and can be so named in such a network. In some embodiments, a relay entity can communicate any data gathered by, received by, or generated by a battery-powered mobile entity to the computing device (e.g., cloud), in which case the computing device can update the charge-distribution map with said data from the battery-powered mobile entity, employ an algorithm or other such decision-making model or computer program to determine if a charging transaction is required, and can transmit or otherwise communicate instructions to the relay entity, the relay entity configured to either act upon the instructions or further communicate said instructions on to another entity such as the battery-powered mobile entity. In some embodiments, a relay entity can be configured to communicate with a plurality of mobile entities within a pre-determined proximity to the relay entity. In some embodiments, the relay entity can be a charging entity, a terrestrial mobile entity, an aerial mobile entity, an aquatic mobile entity, a stationary entity, or an intermediary communications entity such as a telecommunications tower or other such telecommunications device.

Once the computing device (e.g., cloud) determines that a charging transaction is desired or required, the computing device can communicate by any suitable means with one or more participants to the charging transaction with instructions to carry out the charging transaction. Upon receiving the instructions to carry out the charging transaction, the one or more participants to the charging transaction can initiate the charging transaction unilaterally, communicate the instructions to one or more other participants to the charging transaction, assume partial or total control of one or more other participants to the charging transaction, or otherwise initiate the charging transaction. In some embodiments, the computing device provides instructions to a relay vehicle to initiate a charging transaction between a nearby charging vehicle and a nearby battery-powered vehicle. The relay vehicle can then communicate said instructions to the charging vehicle solely or to the charging vehicle and also the battery-powered vehicle. In some embodiments, upon receiving said instructions at the charging vehicle, the charging vehicle can initiate communications with the battery-powered vehicle in order to facilitate and/or receive authorization for initiation of the charging transaction. In some embodiments, the charging vehicle might send a signal via a transceiver to a receiver of the battery-powered vehicle, the signal indicative of a command or a request. In some embodiments, the signal might be indicative of a command for the battery-powered vehicle to change its position and/or location with respect to the charging vehicle. In some embodiments, the signal might be indicative of a command for the battery-powered vehicle to changes its speed and/or velocity, such as by "speed locking" with the charging vehicle. In some embodiments, the signal might be indicative of an intention by the charging vehicle to changes its position, location, speed, and/or velocity to match those of the battery-powered vehicle. In some embodiments, the signal might be indicative of a request that the battery-powered vehicle carry out any of the previous actions described, with the difference between a request and a command being that the battery-powered vehicle can refuse to comply with the request whereas the battery-powered vehicle might be either not capable, only partially capable, or only capable following a particular emergency procedure, of refusing to comply with the command.

In some embodiments, once the battery-powered vehicle receives the signal, the battery-powered vehicle can be configured to immediately comply, to return a separate signal from a transceiver of the battery-powered vehicle to a receiver of the charging vehicle of an intention to comply with the instructions to initiate the charge transaction, can return a signal indicative of an intention to not comply with the instructions to initiate the charge transaction, a signal indicative of an alternative course of action or additional course of action with respect to the instructions to initiate a charge transaction, or combinations thereof. Such a return signal from the battery-powered vehicle can be considered a "hand shake" between the charging vehicle and the battery-powered vehicle, which can be carried out with or without encryption or other such authentication and/or security measures. In some embodiments, such an authentication measure might include the battery-powered vehicle communicating directly with the computing device (e.g., cloud) to verify the instructions received from the charging vehicle, to authorize payment for the charging transaction, or to verify or correct data related to the battery-powered vehicle, such as the battery-powered vehicle's location, position, speed, velocity, vehicle type, battery type, battery charge level, desire or lack thereof for participating in the charge transaction, or any other such information as necessary. All or some of this information can also be relayed to the computing device via the charging vehicle, via another battery-powered vehicle, via a relay device such as a mobile phone, tablet, WiFi router, telecommunications tower, other suitable telecommunications devices, variants thereof, and any combination thereof.

In some embodiments, once the particular details of the charge transaction are agreed upon between two or more of the battery-powered vehicle, another battery-powered vehicle, the relay vehicle, the charge vehicle, the computing device (e.g., cloud), and any other participants to the charge transaction or nearby entities that may need to be informed about the agreed-upon charge transaction, the charge transaction can commence. In some embodiments, during the charge transaction, a replenishing supply of electric charge can be communicated from one or more of the charge vehicle, another battery-powered vehicle, the relay vehicle, or any other participants to the charge transaction, and the battery-powered vehicle. In some embodiments, the replenishing supply of electric charge can be communicated to the battery-powered vehicle by a wired electrical coupling of the charge-supplying vehicle and the battery-powered vehicle. In some embodiments, the battery-powered vehicle can comprise a charge receiving element configured to be removably and electrically coupled to a charge transmitting element of the charge-supplying vehicle. In some embodiments, during regular operation of the battery-powered vehicle, the charge receiving element can be configured to be retained within the battery-powered vehicle, while the charge receiving element can be configured to be extended from the battery-powered vehicle during a charge transaction so as to be coupled with the charge transmitting element of the charge-supplying vehicle. In some embodiments, the battery-powered vehicle can have a charge receiving port that is not configured to be extended from the battery-powered vehicle during a charge transaction, while the charge-supplying vehicle can be configured to extend the charge transmitting element to establish and maintain electrical communication between the charge transmitting element and the charge receiving port of the battery-powered vehicle. In some embodiments, the charge receiving element of the battery-powered vehicle can be configured to be extended out from the battery-powered vehicle to establish and maintain electrical communication between the charge receiving element and a charge transmitting port of the charge-suppling vehicle, the charge transmitting port being stationary with regard to the charge-supplying vehicle during a charge transaction.

In some embodiments, the replenishing supply of electrical charge can be communicated to the battery-powered vehicle by a wireless electrically coupling of the charge-supplying vehicle and the battery-powered vehicle. In some embodiments, the replenishing supply of electrical charge can be communicated by a combination of a wired and a wireless electrically coupling of the charge-supplying vehicle and the battery-powered vehicle. In some embodiments, the battery-powered vehicle can comprise a wireless charging receiver and the battery-supplying vehicle can comprise a wireless charging transceiver. In some embodiments, the wireless charging receiver of the battery-powered vehicle can be configured to receive the replenishing supply of electrical charge from the wireless charging transceiver of the charge-supplying vehicle according to any suitable mechanism or protocol. Without wishing to be bound by any particular theory, the battery-powered vehicle can be configured to receive the replenishing supply of electrical charge from the wireless charging transceiver of the charge-supplying vehicle by magnetic resonant coupling therebetween. Alternatively, without wishing to be bound by any particular theory, the battery-powered vehicle can be configured to receive the replenishing supply of electrical charge from the wireless charging transceiver of the charge-supplying vehicle by tightly-coupled electromagnetic inductive or non-radiative charging. Alternatively, without wishing to be bound by any particular theory, the battery-powered vehicle can be configured to receive the replenishing supply of electrical charge from the wireless charging transceiver of the charge-supplying vehicle by loosely-coupled or radiative electromagnetic resonant charging. Alternatively, without wishing to be bound by any particular theory, the battery-powered vehicle can be configured to receive the replenishing supply of electrical charge from the wireless charging transceiver of the charge-supplying vehicle by uncoupled radio frequency wireless charging. Any and all other suitable wireless charging technologies, protocols, methods, approaches, systems, devices, and phenomena are contemplated herein and are hereby considered within the scope of this disclosure. In some embodiments, a proximity less than a pre-determined wireless charging proximity should be maintained between the battery-powered vehicle and the charge-supplying vehicle for the duration of the charge transaction in order to maintain a wireless charging connection therebetween.

In some embodiments, depending upon the type and charging protocol of wireless charging device or system used, the pre-determined wireless charging proximity can be between about zero meters and about 20 meters, about 0.001 meters and about 20 meters, about 0.001 meters and about 19 meters, about 0.001 meters and about 18 meters, about 0.001 meters and about 17 meters, about 0.001 meters and about 16 meters, about 0.001 meters and about 15 meters, about 0.001 meters and about 14 meters, about 0.001 meters and about 13 meters, about 0.001 meters and about 12 meters, about 0.001 meters and about 11 meters, about 0.001 meters and about 10 meters, about 0.001 meters and about 9 meters, about 0.001 meters and about 8 meters, about 0.001 meters and about 7 meters, about 0.001 meters and about 6 meters, about 0.001 meters and about 5 meters, about 0.001 meters and about 4 meters, about 0.001 meters and about 3 meters, about 0.001 meters and about 2 meters, about 0.001 meters and about 1 meter, about 0.001 meters and about 0.5 meters, about 0.001 meters and about 0.25 meters, about 0.001 meters and about 0.1 meters, about 0.001 meters and about 0.01 meters, about 0.01 meters and about 5 meters about 0.02 meters and about 4 meters, about 0.03 meters and about 3 meters, about 0.04 meters and about 2 meters, about 0.05 meters and about 1 meter, about 0.002 meters and about 5 meters, about 0.003 meters and about 5 meters, about 0.003 meters and about 5 meters, about 0.004 meters and about 5 meters, about 0.005 meters and about 5 meters, about 0.006 meters and about 5 meters, about 0.007 meters and about 5 meters, about 0.008 meters and about 5 meters, about 0.009 meters and about 5 meters, or about 0.01 meters and about 5 meters, inclusive of all values and ranges therebetween. In some embodiments, depending upon the type and charging protocol of wireless charging device or system used, the pre-determined wireless charging proximity can be less than about 20 meters, about 19 meters, about 18 meters, about 17 meters, about 16 meters, about 15 meters, about 14 meters, about 13 meters, about 12 meters, about 11 meters, about 9 meters, about 8 meters, about 7 meters, about 6 meters, about 5 meters, about 4 meters, about 3 meters, about 2 meters, about 1 meter, about 0.5 meters, about 0.25 meters, about 0.1 meters, less than about 0.05 meters, less than about 0.01 meters, or less than about 0.001 meters, inclusive of all values and ranges therebetween. In some embodiments, depending upon the type and charging protocol of wireless charging device or system used, the pre-determined wireless charging proximity can be greater than about zero meters, about 0.001 meters, about 0.002 meters, about 0.003 meters, about 0.004 meters, about 0.005 meters, about 0.006 meters, about 0.007 meters, about 0.008 meters, about 0.009 meters, about 0.01 meters, about 0.02 meters, about 0.03 meters, about 0.04 meters, about 0.05 meters, about 0.06 meters, about 0.07 meters, about 0.08 meters, about 0.09 meters, about 0.1 meters, about 0.2 meters, about 0.3 meters, about 0.4 meters, about 0.5 meters, about 0.6 meters, about 0.7 meters, about 0.8 meters, about 0.9 meters, about 1 meter, about 1.25 meters, about 1.5 meters, about 1.75 meters, about 2 meters, about 2.25 meters, about 2.5 meters, about 2.75 meters, about 3 meters, about 3.25 meters, about 3.5 meters, about 3.75 meters, about 4 meters, about 4.25 meters, about 4.5 meters, about 4.75 meters, about 5 meters, about 6 meters, about 7 meters, about 8 meters, about 9 meters, about 10 meters, about 11 meters, about 12 meters, about 13 meters, about 14 meters, about 15 meters, about 16 meters, about 17 meters, about 18 meters, about 19 meters, or greater than about 20 meters, inclusive of all values and ranges therebetween.

In some embodiments, in order to maintain a proper "speed lock," "position lock," "destination lock," "proximity lock," "velocity lock," and the like during the charge transaction, the charge-supplying vehicle may often either need to attain control or partial control of the battery-powered vehicle receiving the replenishing supply of electrical charge or relinquish control or partial control of the charge-supplying vehicle to the battery-powered vehicle receiving the replenishing supply of electrical charge for the duration of the charge transaction or a portion thereof. In some embodiments, in attaining or relinquishing control, one or both of the battery-powered vehicle and the charge-supplying vehicle may be asked or required to slow down, speed up, maintain a course of travel, diverge from a current course of travel, change lanes or headings, move to beside, behind, or ahead of the other vehicle, or in another way diverge from the normal course of travel maintained prior to commencement of the charge transaction.

In some embodiments, computing device (e.g., cloud) can comprise one or more servers, one or more computers, one or more networks, one or more intranets, one or more signal transmission devices, one or more signal receiving devices, one or more memory devices, computer program code, specialized computer program code, computer models, databases, one or more user interfaces, one or more displays, one or more user input devices, one or more middleware applications, one or more web browser applications, one or more virtual session applications, one or more satellites, one or more telecommunication towers, one or more telecommunication dishes, one or more power supplies, one or more signal booster devices, one or more network security programs, one or more authentication modules, one or more mobile devices, one or more tablets, one or more data models, one or more structured query language (SQL) databases, one or more NoSQL databases, one or more application programming interfaces, and/or any other suitable apparatuses, devices, networks, systems, programs, applications, or databases, without limitation.

In some embodiments, the computing device can further comprise a charge transaction ledger, a charge-distribution map, a mobile entity database, a user database, and/or one or more charge transaction scheduling algorithms. The charge transaction ledger can be a centralized ledger or a decentralized (e.g., blockchain) ledger of charge transactions that have occurred. The charge-distribution map can be generated, maintained and updated according to information received from the network or networks of mobile entities related to the past, real-time, or near real-time location, destination, speed, battery type, battery charge level, battery capacity, and other information related to each mobile entity (terrestrial, aerial, aquatic, charge entities, relay entities, etc.), as well as environmental data, available sources of grid or network electricity, and the like. The mobile entity database can comprise a listing of all or approximately all or substantially all of the mobile entities that are considered to be within the network or networks upon which the system described herein is enacted, while the user database can comprise owners/operators of said mobile entities as well as any pertinent information about the owners/operators, such as the one or more mobile entities to which the user is associated, biographical information, whether or not the owner/operator has agreed to participate in charge transactions, user payment information, and the like. The charge transaction scheduling algorithm is a specialized model for scheduling charge transactions that takes into account the relative location, destination, mobile entity type, battery type, battery charge level, and any other suitable information from the charge transaction ledger, the charge-distribution map, the mobile entity database, the user database, or elsewhere, to determine at any given time or for any given duration of time which mobile entities should be participating in a charge transaction and the role that each participating mobile entity should play in each charge transaction.

In some embodiments, an apparatus for governing charge transactions for a charging network can comprise at least one processor and at least one memory device including computer program code, the at least one memory device and the computer program code configured to, with the processor, cause the apparatus to at least receive current charge level data for a plurality of mobile battery-powered entities, determine, based on the current charge level data, one or more mobile battery-powered entities of the plurality of mobile battery-powered entities to be charged, determine, based on the current charge level data, one or more other mobile battery-powered entities of the plurality of mobile battery-powered entities to be caused to charge the one or more mobile battery-powered entities, and cause, while the one or more mobile battery-powered entities and are being transported within a pre-determined proximity of the one or more other mobile battery-powered entities, the one or more other mobile battery-powered entities to charge the one or more mobile battery-powered entities.

In some embodiments, a method of charging a mobile entity can comprise determining that a mobile battery-powered entity is within a pre-determined proximity of another mobile battery-powered entity, determining a charge level and a transport speed of the mobile battery-powered entity, determining the charge level and the transport speed of the other mobile battery-powered entity, in an instance in which the charge level of the mobile battery-powered entity is below a pre-determined (e.g., configurable) charge level and less than the charge level of the other mobile battery-powered entity, causing the mobile battery-powered entity to receive an electric charge from the other mobile battery-powered entity, and in an instance in which the charge level of the other mobile battery-powered entity is below the pre-determined (e.g., configurable) charge level and less than the charge level of the other mobile battery-powered entity, causing the other mobile battery-powered entity to receive the electric charge from the mobile battery-powered entity.

In some embodiments, a method for governing charge transactions for a charging network can comprise receiving current charge level data for a plurality of mobile battery-powered entities, determining, based on the current charge level data, one or more mobile battery-powered entities of the plurality of mobile battery-powered entities to be charged, determining, based on the current charge level data, one or more other mobile battery-powered entities of the plurality of mobile battery-powered entities to be caused to charge the one or more mobile battery-powered entities, and causing, while the one or more mobile battery-powered entities and are being transported within a pre-determined proximity of the one or more other mobile battery-powered entities, the one or more other mobile battery-powered entities to charge the one or more mobile battery-powered entities.

In some embodiments, a method for instigating a charge transaction for a mobile battery-powered entity in a charging network can comprise wirelessly transmitting, from a mobile battery-powered entity while the mobile battery-powered entity is being transported through a predefined area, a current charge level to a computing device, receiving an indication from the computing device as to whether the mobile battery-powered entity is to charge another mobile battery-powered entity, to be charged by the other mobile battery-powered entity, or neither charge nor be charged by the other mobile battery-powered entity, and in an instance in which the indication received indicates that the mobile battery-powered entity is either to charge or be charged by the other mobile battery-powered entity: determining a geospatial location and a transport speed of the mobile battery-powered entity, receiving the geospatial location and the transport speed of the other mobile battery-powered entity, causing the mobile battery-powered entity to speed lock with the other mobile battery-powered entity based on the geospatial location and the transport speed of the mobile battery-powered entity and the other mobile battery-powered entity, in an instance in which the indication received indicates that the mobile battery-powered entity is to charge the other mobile battery-powered entity, causing the mobile battery-powered entity to transmit a charge to the other mobile battery-powered entity, and in an instance in which the indication received indicates that the mobile battery-powered entity is to be charged by the other mobile battery-powered entity, causing the mobile battery-powered entity to receive the charge from the other mobile battery-powered entity.

Figure 2:
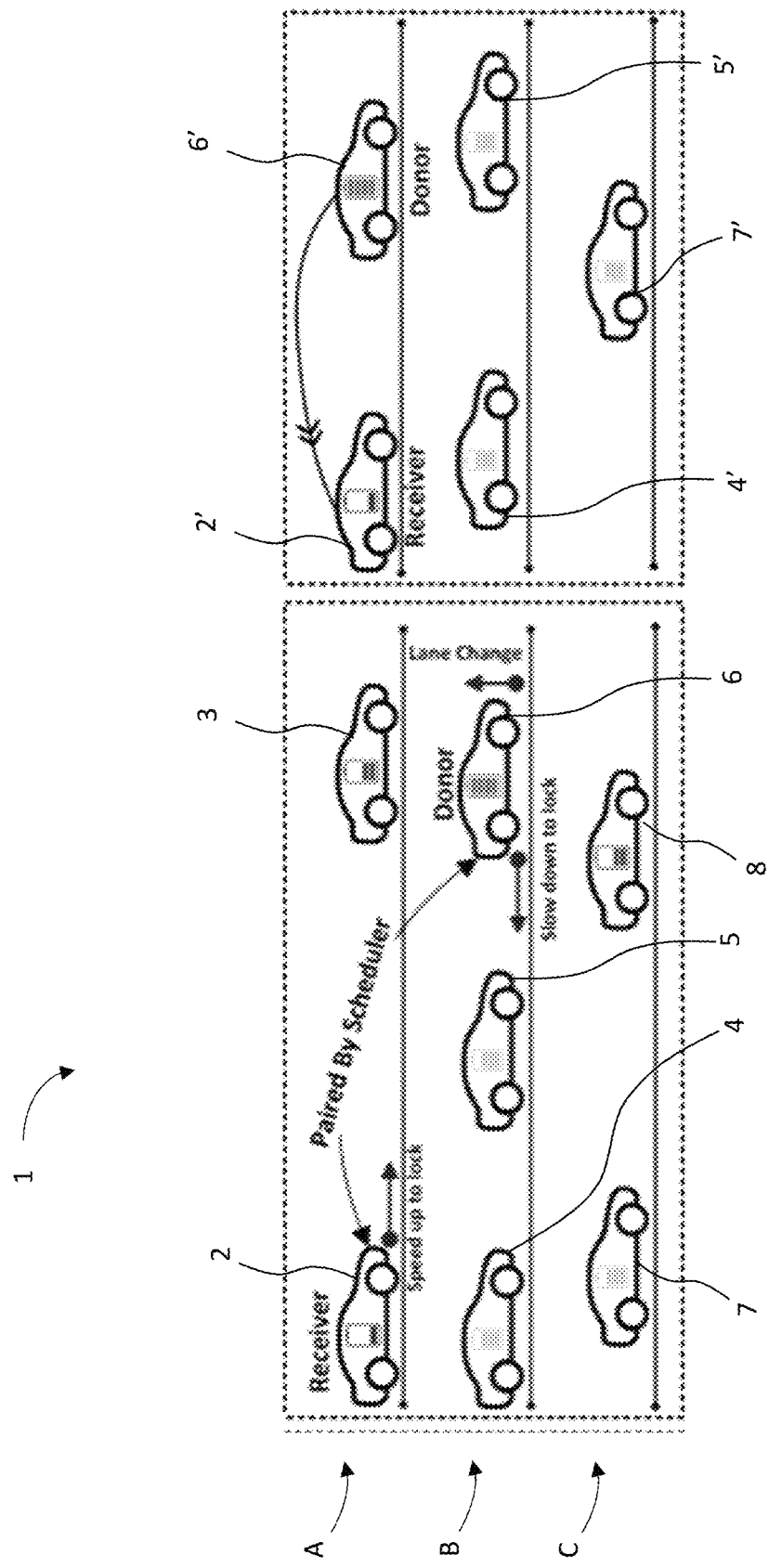
FIG. 2 provides an example approach for on-the-go peer-to-peer charging of vehicles along a roadway, according to some embodiments discussed herein.

Referring now to FIGS. 1 and 2, an approach 1 is illustrated for peer-to-peer charging on a roadway. FIG. 1 illustrates two roadways, A and B, on or above which vehicles, e.g., EVs, may travel. In some embodiments, a first vehicle 2 can be traveling down roadway A. In some embodiments, the first vehicle 2 can be an EV, such as any of the EVs described herein. In some embodiments, the first vehicle 2 can have a battery that is depleted and/or which has a reduced charge. As illustrated in various figures of this present application, the current charge level of a vehicle is typically, although not necessarily always, illustrated by a battery level icon within or beside the illustrated vehicle, where no bar indicates no remaining charge, one bar indicates a low level of remaining charge or no remaining charge, two bars indicates a moderate level of remaining charge, and three or four bars indicate a high level of remaining charge or full charge remaining. In the figures, automobiles, such as cars, are often illustrated with a battery level icon, in the general shape of a battery, within the car, MoCS are typically illustrated as a truck with one or more battery level icons illustrated within a bed of the truck, and aerial vehicles are illustrated as drones with one or more battery level icons illustrated next to the body of the drone and beneath the rotors. However, the illustrated vehicles and battery icon position are not intended to limit this disclosure with regard to the types of vehicles covered by this disclosure nor with regard to the position, number, type, or charge level iterations for any battery or other suitable electrochemical device used in any suitable vehicle.

In some embodiments, the first vehicle 2 can have a charge that is determined to be, either by the first vehicle 2 itself or by another entity in the system, insufficient based on the destination and/or route planned for the first vehicle 2. In an instance in which it is determined that the first vehicle 2 has insufficient charge for the first vehicle 2 to reach the planned destination according to the planned route, the first vehicle 2 or another entity of the system can identify a second vehicle 3 that has comparatively more charge than the first vehicle 2 or which has more charge than the second vehicle 3 desires to reach its planned destination via its planned route. Once the first vehicle 2 or the other entity of the system identifies the second vehicle 3 as having an excess battery charge, the first vehicle 2 and the second vehicle 3 can establish an electrical connection therebetween in order to transfer charge from the second vehicle 3 to the first vehicle 2.

As further illustrated in FIG. 1, a third vehicle 4, a fourth vehicle 5, and a fifth vehicle 6, e.g., traveling on or above roadway B, may be, respectively, partially depleted of battery charge, completely/nearly completely depleted of battery charge, and have an unknown battery charge. In some embodiments, if there is not a vehicle, such as the second vehicle 3 on roadway A, that is available on roadway B to provide a replenishing charge to one or more of the third vehicle 4, fourth vehicle 5, or fifth vehicle 6, then a sixth vehicle 7 (illustrated as a MoCS) can be deployed to the roadway B. In some embodiments, the sixth vehicle 7 (as a MoCS) can provide a replenishing charge directly to a vehicle, e.g., the fourth vehicle 5 and/or the fifth vehicle 6. In some embodiments, even if the sixth vehicle 7 cannot or does not provide replenishing charge to a vehicle, e.g., the third vehicle 4, another vehicle, such as the fourth vehicle 5, can receive replenishing charge from the sixth vehicle 7 and in turn provide replenishing charge to the third vehicle 4.

Alternatively or additionally, the above-described approach 1 can be carried out according to the illustration of FIG. 2. For instance, the approach can be carried out for three roadways (A, B, and C), which can be three parallel lanes along the same stretch of a highway, for instance. A first vehicle orientation can be seen in the left-hand dashed box, while a second vehicle orientation, seen in the right-hand dashed box, is the result of an algorithm-based orientation change in order to permit a charge transfer event between a donor vehicle and a recipient vehicle. As illustrated, the first vehicle 2 and the second vehicle 3 may be traveling along roadway A, the third vehicle 4, fourth vehicle 5, and fifth vehicle 6 may be traveling along roadway B, and the sixth vehicle 7 and a seventh vehicle 8 may be traveling along roadway C. As illustrated, the first vehicle 2 may be charge depleted, the second vehicle 3 and seventh vehicle 8 have a moderate level of charge remaining, and the second, third, fourth, fifth, and sixth vehicles (vehicles 3, 4, 5, 6, 7), may have a high level of charge remaining or may be fully charged. As such, a scheduling algorithm may be used to evaluate the available charge, proximity of each vehicle to other vehicles, and other factors such as vehicle compatibility with regard to inter-vehicle charge transfer. The scheduling algorithm, implemented for instance by a processor or the like (also referred to as a "scheduler") can pair a charge donor vehicle (e.g., the fifth vehicle 6) with a receiving vehicle (e.g., the first vehicle 2). In some embodiments, when the identified donor vehicle and receiving vehicle are not located sufficiently adjacent to facilitate a charge transfer event, the scheduler may request or otherwise cause one or both of the donor vehicle or the receiving vehicle to slow down or speed up in order to bring the donor vehicle and receiving vehicle into sufficient proximity. As illustrated, the scheduler can cause the first vehicle 2, as the receiving vehicle, to speed up and stay in roadway A, cause the fifth vehicle 6 to slow down and, optionally, speed lock with the first vehicle 2 such that the vehicles are raveling at the same or sufficiently similar speed, and cause the fifth vehicle 6 to merge from roadway B to roadway A. The resulting orientation of vehicles on the roadways can be seen in the right-hand box of FIG. 2, in which the first vehicle 2' and fifth vehicle 6' are now in the same roadway (roadway A), immediately adjacent each other within roadway A, and are traveling at sufficiently the same speed such that the charge transfer event can take place.

Figure 3:
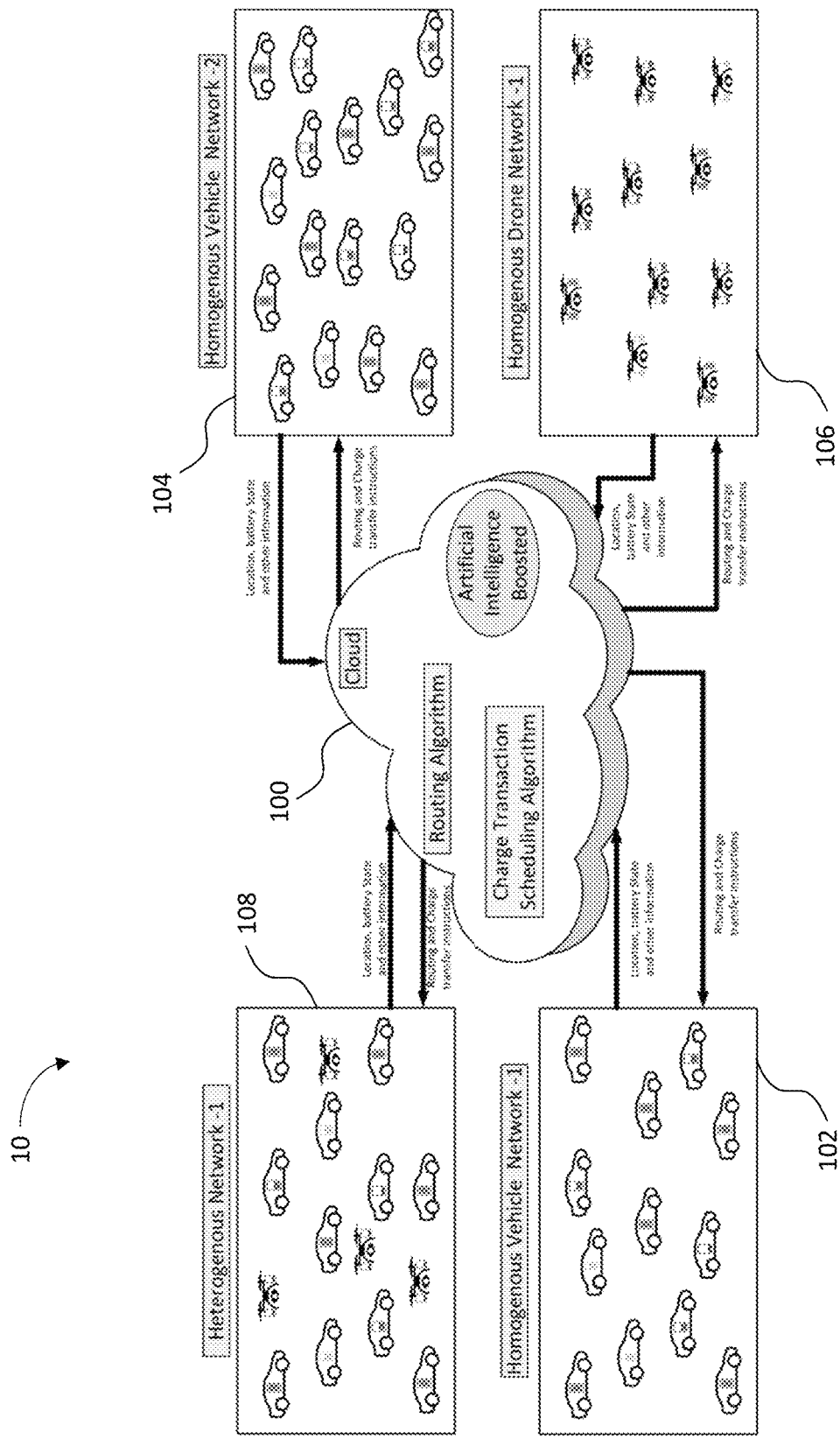
FIG. 3 provides an example of a system for charging a network of mobile battery-operated units on the go, according to some embodiments discussed herein.
Figure 4:
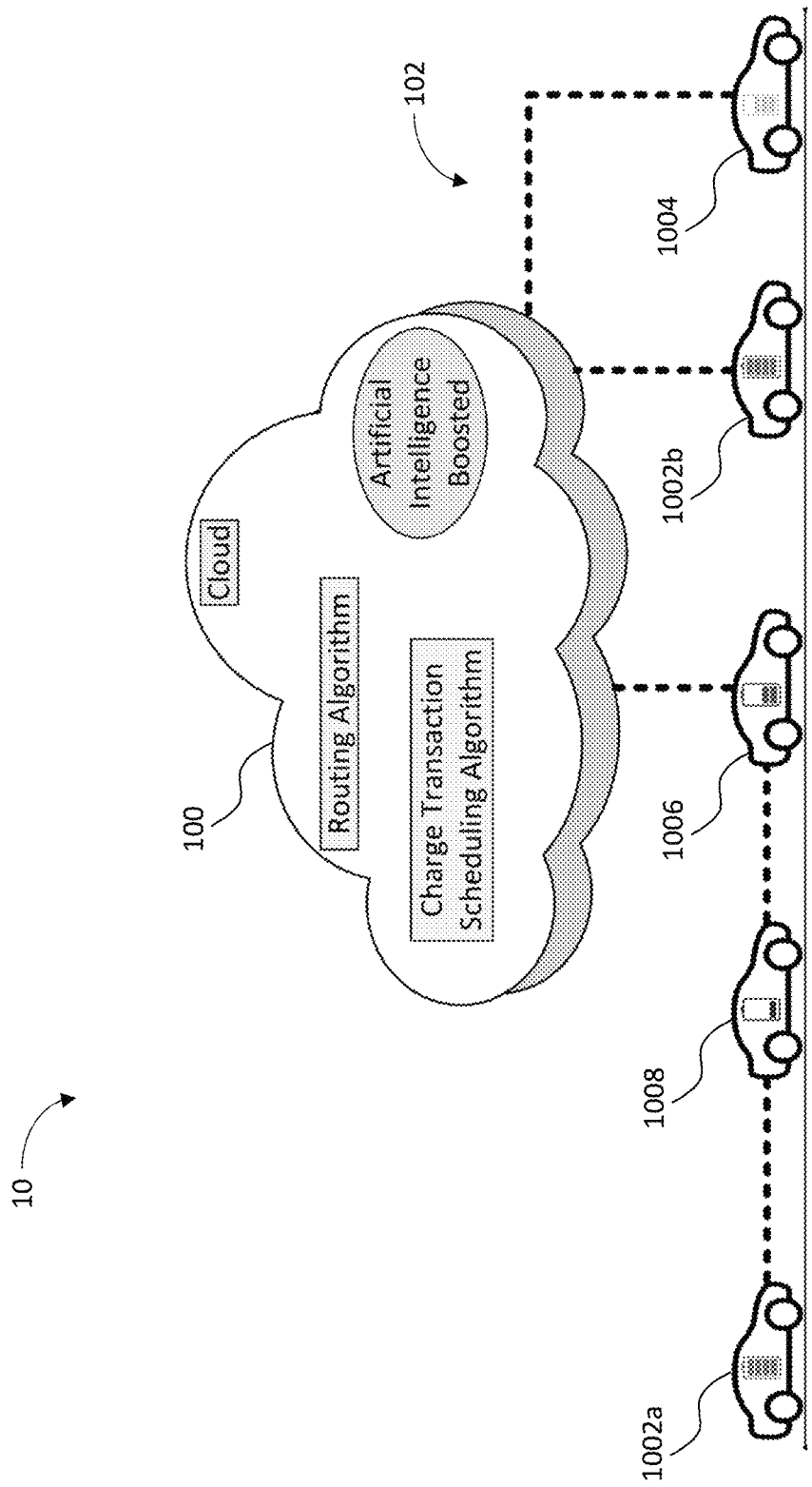
FIG. 4 provides an example of a system for entity-to-entity and entity-to-cloud communication, according to some embodiments discussed herein.
Figure 5:
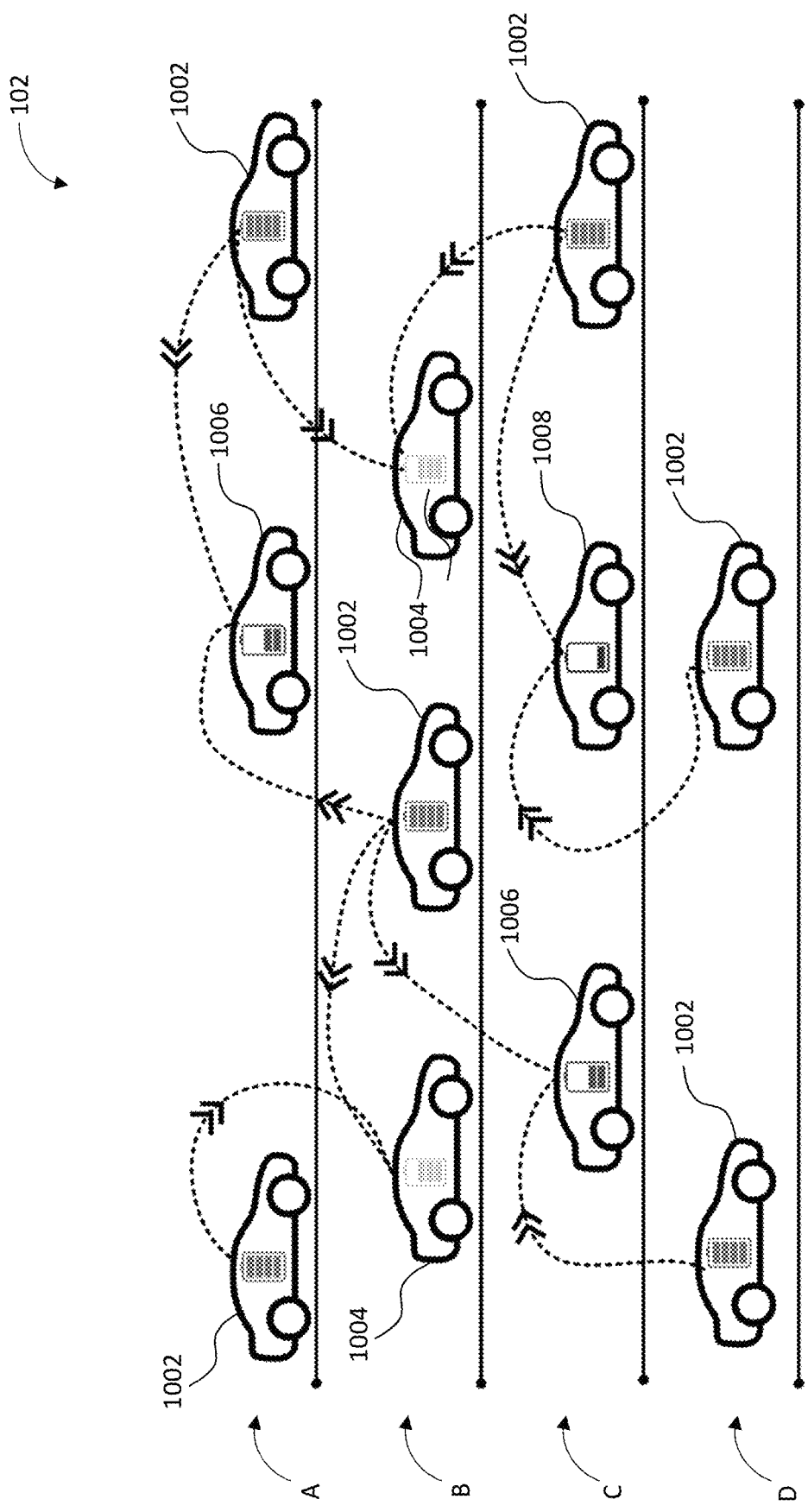
FIG. 5 provides an example of a system for on-the-go entity-to-entity charging, according to some embodiments discussed herein.

Referring now to FIGS. 3-5, a system 10 is illustrated for charging mobile entities on-the-go. In some embodiments, the autonomous charging of battery-operated mobile entities on-the-go may be similar in principle to on-air refueling of airplanes. According to some embodiments of the approach, a battery-operated mobile entity (Entity-A) can be caused to move to the front/rear or left/right side of another entity to be charged (Entity-B); speed-lock (i.e., communicate among themselves through entity-to-entity communication or through entity-to-cloud-to-entity communication to synchronize their speeds); and entity A extending a retractable charging cable to releasably engage a retractable charge receiving point of Entity-B (and other cars next to it, with which it speed-locks) and starts charging on-the-go. In some embodiments, the charging cable can be removed from Entity-B and taken back to Entity-A after sufficient charge is provided, if it is determined that continued engagement presents any sort of risk to life or infrastructure, if the route of one or both of Entity-A and Entity-B diverges from the other, or the like. By design of the on-the-go charging methods and apparatuses described herein, Entity-A should mirror the route and travel speed of Entity-B during the charging process. While this approach is suitable for any mixture of mobile entities having any mixture of modes of transport, the approach is particularly suitable for fully autonomous or substantially fully autonomous entities, although the basic mechanisms are applicable to partially autonomous or manual entities. The technology, approach, method, apparatuses, and systems naturally applies to any network of mobile battery-powered entities.

In some embodiments, the system 10 can comprise a computing device 100 comprising a cloud computing environment and associated infrastructure, telecommunications equipment, hardware, one or more processors, one or more memory devices, and the like. The one or more memory devices can store one or more algorithms, the algorithms capable of, with at least one of the one or more processors and at least one of the one or more memory devices, a method for scheduling charge transactions. In some embodiments, the one or more algorithms can comprise at least one of a routing algorithm and a charge transaction scheduling algorithm. In some embodiments, the computing device 100 can further include an artificial intelligence program stored on at least one of the one or more memory devices and configured to enact the one or more algorithms such that the computing device 100 can at least partially govern the movement of one or more mobile entities within a network and charge transactions carried out within the network. In some embodiments, the system 10 can comprise a first homogenous vehicle network 102 comprising a plurality of vehicles of a single type, category, mode of transport, and/or charge transaction protocol type. In some embodiments, charge transactions within the first homogenous vehicle network 102 can be at least partially governed by the computing device 100. In some embodiments, information related to the first homogenous vehicle network 102 can be communicated to the computing device 100. In some embodiments, information related to the first homogenous vehicle network 102 that can be communicated to the computing device 100 can comprise mobile entity identifiers, mobile entity locations, mobile entity battery type and current charge level, mobile entity destinations, road and weather conditions, and other suitable information, such as described above. Likewise, in some embodiments, the computing device 100 can be capable of communicating routing and/or charge transaction instructions to one or more mobile entities of the first homogeneous vehicle network 102.

For instance, as illustrated in FIG. 4, the computing device 100 can be configured to communicate routing and/or charge transaction instructions to one or more of a plurality of vehicles in the first homogeneous vehicle network 102, depending on the charge level of each of the plurality of vehicles. In some embodiments, the plurality of vehicles can be subdivided into any type or number of classes or groups of vehicles based on the charge level of the battery for each vehicle. For instance, the charge level of batteries for vehicles might be subdivided into four groups as follows: i) Vehicle A: 76%-100% of capacity, ii) Group B: 50%-75% of capacity, iii) Group C: 26%-50% of capacity, and iv) Group D: 0%-25% of capacity. As illustrated in FIG. 4, Group A vehicles are identified as 1002, Group B vehicles are identified as 1004, Group C vehicles are identified as 1006, and Group D vehicles are identified as 1008. In some embodiments, such as when the plurality of vehicles are subdivided into four groups as described, Group D vehicles may be prioritized in terms of routing and scheduling a charge transaction, with descending levels of prioritization for, respectively, Group C vehicles, Group B vehicles, and Group A vehicles. In some embodiments, Group A vehicles, and perhaps even Group B vehicles, may be removed from the schedule completely for a pre-determined time based upon an estimation of when the batter of said vehicles will likely be depleted of electric charge sufficiently to re-classify said vehicles as Group C or Group D. In some embodiments, Group A vehicles, and perhaps even Group B vehicles, may be re-classified as Charging Vehicles (also called "charge-supplying vehicles" herein), routed based upon an upcoming scheduled charge transaction, and tasked with communicating a replenishing supply of electrical charge to a Group D or Group C vehicle during the scheduled charge transaction.

In some embodiments, the computing device 100 may be capable of communicating with only a portion of the plurality of vehicles, or only a portion of the plurality of vehicles are capable of communicating with the computing device 100. As illustrated in FIG. 4, in some embodiments, one or more of the plurality of vehicles (e.g., 1006, 1002b, and 1004) are capable of independent communication with the computing device 100, while one or more others of the plurality of vehicles (e.g., 1002a and 1008) are incapable of independent communication with the computing device 100. As such, in some embodiments, a relay vehicle (e.g., 1006) can be configured to receive, from the vehicles (e.g., 1002a and 1008) incapable of independent communication with the computing device 100, pertinent information about the vehicles (e.g., 1002a and 1008) incapable of independent communication with the computing device 100, and communicate such pertinent information to the computing device 100. Likewise, in some embodiments, relay vehicles (e.g., 1006) can be configured to receive, from the computing device 100, routing instructions and/or charge transaction instructions destined for the vehicles (e.g., 1002a and 1008) incapable of independent communication with the computing device 100, and communicate such routing instructions and/or charge transaction instructions to the vehicles (e.g., 1002a and 1008) incapable of independent communication with the computing device 100. In some embodiments, the system 10 can be configured such that the relay vehicles (e.g., 1006) communicate information and/or instructions between the computing device 100 and another relay vehicle (e.g., 1008), the other relay vehicle (e.g., 1008) configured to further communicate the information and/or instructions between the relay vehicle (e.g., 1006) and the mobile entity (1002a) incapable of independent communication with the computing device 100. In some embodiments, the system 10 can be configured such that relay vehicles (e.g., 1006, 1008) are used even if a terminal vehicle (e.g., 1002a) is not incapable of independent communication with the computing device 100. For instance, in some embodiments, a charging network (e.g., the first homogenous vehicle network 102) may be configured such that a limited number of vehicles communicate independently with the computing device 100, the limited number of vehicles acting as relay vehicles to some or all of the remaining vehicles in the charging network. Without wishing to be bound by any particular theory, by communicating independent with only a limited number of the vehicles in the charging network, the computing device 100 can reduce the capacity and bandwidth required for communicating information and instructions between the plurality of vehicles of the charging network and the computing device 100. Furthermore, in some embodiments, the relay vehicles (e.g., 1006, 1008) can comprise an on-board computer or other such computing device preconfigured to carry out some aspects of decision-making with regard to charge scheduling and route scheduling without being required to communicate independently with the computing device 100 for every routing or charging decision. Furthermore, in some embodiments, the on-board computer or other such computing device of the relay vehicles (e.g., 1006, 1008) can be capable of receiving information from one or more other vehicles (e.g., 1002a) and in some way optimizing the data packet(s) before transmitting the optimized data packet(s) to the computing device 100. In some embodiments, data packet optimization may include sampling from a signal record or signal stream, eliminating redundant data, eliminating unnecessary data, and other such means and methods for reducing the packet size and/or data complexity, thereby at least reducing the processing complexity and/or decision-making complexity for the computing device 100. For instance, if environmental conditions at or nearby the charge-receiving vehicle (e.g., 1002*a*) are above or below a pre-determined threshold and are considered sufficient, the relay vehicle(s) (e.g., 1008, 1006) or a component (e.g., on-board computer) thereof may be instructed to replace the environmental condition data with an indicate that the environmental condition was sufficient to proceed with a charge transaction, thus eliminating unnecessary data storage and processing complexity during decision-making about whether and where to route the charge-receiving vehicle (e.g., 1002*a*) and whether and where to schedule a charge transaction.

In some embodiments, the system 10 can further include a second homogenous vehicle network 104 comprising a plurality of vehicles of a single type, category, mode of transport, and/or charge transaction protocol type. In some embodiments, the first homogenous vehicle network 102 and the second homogenous vehicle network 104 can be located in different geographical locations, can be differentiated by comprising vehicles of different types, categories, modes of transport and/or charge transaction protocol types, and/or can be differentiated by other characteristics or aspects such as payment method, hierarchical level within a hierarchy of mobile entities in the system 10, or other causes, means, or reasons without limitation. In some embodiments, the differentiation between the first homogenous vehicle network 102 and the second homogenous vehicle network 104 can be at least partially arbitrary or completely arbitrary, such as by design of the system 10. In some embodiments, the differentiation between the first homogenous vehicle network 102 and the second homogenous vehicle network 104 can be based upon an efficient sorting and categorization of a larger group of mobile entities by the computing device 100, the artificial intelligence program, an algorithm, or some combination thereof.

In some embodiments in which the first and/or second homogenous vehicle networks 102, 104 comprise mobile terrestrial vehicles only, the system 10 can comprise other homogenous networks, such as a homogenous drone network 106 comprising a plurality of drones or other aerial mobile entities of a single type, category, mode of transport, and/or charge transaction protocol type. In some embodiments, the homogenous drone network 106 can be located in a different geographical location than the first homogenous vehicle network 102 and the second homogenous vehicle network 104, can be differentiated by comprising vehicles of a different type, from a different category, vehicles having different modes of transport, and/or vehicles adhering to different charge transaction protocols. In some embodiments, the homogenous drone network 106 can be differentiated from the first homogenous vehicle network 102 and the second homogenous vehicle network 104 by other characteristics or aspects such as payment method, hierarchical level within a hierarchy of mobile entities in the system 10, or other causes, means, or reasons without limitation.

In some embodiments, the system 10 can comprise a heterogeneous network 108 comprising a plurality of vehicles of two or more different vehicle types, from two or more different vehicle categories, having two or more different modes of transport, and/or adhering to two or more different charge transaction protocols. In some embodiments, the heterogeneous network 108 includes at least two of i) one or more terrestrial vehicles, ii) one or more aerial vehicles, iii) one or more aquatic vehicles, iv) one or more hybrid terrestrial/aerial vehicles, v) one or more hybrid terrestrial/aquatic vehicles, vi) one or more hybrid aerial/aquatic vehicles, vii) one or more charge vehicles, and viii) one or more charge relay vehicles.

In some embodiments, each charge transaction from one mobile entity to another can be scheduled by running an efficient (optimal, when possible) scheduling algorithm in the cloud that considers a charge distribution map and other information transmitted from the charging network (e.g., the first homogenous vehicle network 102). In some embodiments, the goal of the system 10 can be to keep the battery-operated mobile entities in a perpetual running condition. Each entity can be equipped with one or more of the following features/capabilities: (1) receiving charge from another entity (of similar or dissimilar type—e.g., a drone charging a car or vice versa while both in motion); (2) provide charge to another entity; (3) relay charge from one charge donor entity to another charge receiver entity; and (4) vehicle-to-vehicle and/or vehicle-to-cloud communication about charge transaction scheduling, route, etc.

In some embodiments, the system 10 can comprise a network of mobile battery-operated entities and the cloud, and optionally, specialized charger entities, which are capable of storing and giving large amounts of charge to other entities. In some embodiments, these charging entities (also called "charge vehicles" herein) can be dedicated charging vehicles and might not, for instance, have another primary purpose such as personal transportation, recreation, freight transport, or the like. These charging entities or units can be stationed at a stationary charge station and can be caused to move on demand to join the charging network for the purpose of increasing the overall charge into the charging network. These charging entities may provide charge to one or more of the mobile battery-powered entities, which can use the charge to replenish a corresponding battery, if needed, and additionally or alternatively can distribute some or all of the charge to other entities such that the charge is distributed based on the demand of individual entities and to increase the overall efficiency of the entire charging network. In some embodiments, the goal for the set of charge transactions in a charging network is not necessary to (or only to) maximize the charge level in the battery of the recipient car—but to achieve an optimal working level given the amount of available charge. In other words, since the system 10 employs one or more algorithms, artificial intelligence, and/or other such technologies that are generally meant to make decisions with regard to a particular goal, a goal of the system 10 itself may be to increase the total miles traversed by battery-powered vehicles in the charging network (e.g., the first homogenous vehicle network 102) without necessarily or simply optimizing a charge level of any one vehicle of the plurality of vehicles in the charging network.

For example, as illustrated in FIG. 5, a plurality of vehicles of the four groups discussed above (Group A=1002, Group B=1004, Group C=1006, and Group D=1008) are illustrated as traveling on a roadway in four parallel lanes (A, B, C, and D). According to the embodiment of FIG. 5, every vehicle in Group A (1002) is caused to charge another at least one other vehicle, while no vehicles in Groups B, C, or D (1004, 1006, or 1008) are caused to charge another vehicle. However, in some other embodiments, especially embodiments in which there are less Group A (1002) vehicles, vehicles in Group B (1004), and perhaps even Group C (1006), can be caused to charge another vehicle. In such a way, the system 10 supports a division of labor by using specialized charger entities (e.g., charger cars, charger drones, or the like) to bring in a large amount of charge from one or more charging stations to replenish the overall charge available in the charging network (e.g., the first homogenous vehicle network 102). This process essentially serves as charge "refilling" of the entire charging network. Once a select set of entities (positioned in optimal, or at least suitable, locations and having proper charge conditions) receive charge from a charger entity, they can become relay vehicles and propagate or distribute the charge to other entities in the network in a fashion that optimizes the overall efficiency of the whole system 10. In some embodiments, the entities in the charging network may be responsible for distributing the charge on-the-go to reduce or eliminate the amount of time that battery-powered mobile entities must remain stationary during a period of time due to an undesirable stationary charging activity.

Another aspect of the system 10 that is improved, at least in some embodiments, by the use of artificial intelligence-supported algorithms, is the scheduling of charge transactions for a large number of heterogeneous mobile entities when one of the following is true: i) a destination is unknown for at least a portion of the entities in the charging network, ii) at least a portion of the entities in the charging network will change their destination at some point during the time the portion of entities are active in the charging network, iii) at least a portion of the entities in the charging network will become disconnected or otherwise removed from the charging network unexpectedly, iv) at least a portion of the entities in the charging network will refuse to receive or relay a replenishing supply of electrical charge to another entity in the charging network, and v) at least a portion of the entities in the charging network will transmit to the computing device information about their location, destination, speed, battery condition, or the like that is incorrect, incomplete, or corrupted.

As such, in some embodiments, the computing device 100 can be configured to make decisions, using one or more algorithms and/or one or more artificial intelligence programs, related to an optimal route of each entity in the charging network and opportunities for charge transactions (based on entity route information, battery charge level status, nearby entities and their route information and battery charge level status, past and present traffic conditions and environmental conditions, and the like) between said entities. As discussed above in further detail, in some embodiments, the computing device 100 can generate a charge-distribution map and update the charge-distribution map in real-time or nearly real-time based on information provided by the entities in the charging network. In some embodiments, the charge-distribution map may also map congestion, if applicable, for entities along a desired route, such that the computing device 100 can balance the desire for charge transaction opportunities (which may require nearby charge-supplying entities) with route congestion and a desire for a minimized route duration (which is dependent upon choosing a path that has a sufficiently low level of congestion so as to not increase the route duration due beyond a particular threshold or more than an undesirable amount).

Figure 6:
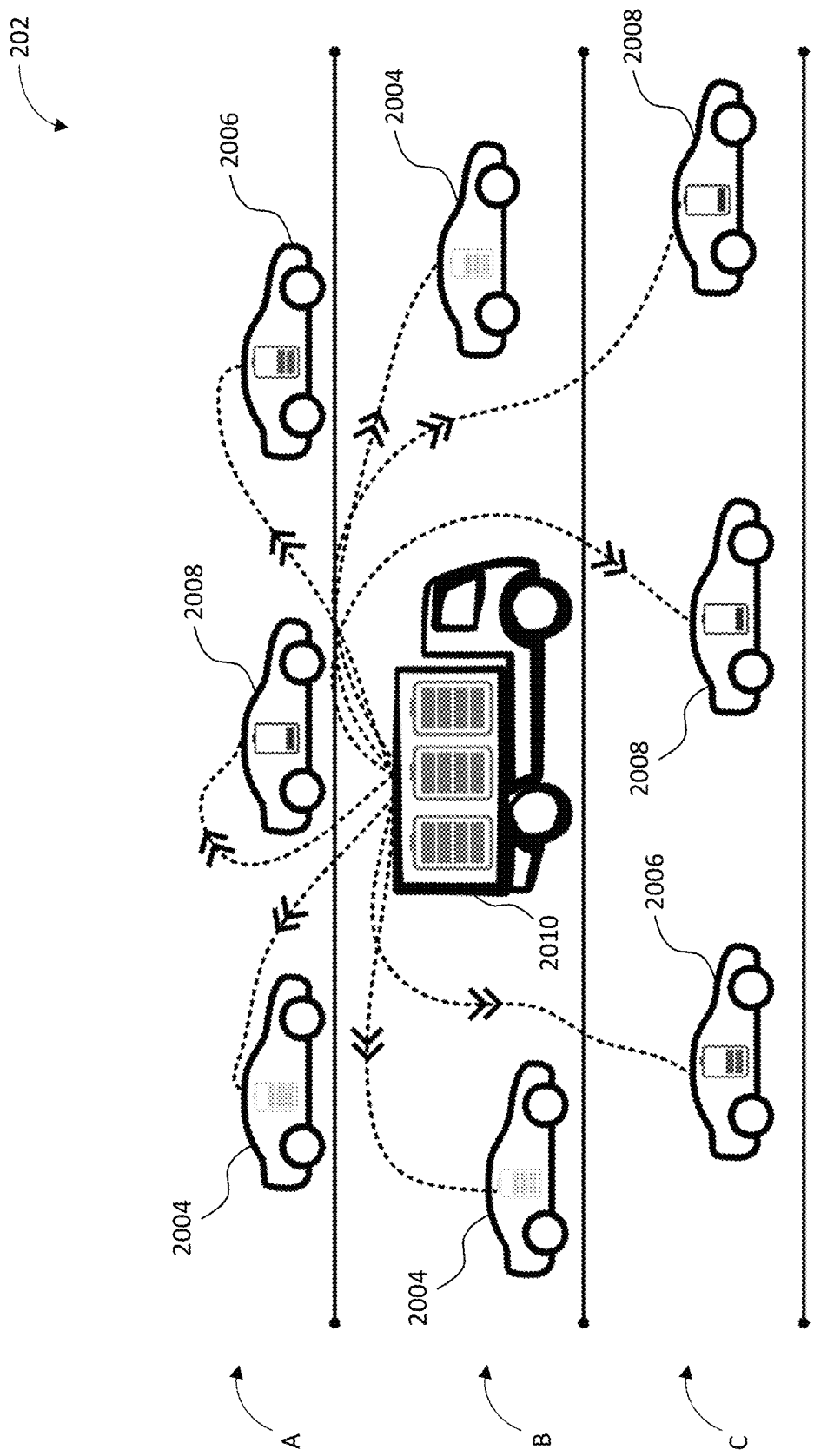
FIG. 6 provides an example of a system for on-the-go charging of entities by a mobile charging unit, according to some embodiments discussed herein.

Referring now to FIG. 6, a homogeneous charge network 202 is illustrated with several vehicles having less than a full battery charge and traveling along a roadway in parallel lanes (A, B, and C). As illustrated, the overall network charge (the sum of battery charge levels of entities in the network locality) is low. Therefore, according to the illustrated embodiment, the computing device (e.g., 100) has caused a charging entity 2010 to be deployed into the network to provide a replenishing supply of electrical charge to some or all of the entities in the homogeneous charge network 202. In some embodiments, the charging entity 2010 can have a high battery capacity and a high discharge rate such that several nearby entities with depleted battery levels can be charged at least partially simultaneously, thereby increasing the overall charge of the homogeneous charge network 202.

Figure 7:
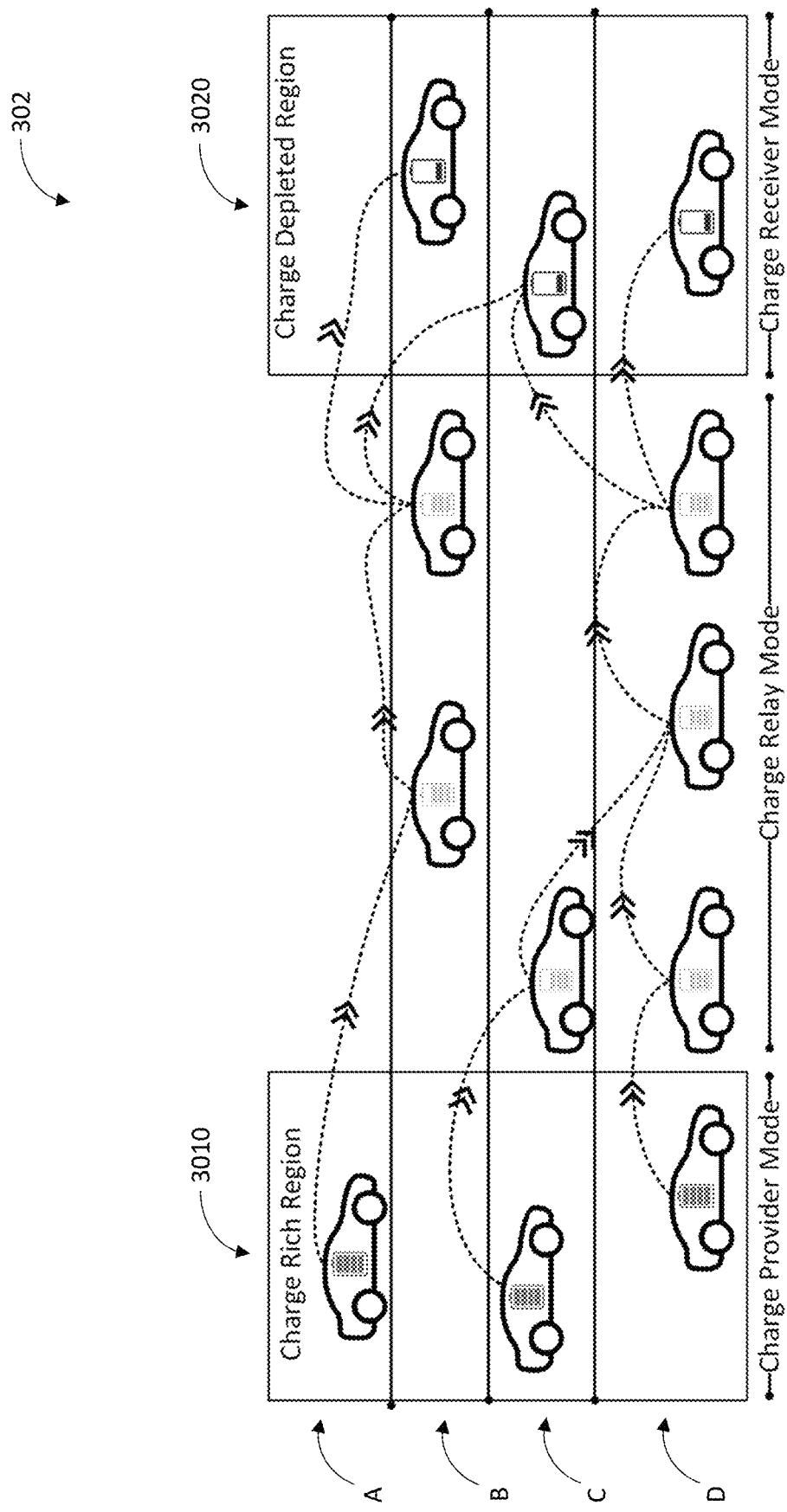
FIG. 7 provides an example of an approach for charging charge-depleted regions of a roadway by entity-to-entity relaying of charge from a charge-rich region via interstitial relay entities, according to some embodiments discussed herein.

Referring now to FIG. 7, a charge network 302 can have a charge rich region 3010 and a charge depleted region 3020 in the charge distribution map. In some embodiments, the charge rich region 3010 and the charge depleted region 3020 can be separated by one or more moderately charged vehicles, e.g., across multiple lanes of traffic (A, B, C, and D) and/or by a linear distance of roadway along the direction of travel. In such embodiments, the cloud application can decide (based on what is optimal given the network state), to relay charge from the charge rich region 3010 to the charge depleted region 3020, even though none of the mobile entities in the charge rich region 3010 are nearby the mobile entities in the charge depleted region 3020. In order to accomplish the communication of a replenishing supply of electrical charge from mobile entities in the charge rich region 3010 to mobile entities in the charge depleted region 3020, the mobile entities in the charge rich region 3010 can be caused to operate as charge-supplying entities, the mobile entities in the charge depleted region 3020 will operate as charge-receiving entities, and at least some of the mobile entities in the region between the charge rich region 3010 and the charge depleted region 3020 can be caused to relay the replenishing supply of electrical charge therebetween. In some embodiments, this approach can allow for mid-distance and even long-distance charging, can improve and even optimize travel time, and can reduce the overall charge expenditure for mobile entities in the charge network 302.

Figure 8:
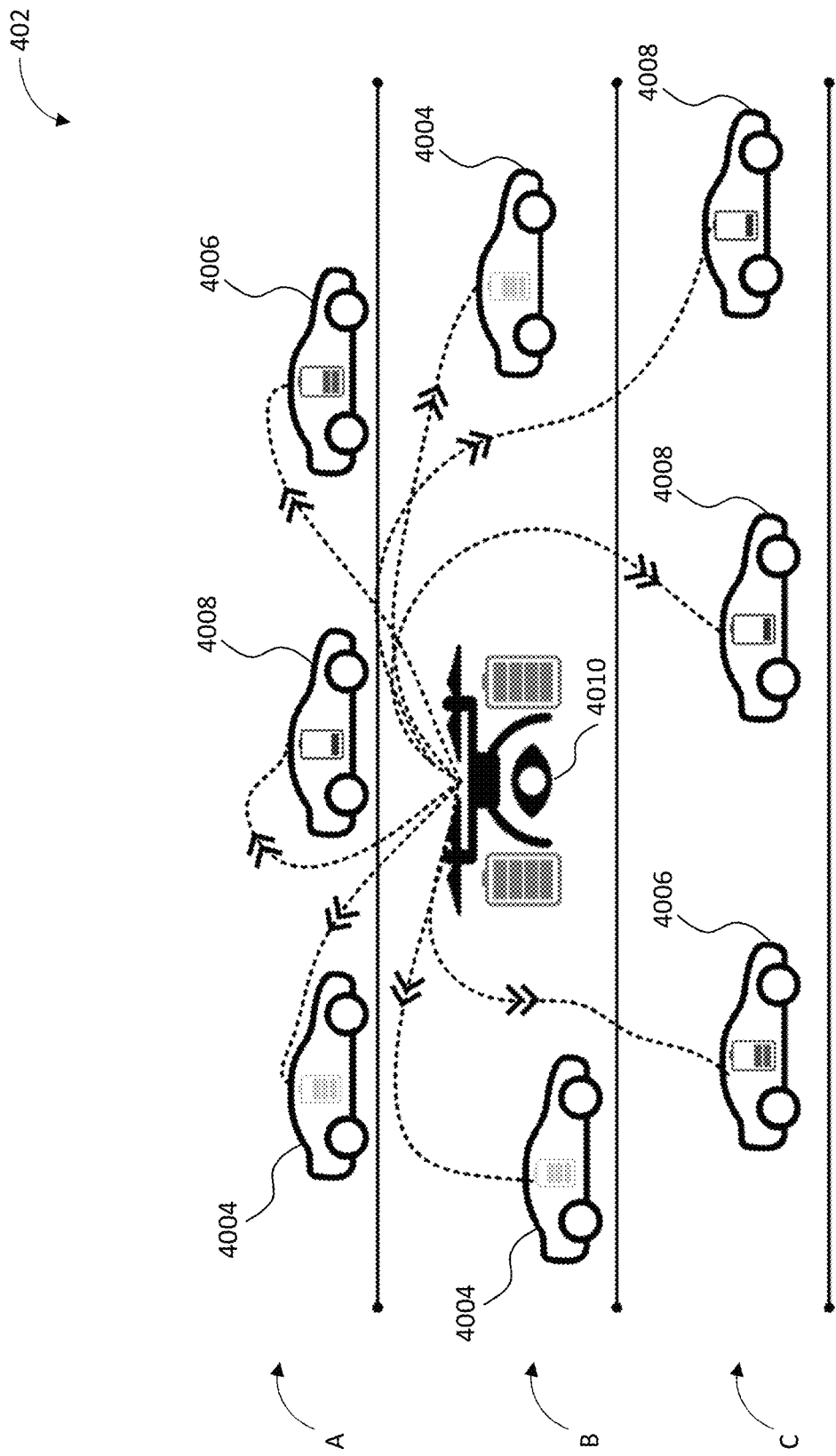
FIG. 8 provides an example of a heterogeneous network for on-the-go charging of mobile entities by an aerial charging vehicle, according to some embodiments discussed herein.

Referring now to FIG. 8, a homogeneous charge network 402 is illustrated with several vehicles having less than a full battery charge and traveling along a roadway in parallel lanes (A, B, and C). As illustrated, the overall network charge (the sum of battery charge levels of entities in the network locality) is low. Therefore, according to the illustrated embodiment, the computing device (e.g., 100) has caused a charging entity 4010 to be deployed into the network to provide a replenishing supply of electrical charge to some or all of the entities in the charge network 402. In some embodiments, the charging entity 4010 can have a high battery capacity and a high discharge rate such that several nearby entities with depleted battery levels can be charged at least partially simultaneously, thereby increasing the overall charge of the charge network 402. As illustrated, the charging entity 4010 is an aerial entity (e.g., a drone or other such unmanned aerial vehicle). Without wishing to be bound by any particular theory, the use of an aerial charging entity (e.g., the charging entity 4010) to provide a replenishing supply to the charge network 402 when it has a particularly low overall network charge or a charge depleted locality within the charge network 402 can be especially useful because aerial entities can more easily and more quickly reach any location within the charge network 402 since they can be caused to fly over, for instance, slow or stopped traffic to reach the charge depleted locality within the charge network 402.

Figure 9:
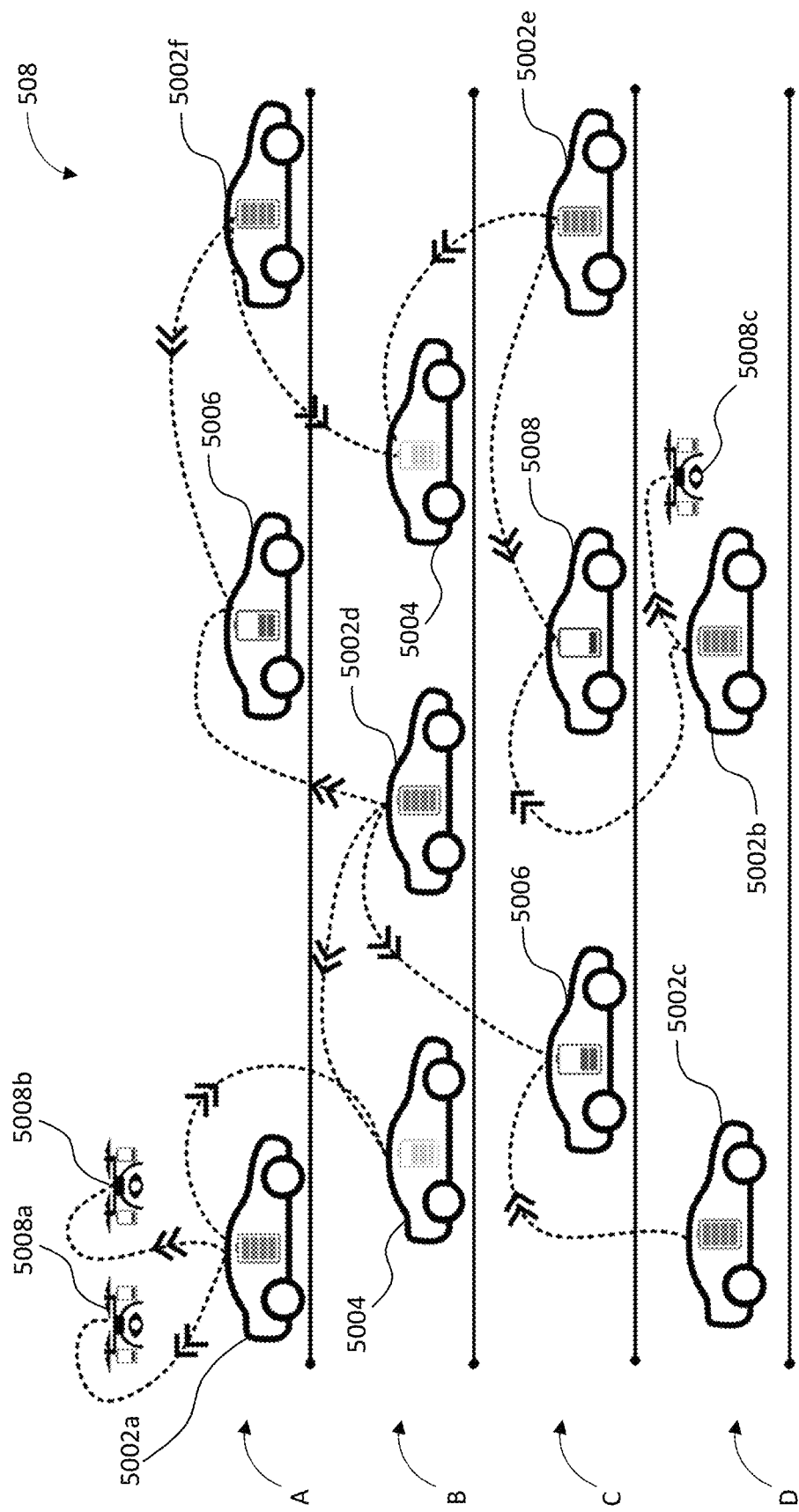
FIG. 9 provides an example of a heterogeneous network for on-the-go entity-to-entity charging between aerial and terrestrial entities, according to some embodiments discussed herein.

In a similar manner to how aerial entities can be used to quickly and easily provide a replenishing supply of electrical charge to a charge depleted locality within the charge network 402, other entities within the charge network 402 can be caused to provide a replenishing supply of electrical energy to an aerial entity with a depleted battery. Referring now to FIG. 9, a heterogeneous charge network 508 is illustrated as comprising several vehicles of different vehicle types (e.g., terrestrial vehicles, aerial vehicles, etc.), with several vehicles having less than a full battery charge and traveling along a roadway in parallel lanes (A, B, C, and D), and several vehicles traveling through the air in a route generally corresponding with the roadway. As illustrated, the overall network charge (the sum of battery charge levels of entities in the network locality) is low. Therefore, according to the illustrated embodiment, the computing device (e.g., 100) has caused mobile entities having a battery charge level corresponding to Group A (5002) to communicate a replenishing supply of electrical charge to mobile entities having a battery charge level corresponding to one of Group B (5004), Group C (5006), or Group D (5008). As illustrated, the aerial entities each part of Group D (5008) and therefore receive a replenishing supply of electrical charge from a terrestrial entity that is part of Group A (5002). In some embodiments, such terrestrial entity-to-aerial entity charging on-the-go can be accomplished by any suitable means, such as the wired or wireless methods described in more detail above. Without wishing to be bound by any particular theory, at the power densities and charge capacities currently achievable for electrochemical cells and batteries, terrestrial entities and perhaps aquatic entities can achieve a better ratio of energy use to energy conveyance than aerial entities. Therefore, in some embodiments, mobile terrestrial entities can comprise a charge transmitting element that is particularly configured and dimensioned to be releasably coupled, electrically coupled, operably coupled, or otherwise in electrical communication with one or more aerial entities for purposes of communicating a replenishing supply of electrical charge to the one or more aerial entities.

In some embodiments, once the particular details of the charge transaction are agreed upon between a charge-supplying entity (e.g., a vehicle) and a charge-receiving entity (e.g., a drone), such as with the assistance of or at the direction of the computing device (e.g., 100), the charge transaction can commence. In some embodiments, during the charge transaction, a replenishing supply of electric charge can be communicated from a charge-supplying entity (e.g., 5002a) to one or more charge-receiving entities (e.g., 5008a, 5008b). In some embodiments, the replenishing supply of electric charge can be communicated to the charge-receiving entity by a wired electrical coupling of the charge-supplying entity and the charge-receiving entity. In some embodiments, the charge-receiving entity can comprise a charge receiving element configured to be removably and electrically coupled to a charge transmitting element of the charge-supplying entity. In some embodiments, the charge transmitting element can be positioned on a roof or a side of the charge-supplying entity (e.g., 5002a, 5002b) such that the charge-receiving entities (e.g., 5008a, 5008b, and 5008c) can be caused to be positioned nearby or on the charge-supplying entity such that the charge transmitting element and the charge receiving element can be suitably electrically coupled. In some embodiments, during regular operation of the charge-receiving entity, the charge receiving element can be configured to be retained within the charge-receiving entity, while the charge receiving element can be configured to be extended from the charge-receiving entity during a charge transaction so as to be coupled with the charge transmitting element of the charge-supplying entity. In some embodiments, the charge-receiving entity can have a charge receiving port that is not configured to be extended from the charge-receiving entity during a charge transaction, while the charge-supplying entity can be configured to extend the charge transmitting element to establish and maintain electrical communication between the charge transmitting element and the charge receiving port of the charge-receiving entity. In some embodiments, the charge receiving element of the charge-receiving entity can be configured to be extended out from the charge-receiving entity to establish and maintain electrical communication between the charge receiving element and a charge transmitting port of the charge-suppling entity, the charge transmitting port being stationary with regard to the charge-supplying entity during a charge transaction.

In some embodiments, the replenishing supply of electrical charge can be communicated to the charge-receiving entity by a wireless electrical coupling of the charge-supplying entity and the charge-receiving entity. In some embodiments, the replenishing supply of electrical charge can be communicated by a combination of a wired and a wireless electrical coupling of the charge-supplying entity and the charge-receiving entity. In some embodiments, the charge-receiving entity can comprise a wireless charging receiver and the charge-supplying entity can comprise a wireless charging transceiver. In some embodiments, the wireless charging receiver of the charge-receiving entity can be configured to receive the replenishing supply of electrical charge from the wireless charging transceiver of the charge-supplying entity, according to any suitable mechanism or protocol. Without wishing to be bound by any particular theory, the charge-receiving entity can be configured to receive the replenishing supply of electrical charge from the wireless charging transceiver of the charge-supplying entity by magnetic resonant coupling therebetween. Alternatively, without wishing to be bound by any particular theory, the charge-receiving entity can be configured to receive the replenishing supply of electrical charge from the wireless charging transceiver of the charge-supplying entity by tightly-coupled electromagnetic inductive or non-radiative charging. Alternatively, without wishing to be bound by any particular theory, the charge-receiving entity can be configured to receive the replenishing supply of electrical charge from the wireless charging transceiver of the charge-supplying entity by loosely-coupled or radiative electromagnetic resonant charging. Alternatively, without wishing to be bound by any particular theory, the charge-receiving entity can be configured to receive the replenishing supply of electrical charge from the wireless charging transceiver of the charge-supplying entity by uncoupled radio frequency wireless charging. Any and all other suitable wireless charging technologies, protocols, methods, approaches, systems, devices, and phenomena are contemplated herein and are hereby considered within the scope of this disclosure. In some embodiments, a proximity less than a pre-determined wireless charging proximity should be maintained between the charge-receiving entity and the charge-supplying entity for the duration of the charge transaction in order to maintain a wireless charging connection therebetween.

In some embodiments, depending upon the type and charging protocol of wireless charging device or system used, the pre-determined wireless charging proximity can be between about zero meters and about 20 meters, about 0.001 meters and about 20 meters, about 0.001 meters and about 19 meters, about 0.001 meters and about 18 meters, about 0.001 meters and about 17 meters, about 0.001 meters and about 16 meters, about 0.001 meters and about 15 meters, about 0.001 meters and about 14 meters, about 0.001 meters and about 13 meters, about 0.001 meters and about 12 meters, about 0.001 meters and about 11 meters, about 0.001 meters and about 10 meters, about 0.001 meters and about 9 meters, about 0.001 meters and about 8 meters, about 0.001 meters and about 7 meters, about 0.001 meters and about 6 meters, about 0.001 meters and about 5 meters, about 0.001 meters and about 4 meters, about 0.001 meters and about 3 meters, about 0.001 meters and about 2 meters, about 0.001 meters and about 1 meter, about 0.001 meters and about 0.5 meters, about 0.001 meters and about 0.25 meters, about 0.001 meters and about 0.1 meters, about 0.001 meters and about 0.01 meters, about 0.01 meters and about 5 meters about 0.02 meters and about 4 meters, about 0.03 meters and about 3 meters, about 0.04 meters and about 2 meters, about 0.05 meters and about 1 meter, about 0.002 meters and about 5 meters, about 0.003 meters and about 5 meters, about 0.003 meters and about 5 meters, about 0.004 meters and about 5 meters, about 0.005 meters and about 5 meters, about 0.006 meters and about 5 meters, about 0.007 meters and about 5 meters, about 0.008 meters and about 5 meters, about 0.009 meters and about 5 meters, or about 0.01 meters and about 5 meters, inclusive of all values and ranges therebetween. In some embodiments, depending upon the type and charging protocol of wireless charging device or system used, the pre-determined wireless charging proximity can be less than about 20 meters, about 19 meters, about 18 meters, about 17 meters, about 16 meters, about 15 meters, about 14 meters, about 13 meters, about 12 meters, about 11 meters, about 9 meters, about 8 meters, about 7 meters, about 6 meters, about 5 meters, about 4 meters, about 3 meters, about 2 meters, about 1 meter, about 0.5 meters, about 0.25 meters, about 0.1 meters, less than about 0.05 meters, less than about 0.01 meters, or less than about 0.001 meters, inclusive of all values and ranges therebetween. In some embodiments, depending upon the type and charging protocol of wireless charging device or system used, the pre-determined wireless charging proximity can be greater than about zero meters, about 0.001 meters, about 0.002 meters, about 0.003 meters, about 0.004 meters, about 0.005 meters, about 0.006 meters, about 0.007 meters, about 0.008 meters, about 0.009 meters, about 0.01 meters, about 0.02 meters, about 0.03 meters, about 0.04 meters, about 0.05 meters, about 0.06 meters, about 0.07 meters, about 0.08 meters, about 0.09 meters, about 0.1 meters, about 0.2 meters, about 0.3 meters, about 0.4 meters, about 0.5 meters, about 0.6 meters, about 0.7 meters, about 0.8 meters, about 0.9 meters, about 1 meter, about 1.25 meters, about 1.5 meters, about 1.75 meters, about 2 meters, about 2.25 meters, about 2.5 meters, about 2.75 meters, about 3 meters, about 3.25 meters, about 3.5 meters, about 3.75 meters, about 4 meters, about 4.25 meters, about 4.5 meters, about 4.75 meters, about 5 meters, about 6 meters, about 7 meters, about 8 meters, about 9 meters, about 10 meters, about 11 meters, about 12 meters, about 13 meters, about 14 meters, about 15 meters, about 16 meters, about 17 meters, about 18 meters, about 19 meters, or greater than about 20 meters, inclusive of all values and ranges therebetween. In some embodiments, when two mobile battery-powered entities are within the pre-determined wireless charging proximity, the two entities may be authorized for wireless charging and instructions can be provided (e.g., from an artificial intelligence program in a cloud computing environment) regarding speed, route, and other considerations such that the two entities remain within the pre-determined wireless charging proximity during the wireless charge transfer event. In some embodiments, such as when the planned or prescribed route for the two entities coincides for a sufficiently long stretch of road, the two entities may be instructed to carry out wired charge transfer. In some embodiments, when wired charge transfer is optimal, the two entities can be provided with wired charge transfer instructions and instructions can be provided (e.g., from an artificial intelligence program in a cloud computing environment) regarding speed, route, and other considerations such that wired charge transfer can be carried out for the two particular entities based on the mechanism and/or devices used for wired charge transfer therebetween. A non-limiting discussion of one exemplary charge transfer approach is described in more detail below, however many suitable approaches or mechanisms for charge transfer is contemplated, such as a retracting/articulating charge transfer arm, a fixed contact plate, a trailing charging cable, a launched charging cable, and/or the like.

Figure 10:
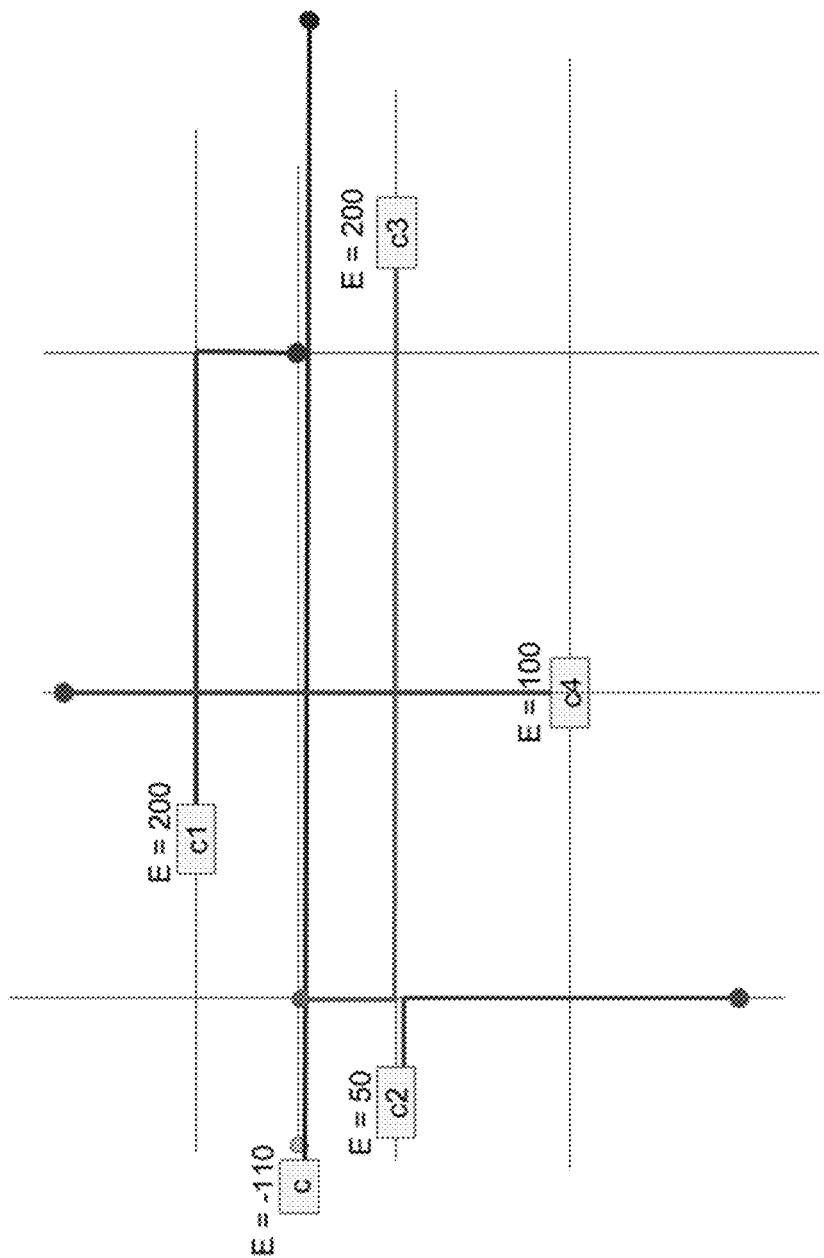
FIG. 10 provides an example of a fine-grained routing and charging transaction schedule before cloud application optimization, according to some embodiments discussed herein.

Referring now to FIGS. 10-15, a set of particular localities of a charge network (e.g., 203) are illustrated. As illustrated in FIG. 10, a plurality of mobile entities (c, c1, c2, c3 and c4) are in motion within a particular locality, each mobile entity having a particular destination. As illustrated, E represents the amount of charge the entities will be left with after completing their respective trips. A negative E value indicates that the corresponding entity will likely require additional charge to finish the desired trip, while a positive E value indicates that the corresponding entity will have surplus charge after making the desired trip.

As discussed above, a charge-distribution map and route planning map, such as illustrated in FIGS. 10-15, can be used by a computing device (e.g., for instance a computing device comprising a processor, a memory device including specialized computer program code, a route planning algorithm, a charge transaction scheduling algorithm, and/or an artificial intelligence program) to track and schedule trip routes and charge transactions for a particular locality of a charge network and/or the charge network in full.

Figure 11:
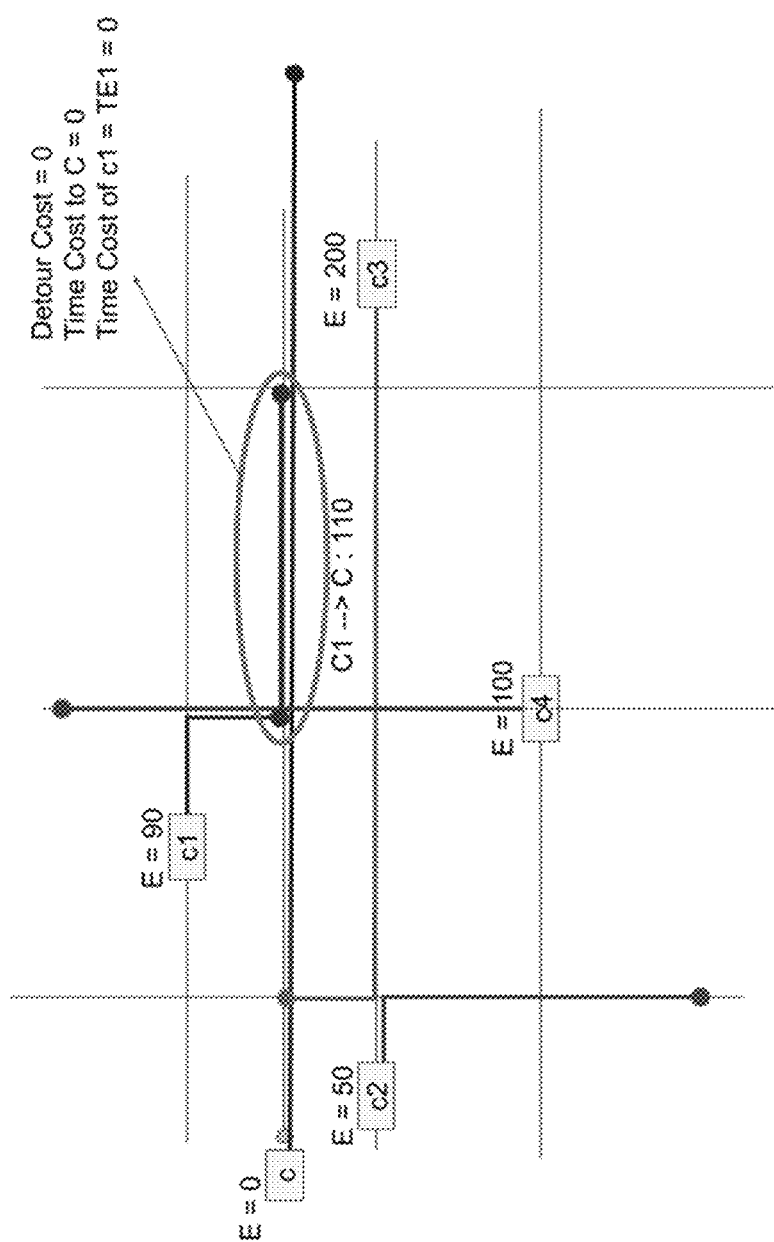
FIG. 11 provides an example of a fine-grained routing and charging transaction schedule after cloud application optimization, according to some embodiments discussed herein.

As illustrated in FIG. 10, entity c, will likely require an additional 110 units of charge to complete the desired trip, however a surplus of charge is expected for each of entity c1, entity c2, entity c3, and entity c4 at the end of the corresponding desired trip, as currently planned. As illustrated in FIG. 11, the computing device, with the assistance of specialized computer programs such as the route planning algorithm, the charge transaction scheduling algorithm, and/or the artificial intelligence program, suggests re-routing entity c1 to align the new route of entity c1 with the existing route of entity c and scheduling a charge transaction between entity c and entity c1 for during the period of time when the trip routes of entity c1 and entity c align. By re-routing c1 and scheduling a charge transaction between entity c1 and entity c, entity c is able to complete the desired trip, without compromising the ability of entity c1 to complete its desired trip, and without disturbing or re-routing the other entities in the locality. In addition, the computing device is configured to optimize the overall charge usage and travel time for all involved entities, meaning that c1 was not chosen at random as the entity to re-route, but rather that all possible or many of the possible re-routing options were considered in real-time or near real-time by the computing device and the optimal re-routing scenario in terms of overall charge use and travel time was chosen. In this particular example, the computing device was able to re-route only one entity (entity c1) and there was no resulting waste of time or electrical charge based on the re-routing of entity c1.

Figure 12:
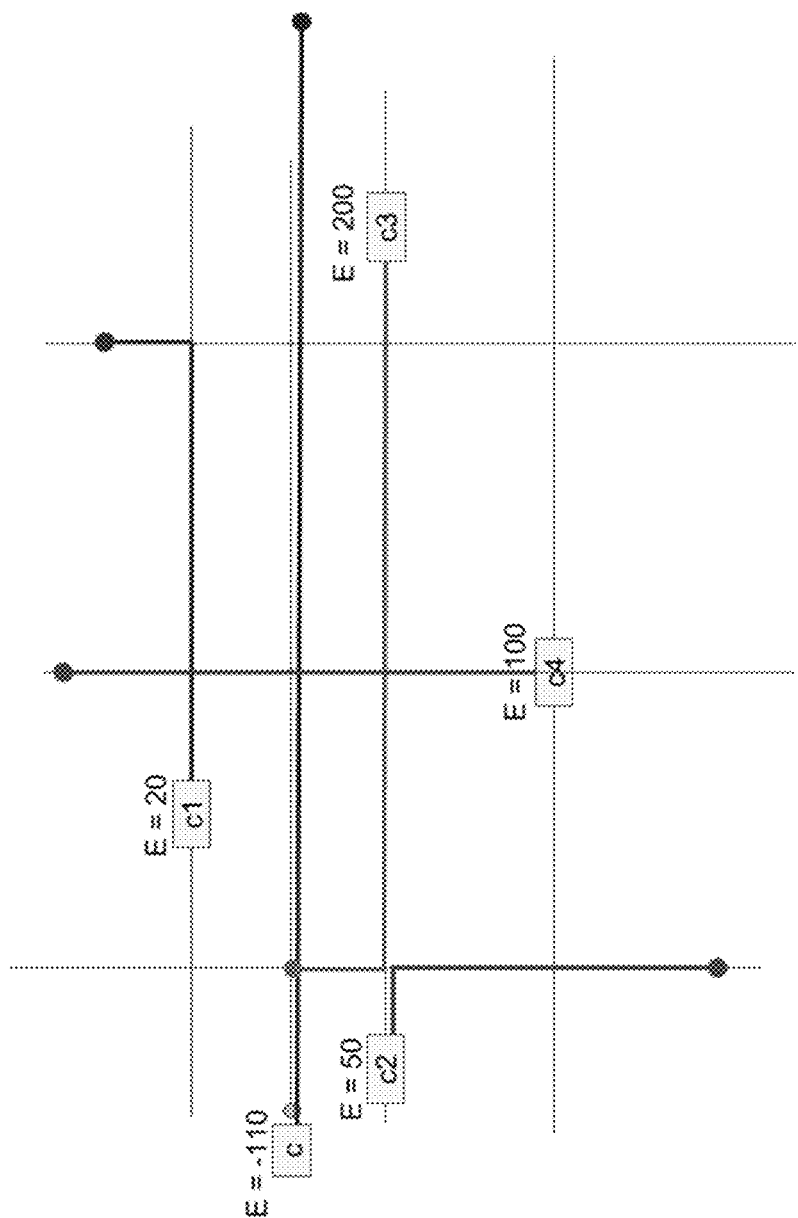
FIG. 12 provides an example of a fine-grained routing and charging transaction schedule before cloud optimization, according to some embodiments discussed herein.
Figure 13:
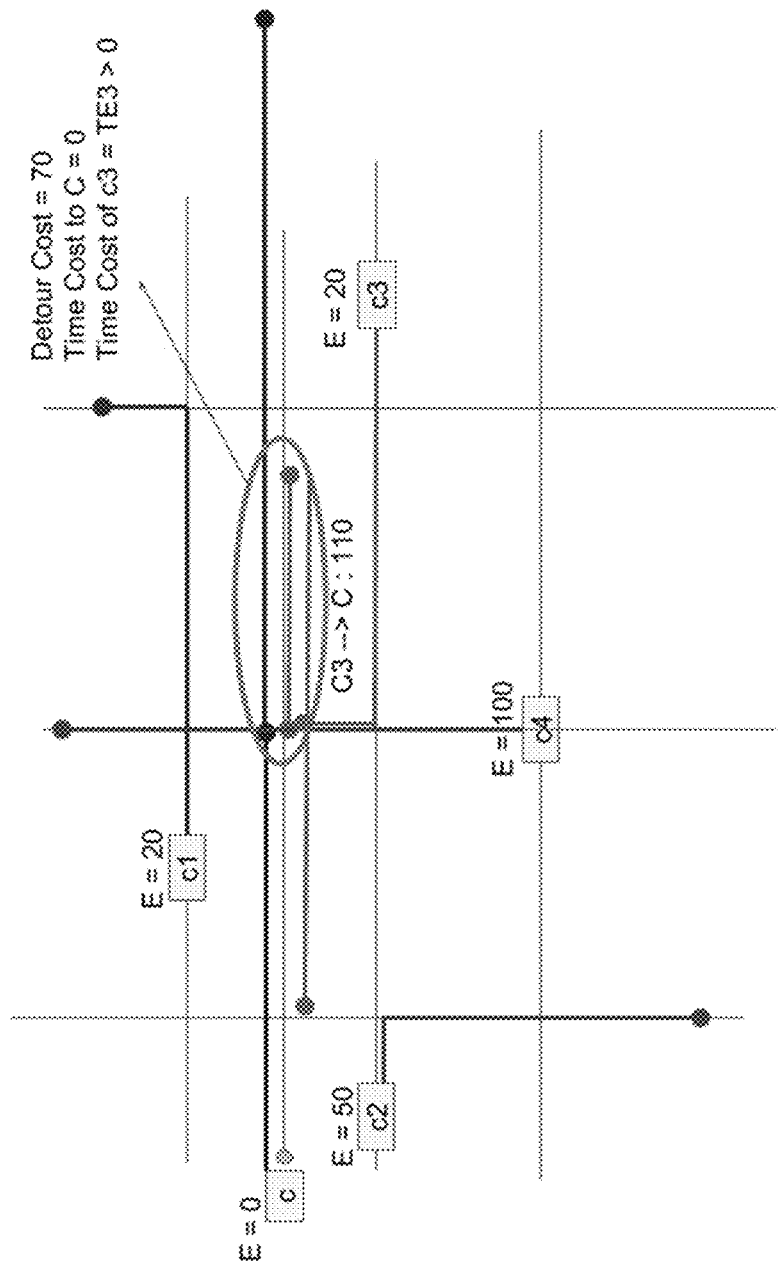
FIG. 13 provides an example of a fine-grained routing and charging transaction schedule after cloud optimization, according to some embodiments discussed herein.

In another example, as illustrated in FIG. 12, it is noted that entity c will likely require an additional 110 units of charge to complete the desired trip, however a surplus of charge is expected for each of entity c1, entity c2, entity c3, and entity c4 at the end of each corresponding desired trip, as currently planned. As illustrated in FIG. 13, the computing device, with the assistance of specialized computer programs such as the route planning algorithm, the charge transaction scheduling algorithm, and/or the artificial intelligence program, suggests re-routing entity c3 to align the new route of entity c3 with the existing route of entity c and scheduling a charge transaction between entity c and entity c3 for during the period of time when the trip routes of entity c3 and entity c align. By re-routing c3 and scheduling a charge transaction between entity c3 and entity c, entity c is able to complete the desired trip, without compromising the ability of entity c3 to complete its desired trip, and without disturbing or re-routing the other entities in the locality. In addition, the computing device is configured to optimize the overall charge usage and travel time for all involved entities, meaning that c3 was not chosen at random as the entity to re-route, but rather that all possible or many of the possible re-routing options were considered in real-time or near real-time by the computing device and the optimal re-routing scenario in terms of overall charge use and travel time was chosen. In this particular example, the computing device was able to re-route only one entity (entity c3) and, while there was an increase in the trip duration for entity c3 and a small loss of electrical charge based on the re-routing of entity c3, it was the optimal schedule in that the least number of entities experienced a loss of charge and the least number of entities experienced the smallest increase in trip duration.

Figure 14:
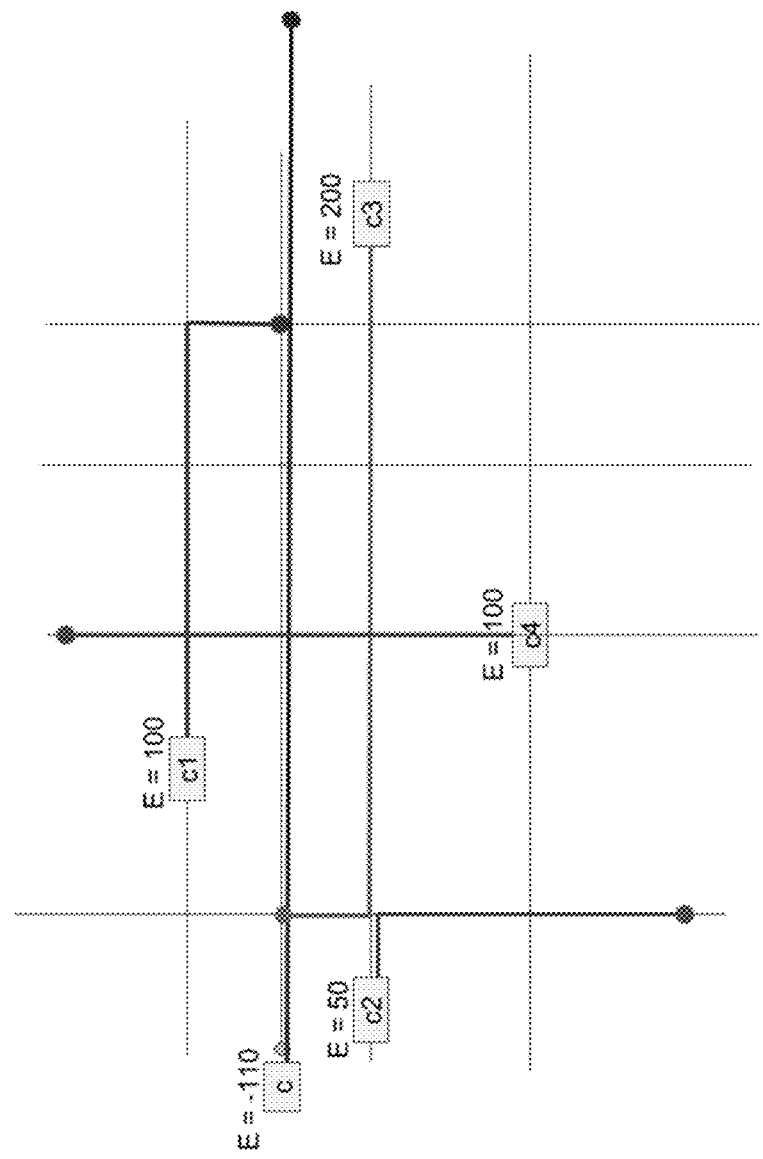
FIG. 14 provides an example of a fine-grained routing and charging transaction schedule before cloud optimization, according to some embodiments discussed herein.
Figure 15:
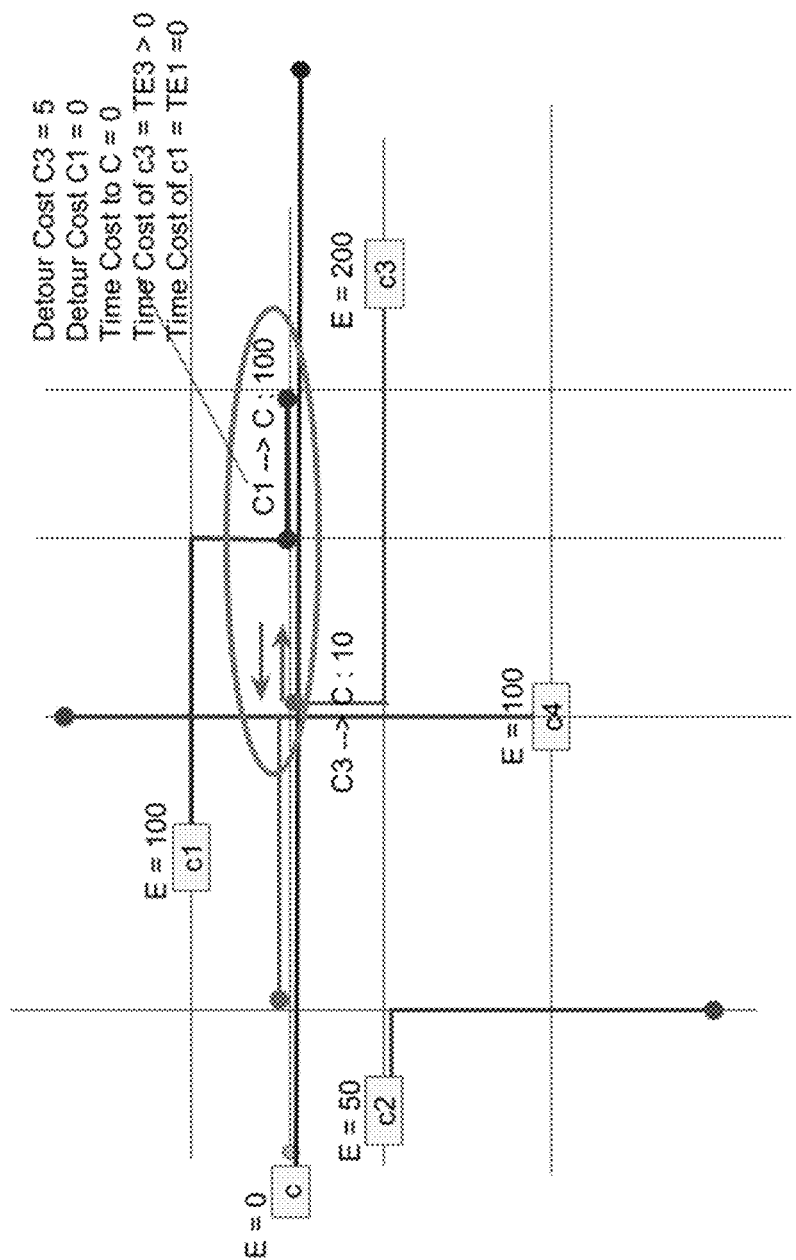
FIG. 15 provides an example of a fine-grained routing and charging transaction schedule after cloud optimization, according to some embodiments discussed herein.

In another example, as illustrated in FIG. 14, it is noted that entity c will likely require an additional 110 units of charge to complete the desired trip, however a surplus of charge is expected for each of entity c1, entity c2, entity c3, and entity c4 at the end of each corresponding desired trip, as currently planned. As illustrated in FIG. 15, the computing device, with the assistance of specialized computer programs such as the route planning algorithm, the charge transaction scheduling algorithm, and/or the artificial intelligence program, suggests re-routing entity c3 and c1 to align a portion of the new route of entity c3 with a portion of the existing route of entity c and a portion of the new route of entity c1 with another portion of the existing route of entity c, the computing device scheduling a first charge transaction between entity c and entity c3 for during the period of time when the trip routes of entity c3 and entity c align and a second charge transaction between entity c and entity c1 for during the period of time when the trip routes of entity c1 and entity c align. By re-routing entities c3 and c1, and by scheduling a first charge transaction between entity c3 and c and a second charge transaction between entity c1 and c, entity c is able to complete the desired trip, without compromising the ability of entity c3 or entity c1 to complete their desired trips, and without disturbing or re-routing the other entities in the locality. In addition, the computing device is configured to optimize the overall charge usage and travel time for all involved entities, meaning that c3 and c1 were not chosen at random as the entities to re-route, but rather that all possible or many of the possible re-routing options were considered in real-time or near real-time by the computing device and the optimal re-routing scenario in terms of overall charge use and travel time was chosen. In this particular example, the computing device was able to re-route only two entities (entity c3 and entity c1) and, while there was an increase in the trip duration for entity c3 and a small loss of electrical charge based on the re-routing of entity c3, there was no loss of charge to entity c1 nor an increase in the trip duration based on the re-routing of entity c1. As illustrated, the proposed route and charge transaction schedule for the particular situation presented at the particular locality was optimized by the computing device in that the least number of entities experienced a loss of charge and the least number of entities experienced the smallest increase in trip duration.

Figure 16:
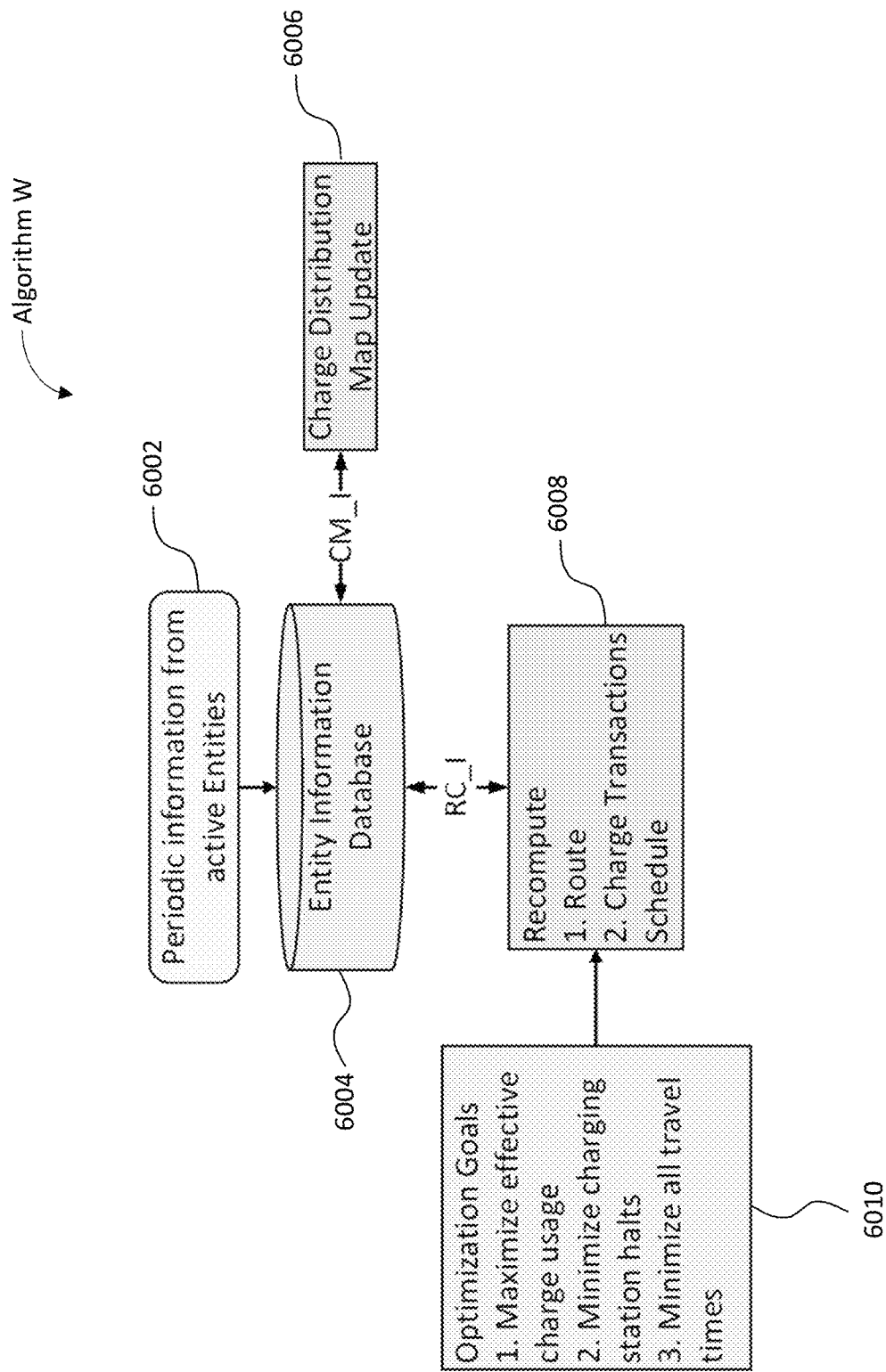
FIG. 16 provides an example of a charge scheduling algorithm, according to some embodiments discussed herein.
Figure 17:
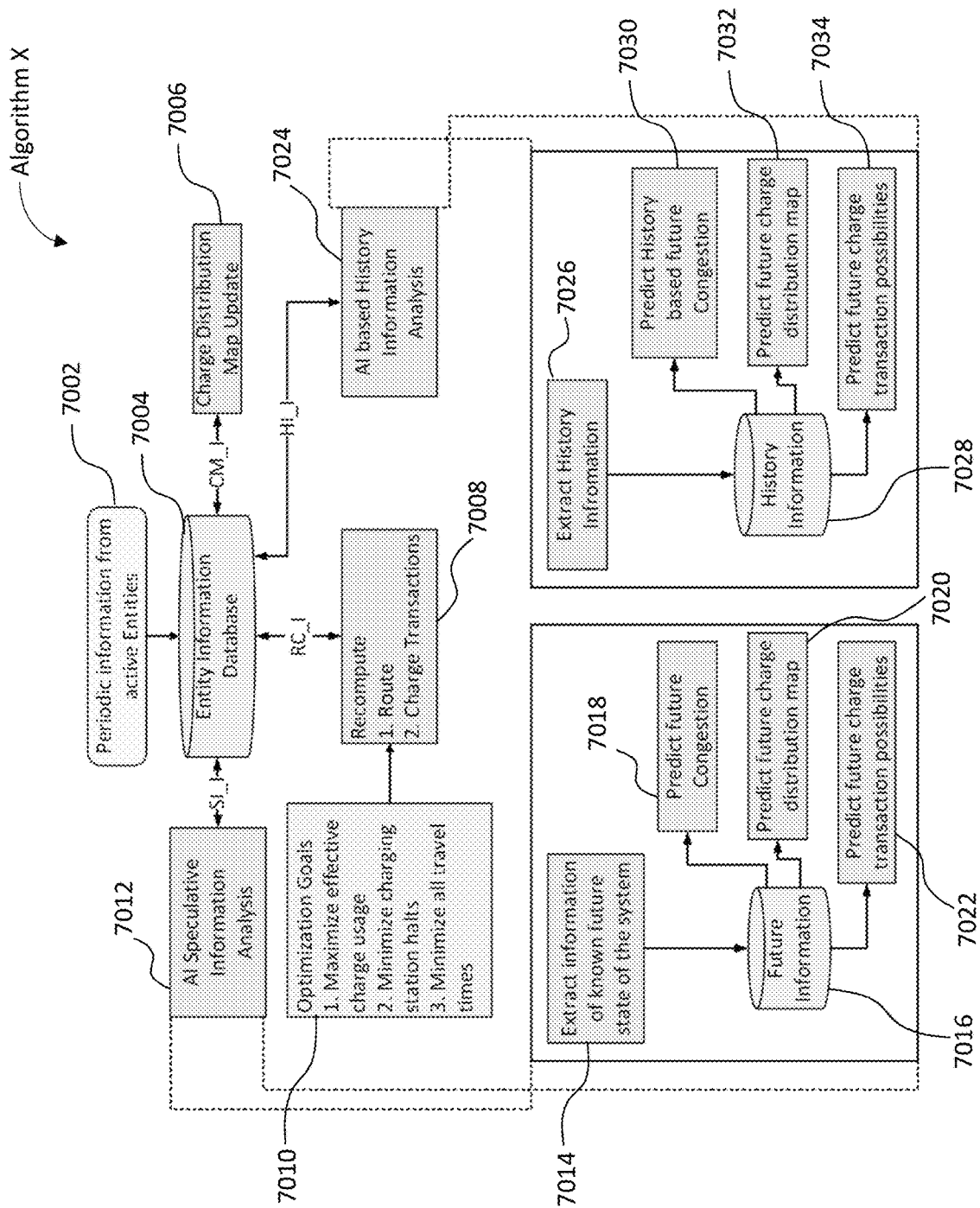
FIG. 17 provides an example of a charge scheduling algorithm, according to some embodiments discussed herein.
Figure 18:
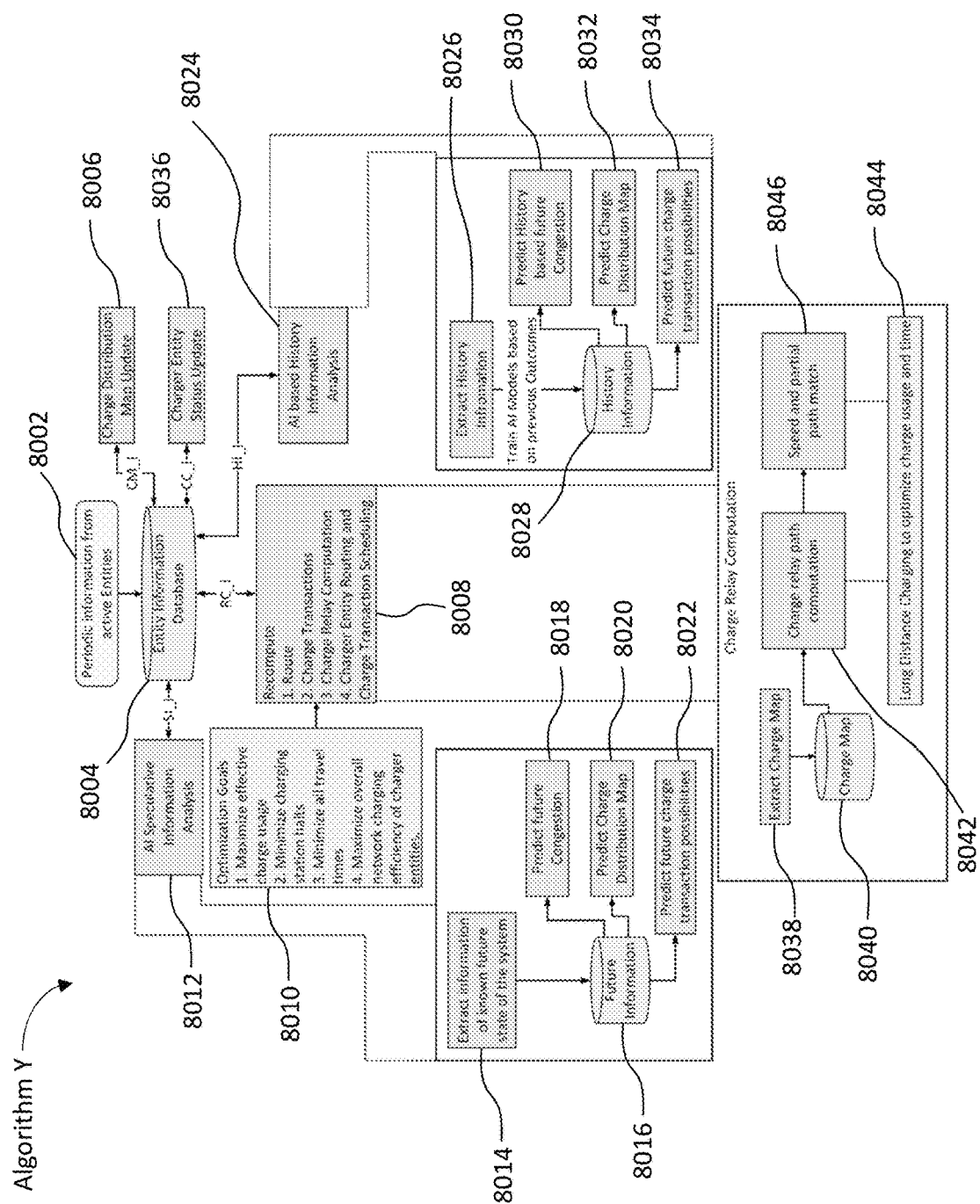
FIG. 18 provides an example of a charge scheduling algorithm, according to some embodiments discussed herein.

Turning now to the algorithmic decision-making process and to discussion of at least some of the algorithms considered herein, a general overview of some of the features of three example algorithms is provided in Table 1 and illustrated in FIGS. 16-18. Algorithms 1, 2, and 3 represent scheduling and routing algorithms with varying levels of complexity, each of which are useful for decision-making with regard to the complex task of planning a large number of entity routes and charge transactions for a charge network, such as described herein.

TABLE 1

Select features of three of the algorithms considered for use in the systems and methods described herein.

| Features | Algorithm-1 | Algorithm-2 | Algorithm-3 |
|---|---|---|---|
| Charge Distribution Map | X | X | X |
| Optimized Routing | X | X | X |
| Optimized Transaction Scheduling | X | X | X |
| Speculative Information Incorporation | | X | X |
| History Information Incorporation | | X | X |
| Relay Charging | | | X |

As with many goal-oriented or goal-directed processes and models, the particular charge scheduling and routing algorithms identified as Algorithm W, Algorithm X, and Algorithm Y in Table 1 each have optimization goals which include i) maximizing effective charge usage, ii) minimize the number and the duration of stops required by entities for charging at stationary charging stations, and iii) minimize all travel times for entities in the charge network. The three algorithms presented here and discussed in further detail below are provided for purposes of example and illustration only and are in no way intended to limit the scope of the present disclosure.

As illustrated in FIG. 16, Algorithm W, which is the least complex algorithm from among the three discussed herein, can be used by a computing device to generate and maintain a charge-distribution map and can be used to iteratively update, or update in real time, the charge-distribution map based on information about the current status of entities in the charge network to re-route entities as necessary and to schedule charge transactions. In some embodiments, periodic information from the vehicles/entities 6002 is sent to the computing device (e.g., a cloud application) and are stored in an Entity Information Database 6004. In some embodiments, with a periodicity of CM_I, an updated charge distribution map 6006 is generated and stored in the Entity Information Database 6004. In some embodiments, the Entity Information Database 6004 can contain some or all of the information used for routing and charge transaction scheduling. In some embodiments, with a periodicity of RC_I, routing and charge scheduling 6008 is performed for the network based upon pre-determined optimization goals 6010.

As illustrated in FIG. 17, Algorithm X, which is more complex than Algorithm W and which provides the additional features of speculative information incorporation and historic information incorporation, also arguably provides, at least in some embodiments, a more optimized charge network with regard to the optimization goals. In some embodiments, the computing device can use Algorithm X to generate and maintain a charge-distribution map and can be used to iteratively update, or update in real time, the charge-distribution map based on information about the current status of entities in the charge network to re-route entities as necessary and to schedule charge transactions. In some embodiments, periodic information from the vehicles/entities 7002 in the charge network is sent to the computing device (e.g., a cloud application) and they are stored in an Entity Information Database 7004. In some embodiments, with a periodicity of CM_I, an updated charge distribution map 7006 is generated and stored in the Entity Information Database 7004. In some embodiments, with a periodicity of SI_I, a speculative analysis 7012 is performed based on information obtained regarding future travel plans, weather forecast, traffic forecast, etc., as well as extracted information about a known future station of the system 7014. The algorithm employs artificial intelligence, such as machine learning, to predict future information 7016 about different aspects of the network, including, but is not limited to, predicting future congestion 7018, predicting future charge distribution map 7020, and predicting future charge transaction possibilities 7022. This information is computed and stored in the Entity Information Database 7004. In some embodiments, the algorithm is capable of, with a periodicity of HI_I, performing a history information analysis 7024 based on extracted historic information 7026 that is compiled into history information 7028. In some embodiments, an artificial intelligence program uses Algorithm X to make certain predictions based upon the history information 7028, including, but is not limited to, predicting congestion 7030, predicting the future charge distribution map 7032, and predicting future charge transaction possibilities 7034. In some embodiments, some or all of the information needed by the artificial intelligence, produced by the artificial intelligence, needed by Algorithm X, and/or produced by Algorithm X may be stored in the Entity Information Database. In some embodiments, with a periodicity of RC_I, routing and charge scheduling 7008 is performed for the network based upon the pre-determined optimization goals 7010.

As illustrated in FIG. 18, Algorithm Y, which is more complex than Algorithms 1 or 2, and which provides the additional features of speculative information incorporation, historic information incorporation, and relay charging, also arguably provides, at least in some embodiments, a more optimized charge network with regard to the optimization goals. In some embodiments, the computing device can use Algorithm Y to generate and maintain a charge-distribution map and can be used to iteratively update, or update in real time, the charge-distribution map based on information about the current status of entities in the charge network to re-route entities as necessary and to schedule charge transactions. In some embodiments, periodic information from the vehicles/entities 8002 in the charge network is sent to the computing device (e.g., a cloud application) and they are stored in an Entity Information Database 8004. In some embodiments, with a periodicity of CM_I, an updated charge distribution map 8006 is generated and stored in the Entity Information Database 8004. In some embodiments, with a periodicity of SI_I, a speculative analysis 8012 is performed based on information obtained regarding future travel plans, weather forecast, traffic forecast, etc., as well as extracted information about a known future station of the system 8014. The algorithm employs artificial intelligence to predict future information 8016 about different aspects of the network, including, but is not limited to, predicting future congestion 8018, predicting future charge distribution map 8020, and predicting future charge transaction possibilities 8022. This information is computed and stored in the Entity Information Database 8004. In some embodiments, the algorithm is capable of, with a periodicity of HI_I, performing a history information analysis 8024 based on extracted historic information 8026 that is compiled into history information 8028. In some embodiments, an artificial intelligence program uses Algorithm Y to make certain predictions based upon the history information 8028, including, but is not limited to, predicting congestion 8030, predicting the future charge distribution map 8032, and predicting future charge transaction possibilities 8034. In some embodiments, a status of all charger entities 8036 is then processed and stored in the Entity Information Database 8004. If the computing device decides to set up a relay charge sharing scenario between two localities or zones of the network, the relay setup, the computing device deploys the charging entities and optimizes the route and scheduled charge transactions therefore. To do so, the computing device uses an extracted charge map 8038 to generate a charge map 8040 of the current status and location of charging entities. To boost the overall charge in the network, the computing device uses artificial intelligence and Algorithm Y to compute a charge relay path 8042 from a charge rich region to a charge depleted region based upon long distance charging scenarios to optimize charge usage and minimize trip delays 8044. The computing device then determines the best speed and at least partial path match 8046 for the charging entity such that the relay connection is maintained. In some embodiments, some or all the information needed by the artificial intelligence, produced by the artificial intelligence, needed by Algorithm Y, and/or produced by Algorithm Y may be stored in the Entity Information Database 8004. In some embodiments, with a periodicity of RC_I, routing and charge scheduling 8008 is performed for the network based upon the pre-determined optimization goals 8010.

In some embodiments, the number and types of units in a network can dynamically change, e.g., a network at a specific instant of time may consist of n units which are only capable of receiving cars, m units of which are capable of just providing charge and p units which can do both as well as relaying charge (optionally). In some embodiments, the types of the units may vary in terms of their type of motion, e.g., a network may consist of n number of cars and m number of drones. In some embodiments, a charge transaction can occur between two different networks. Assume, for instance, that one network of units is owned by a specific company or organization and another network is owned by a different company or organization. In an event that there are several networks (each with dynamically varying number and types of units), then charge can be shared across networks based on pre-negotiated or real-time online negotiations on charge transfer rate and other parameters. Hence, both intra- and inter-network charge transfers are possible. Both inter and inter-network charge transactions can be fully autonomous, based on the algorithms described above or variants thereof, and based on the requisite information on the locations of units, charge distribution map, etc.

In some embodiments, approaches described herein and algorithms described herein can be operable to charge battery-powered entities both within and between charge networks. For instance, excess charge can be transmitted from a first charge network to a second charge network upon determining that the second charge network is a charge-depleted network relative to the first charge network and/or that the first charge network has excess charge. In some embodiments, an algorithm such as described above, can be used for charge transaction scheduling and/or route scheduling within and between a plurality of charge networks. In some embodiments, a computing device, such as a cloud application, computing network, server, or the like, can be used to apply such an algorithm to schedule a charge transaction between the first charge network and the second charge network.

In some embodiments, a scheduler may use an algorithm and/or a charge distribution map to determine where to allocate charge, either by peer-to-peer charging or charging via MoCS. The scheduler may operate according to a set of optimization goals, which guide the scheduler in determining an optimal distribution of charge throughout an EV fleet. In some embodiments, while computing various EV routes, rerouting EVs as necessary, determining a spatiotemporal schedule for charge transactions, and/or a schedule for deploying MoCS in the system, the scheduler may consider certain factors. In some embodiments, the scheduler may consider the following optimization goals:

1) maximize effective charge usage by analyzing the charge distribution map;
2) minimize charging station halts by sustaining low battery vehicles;
3) minimize travel time of all EVs by limiting the number of rerouting;
4) maximize battery life by considering the depth of discharge of each EV; and
5) prioritize MoCS as charge providers over passenger EVs and the like.

In some embodiments, the final decision of the scheduler may be a function of all the optimization parameters, where each parameter can be weighted differently depending on which goals the user wishes to prioritize. While the five optimization goals presented above are one possible set of optimization goals, other embodiments include less, more, and/or different optimization goals, e.g., based upon the desired outcome of a system operator and/or alternative constraints and/or preferences.

In addition to Algorithm W, Algorithm X, and Algorithm Y, discussed hereinabove, other algorithms for the scheduling of peer-to-peer and MoCS-to-EV charging events, making routing/rerouting decisions, and deciding when/where to deploy MoCS to the system are contemplated, such as Algorithm Z presented in Table 1.

TABLE 1

Algorithm Z

1:   procedure GENERATE_SCHEDULE(Charge_Dist_Map)
2:     Instruction_List = ∅         ▷ Initialized to empty set.
3:     Crit_Evs_List = find_critical_evs(Charge_Dist_Map)
4:     i = 0
5:     while i < length(Crit_EVs_List) do
6:       Prov_EV = find_prov_ev(Crit_EVs_List[i])
7:       inst = gen_charge_tran_inst(Prov_EV,Crit_EVs_List[i])
8:       Instruction_List.append(inst)

TABLE 1-continued

Algorithm Z

9:       i = i + 1
10:    Charge_DR_List = find_charge_dr(Charge_Dist_Map)
11:    i = 0
12:    while i < length(Charge_DR_List) do
13:      ins.pt = find_best_mocs_ins_pt(Charge_DR_List[i])
14:      mocs_ins_num = find_MoCS_num(Charge_DR_List[i])
15:      MoCS_Inst = gen_mocs_ins_inst(ins_pt, mocs_ins_num)
16:      Instruction_List.append(MoCS_Inst)
17:      i = i + 1
18:    return Instruction_List Algorithm Z was used in a SUMO simulation in order to evaluate the effectiveness of this approach for scheduling charge transactions in a complex EV fleet using MoCS. In some embodiments, according to Algorithm Z, a scheduler can generate, retrieve, receive, or request a charge distribution map (Charge_Dist_Map) as an input and generate a list of instructions (Instruction_List) to be followed by the EVs, MoCS, and MoCS depots. The scheduler acts as an intelligent decision function. In some embodiments, a method such as find_critical_evs can be used for identifying the EVs in the network with critical battery capacity using the charge distribution map maintained in the cloud control system. In line 3 of Algorithm Z, this method is used to generate the critical EV list (Crit_EVs_List). The method find_prov_ev can then be used to identify the best provider EV (Prov_EV) for a given critical EV from all nearby EVs within a user-specified range. This method uses a greedy search algorithm based on a linear weighted function of all the optimization goals mentioned earlier. In line 7 of Algorithm Z, charge transaction instruction (inst) are generated; inst being used to facilitate the charge transfer. The instruction (inst) is appended to the Instruction_List in line 8 of Algorithm Z. The instructions are targeted towards helping the EVs to come nearby and speed lock. A find_charge_dr method is then used to find all the charge deprived regions in the network using a linear search. In line 10 of Algorithm Z, the find_charge_dr method is used to find the regions in the road system with a high density of critical EVs. According to Algorithm Z, two methods are then defined, find_best_mocs_ins_pt and find_MoCS_num, to find out the best MoCS insertion point and the amount of MoCS that should be activated or spawned to deal with a particular charge deprived region, respectively. The MoCS insertion point (ins_pt) is selected based on the predicted trajectory of the low battery charge EVs such that the MoCS can easily converge with them. The number of MoCS to be inserted (mocs_ins_num) is based on the severity (number of critical EVs) of the charge deprived region and the MoCS quota remaining. The function gen_mocs_ins_inst generates the instruction (MoCS_Inst) specifying the amount of MoCS and MoCS insertion location to be sent to the MoCS depot. The complete Instruction_List is then returned in line 18 of Algorithm Z from the GENERATE_SCHEDULE method. The instructions generated are sent to the respective MoCS depots and EVs. For the purposes of the SUMO simulation, the SUMO simulator was modified to emulate MoCS depots and the whole EV network.

Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Figure 19:
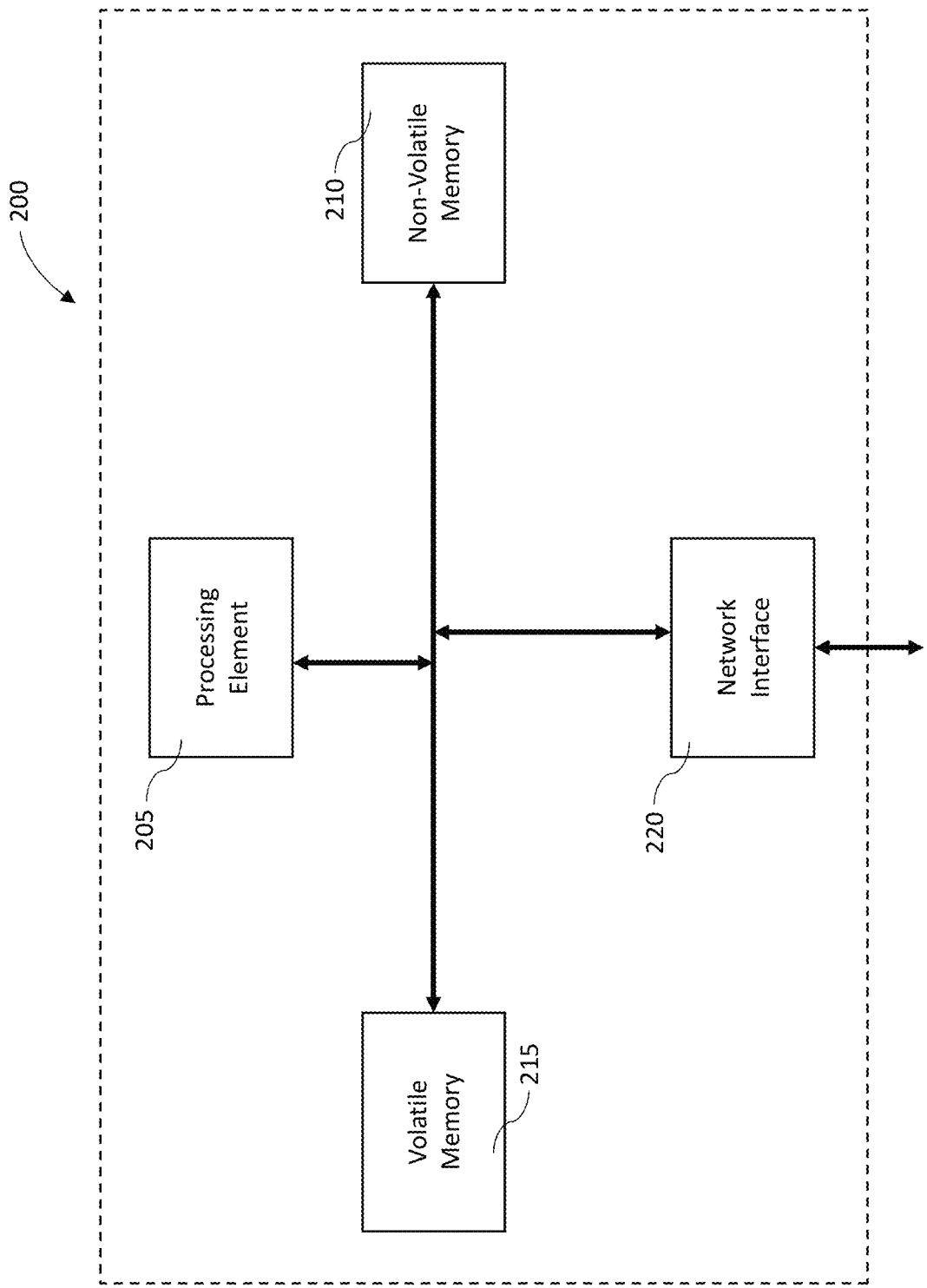
FIG. 19 provides an example computing entity configured to carry out part or all of at least some of the various processes, algorithms, and methods described herein, according to some embodiments discussed herein.

FIG. 19 provides a schematic of a computing device 200 according to at least one embodiment of the present disclosure. In some embodiments, the computing device 200 can be similar to or the same as the computing device 100. In some embodiments, the computing device 100 can comprise the computing device 200, or vice versa. In some embodiments, the computing device 200 can be configured to carry out all or part of any of the methods, algorithms, processes, or approaches described herein, according to a set of instructions or according to computer program code. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in at least one embodiment, the computing device 200 may include may include or be in communication with one or more processing elements 205 (also referred to as processors, processing circuitry, and/or similar terms used herein interchangeably) that communicate with other elements within the computing device 200 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the computing device 200 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the computing device 200 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the computing device 200 with the assistance of the processing element 205 and operating system.

In at least one embodiment, the computing device 200 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing device 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR)

protocols, near field communication (NFC) protocols, Wibree, Bluetooth protocols, wireless universal serial bus (USB) protocols, and/or any other wireless protocol.

Although not shown, the computing device 200 may include or be in communication with one or more input elements, such as a keyboard input, a mouse input, a touch screen/display input, motion input, movement input, audio input, pointing device input, joystick input, keypad input, and/or the like. The computing device 200 may also include or be in communication with one or more output elements (not shown), such as audio output, video output, screen/display output, motion output, movement output, and/or the like.

Exemplary External Computing Entity

Figure 20:
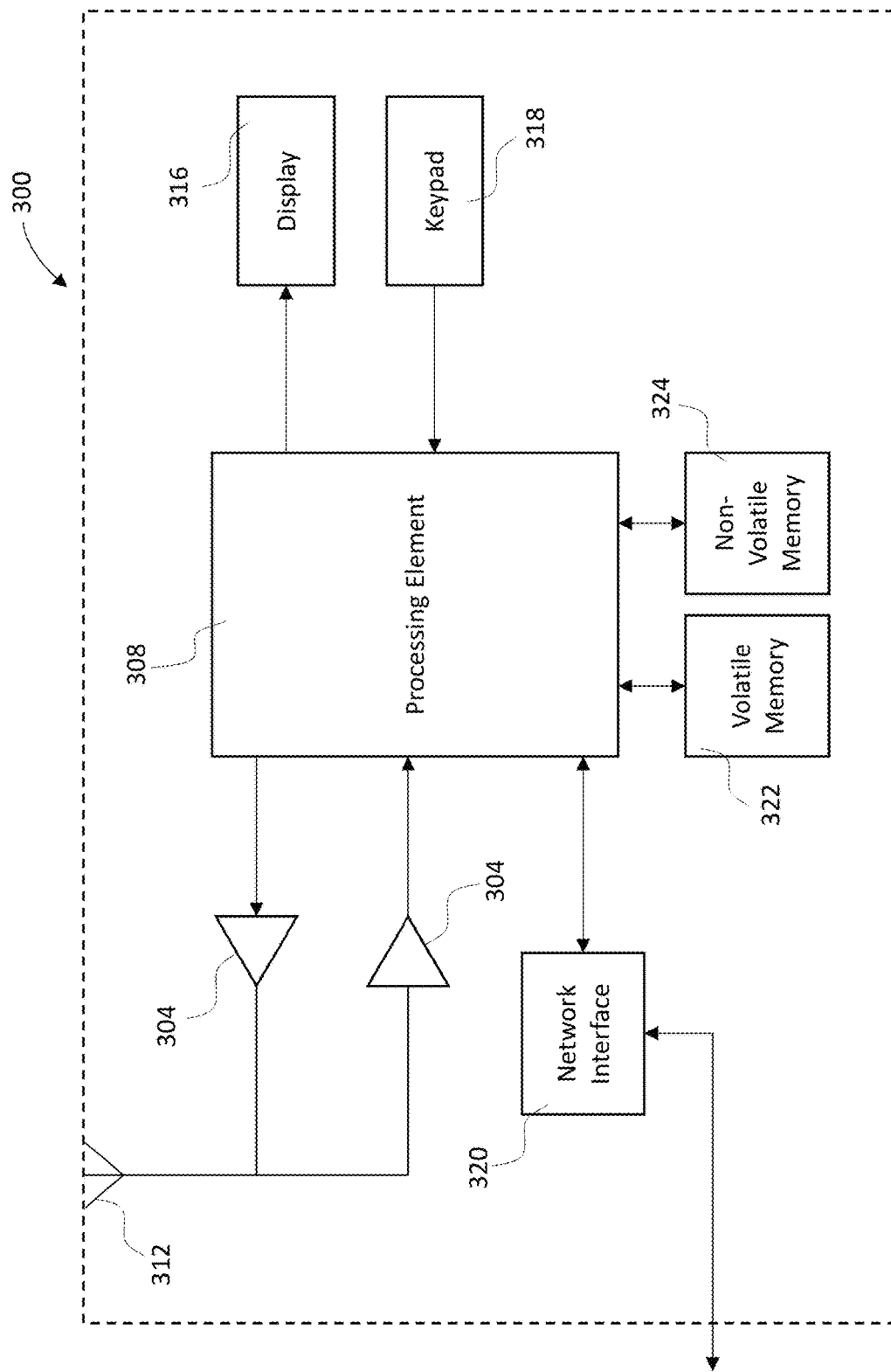
FIG. 20 provides an example computing entity configured to carry out part or all of at least some of the various processes, algorithms, and methods described herein, according to some embodiments discussed herein.

FIG. 20 provides an illustrative schematic representative of an external computing entity 300 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 300 can be operated by various parties. As shown in FIG. 20, the external computing entity 300 can comprise an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 300 may be capable of operating with one or more air interface standards, communication protocols, modulation types, and access types. More particularly, the external computing entity 300 may operate in accordance with any of a number of wireless communication standards and protocols, such as those described above with regard to the computing device 200. In a particular embodiment, the external computing entity 300 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 300 may operate in accordance with multiple wired communication standards and protocols, such as those described above with regard to the computing device 200 via a network interface 320.

Via these communication standards and protocols, the external computing entity 300 can communicate with various other entities using concepts such as Unstructured Supplementary Service Data (USSD), Short Message Service (SMS), Multimedia Messaging Service (MIMS), Dual-Tone Multi-Frequency Signaling (DTMF), and/or Subscriber Identity Module Dialer (SIM dialer). The external computing entity 300 can also download changes, add-ons, and updates, for instance, to its firmware, software (e.g., including executable instructions, applications, program modules), and operating system.

According to one embodiment, the external computing entity 300 may include location determining aspects, devices, modules, functionalities, and/or similar words used herein interchangeably. For example, the external computing entity 300 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 300 position in connection with a variety of other systems, including cellular towers, Wi-Fi access points, and/or the like. Similarly, the external computing entity 300 may include indoor positioning aspects, such as a location module adapted to acquire, for example, latitude, longitude, altitude, geocode, course, direction, heading, speed, time, date, and/or various other information/data. Some of the indoor systems may use various position or location technologies including radio-frequency identification (RFID) tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 300 may also comprise a user interface (that can comprise a display 316 coupled to a processing element 308) and/or a user input interface (coupled to a processing element 308). For example, the user interface may be a user application, browser, user interface, and/or similar words used herein interchangeably executing on and/or accessible via the external computing entity 300 to interact with and/or cause display of information/data from the computing device 200, as described herein. The user input interface can comprise any of a number of devices or interfaces allowing the external computing entity 300 to receive data, such as a keypad 318 (hard or soft), a touch display, voice/speech or motion interfaces, or other input device. In embodiments including a keypad 318, the keypad 318 can comprise (or cause display of) the conventional numeric (0-9) and related keys (#, *), and other keys used for operating the external computing entity 300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 300 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 300. As indicated, this may include a user application that is resident on the entity or accessible through a browser or other user interface for communicating with the computing device 200 and/or various other computing entities.

In another embodiment, the external computing entity 300 may include one or more components or functionality that are the same or similar to those of the computing device 200, as described in greater detail above. As will be recognized, these architectures and descriptions are provided for exemplary purposes only and are not limiting to the various embodiments.

In various embodiments, the external computing entity 300 may be embodied as an artificial intelligence (AI) computing entity, such as a vehicle's AI-based navigation system, Apple's Siri, an Amazon Echo, Amazon Echo Dot, Amazon Show, Google Home, and/or the like. Accordingly, the external computing entity 300 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

By way of example only, any of the Algorithm W, Algorithm X, and/or Algorithm Y can be carried out by one of the computing device 200 and/or the external computing device 300. In some embodiments, route scheduling and charge transfer events can be mapped and scheduled using one or more of the computing device 200 and/or the external computing device 300. Likewise, in some embodiments, the charge distribution map can be generated, stored, updated, and/or utilized for scheduling charge distribution throughout a roadway system using one or more of the computing device 200 and/or the external computing device 300.

Figure 21:
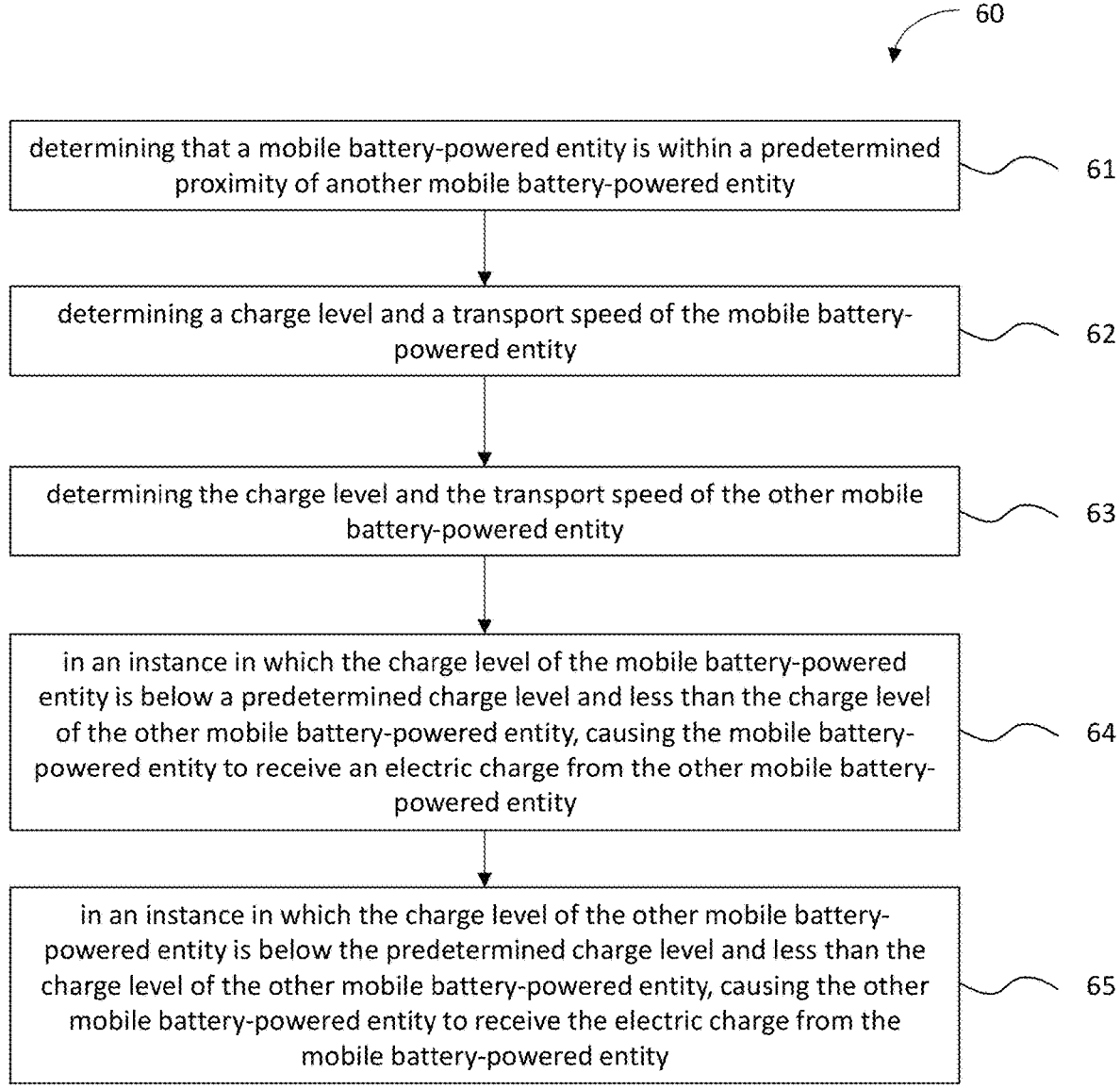
FIG. 21 provides a process flow diagram of an example method for charging a mobile entity, according to some embodiments discussed herein.

For example, FIG. 21 provides an exemplary method 60 for charging a mobile entity that can be carried out, in part or in full, by one or more of the computing device 200 and/or the external computing device 300. In some embodiments, the method 60 can comprise determining that a mobile battery-powered entity is within a pre-determined proximity of another mobile battery-powered entity, at 61. The method 60 can further include determining a charge level and a transport speed of the mobile battery-powered entity, at 62. The method 60 can further include determining the charge level and the transport speed of the other mobile battery-powered entity, at 63 The method 60 can further include, in an instance in which the charge level of the mobile battery-powered entity is below a pre-determined (e.g., configurable) charge level and less than the charge level of the other mobile battery-powered entity, causing the mobile battery-powered entity to receive an electric charge from the other mobile battery-powered entity, at 64. The method 60 can further include, in an instance in which the charge level of the other mobile battery-powered entity is below the pre-determined (e.g., configurable) charge level and less than the charge level of the other mobile battery-powered entity, causing the other mobile battery-powered entity to receive the electric charge from the mobile battery-powered entity, at 65.

Figure 22:
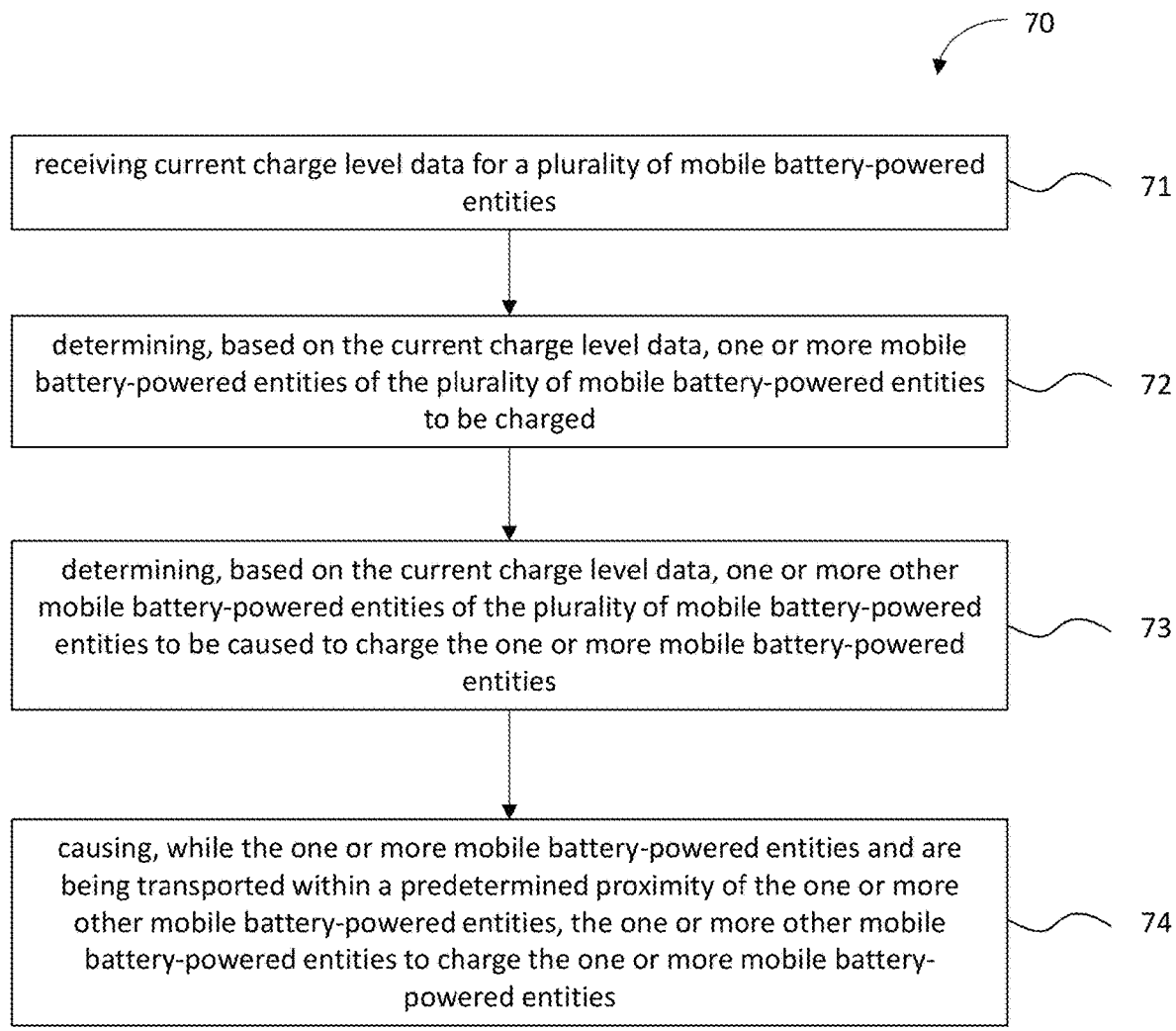
FIG. 22 provides a process flow diagram of an example method for governing charge transactions for a charging network, according to some embodiments discussed herein.

For another example, FIG. 22 provides a method 70 for governing charge transactions for a charging network, which can be carried out in part or in full by one or more of the computing device 200 and/or the external computing device 300. In some embodiments, the method 70 can comprise receiving current charge level data for a plurality of mobile battery-powered entities, at 71. The method 70 can further include determining, based on the current charge level data, one or more mobile battery-powered entities of the plurality of mobile battery-powered entities to be charged, at 72. The method 70 can further include determining, based on the current charge level data, one or more other mobile battery-powered entities of the plurality of mobile battery-powered entities to be caused to charge the one or more mobile battery-powered entities, at 73. The method 70 can further include causing, while the one or more mobile battery-powered entities and are being transported within a pre-determined proximity of the one or more other mobile battery-powered entities, the one or more other mobile battery-powered entities to charge the one or more mobile battery-powered entities, at 74.

Figure 23:
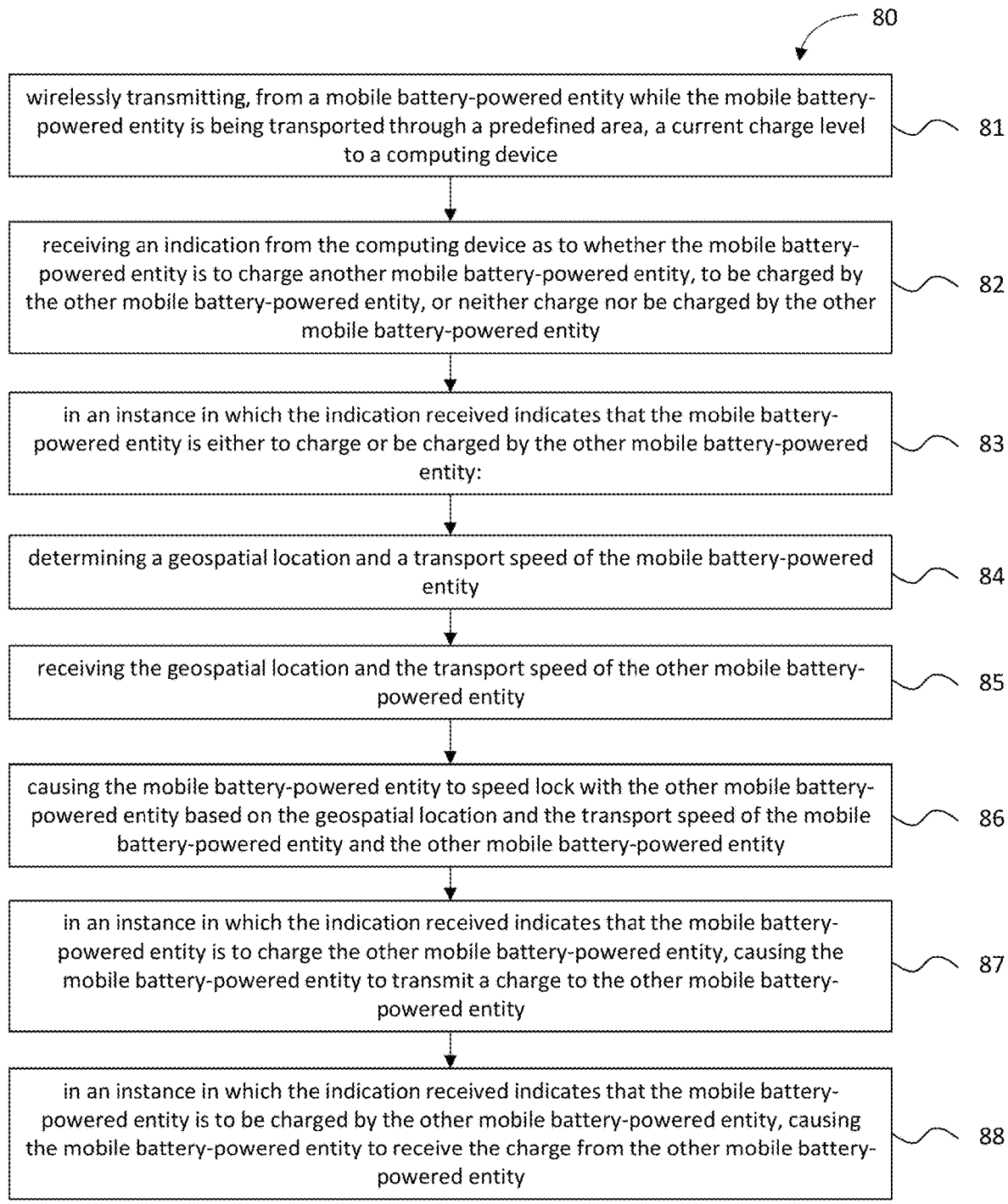
FIG. 23 provides a process flow diagram of an example method for charging a mobile entity, according to some embodiments discussed herein.

For another example, FIG. 23 provides a method 80 for charging a mobile entity that can be carried out in part or in full by one or more of the computing device 200 and/or the external computing device 300. The method 80 can comprise wirelessly transmitting, from a mobile battery-powered entity while the mobile battery-powered entity is being transported through a predefined area, a current charge level to a computing device, at 81. The method 80 can further include receiving an indication from the computing device as to whether the mobile battery-powered entity is to charge another mobile battery-powered entity, to be charged by the other mobile battery-powered entity, or neither charge nor be charged by the other mobile battery-powered entity, at 82. The method 80 can further include, in an instance in which the indication received indicates that the mobile battery-powered entity is either to charge or be charged by the other mobile battery-powered entity, at 83, determining a geospatial location and a transport speed of the mobile battery-powered entity, at 84, receiving the geospatial location and the transport speed of the other mobile battery-powered entity, at 85, and causing the mobile battery-powered entity to speed lock with the other mobile battery-powered entity based on the geospatial location and the transport speed of the mobile battery-powered entity and the other mobile battery-powered entity, at 86. The method 80 can further include, in an instance in which the indication received indicates that the mobile battery-powered entity is to charge the other mobile battery-powered entity, causing the mobile battery-powered entity to transmit a charge to the other mobile battery-powered entity, at 87. The method 80 can further include, in an instance in which the indication received indicates that the mobile battery-powered entity is to be charged by the other mobile battery-powered entity, causing the mobile battery-powered entity to receive the charge from the other mobile battery-powered entity, at 88.

Figure 24:
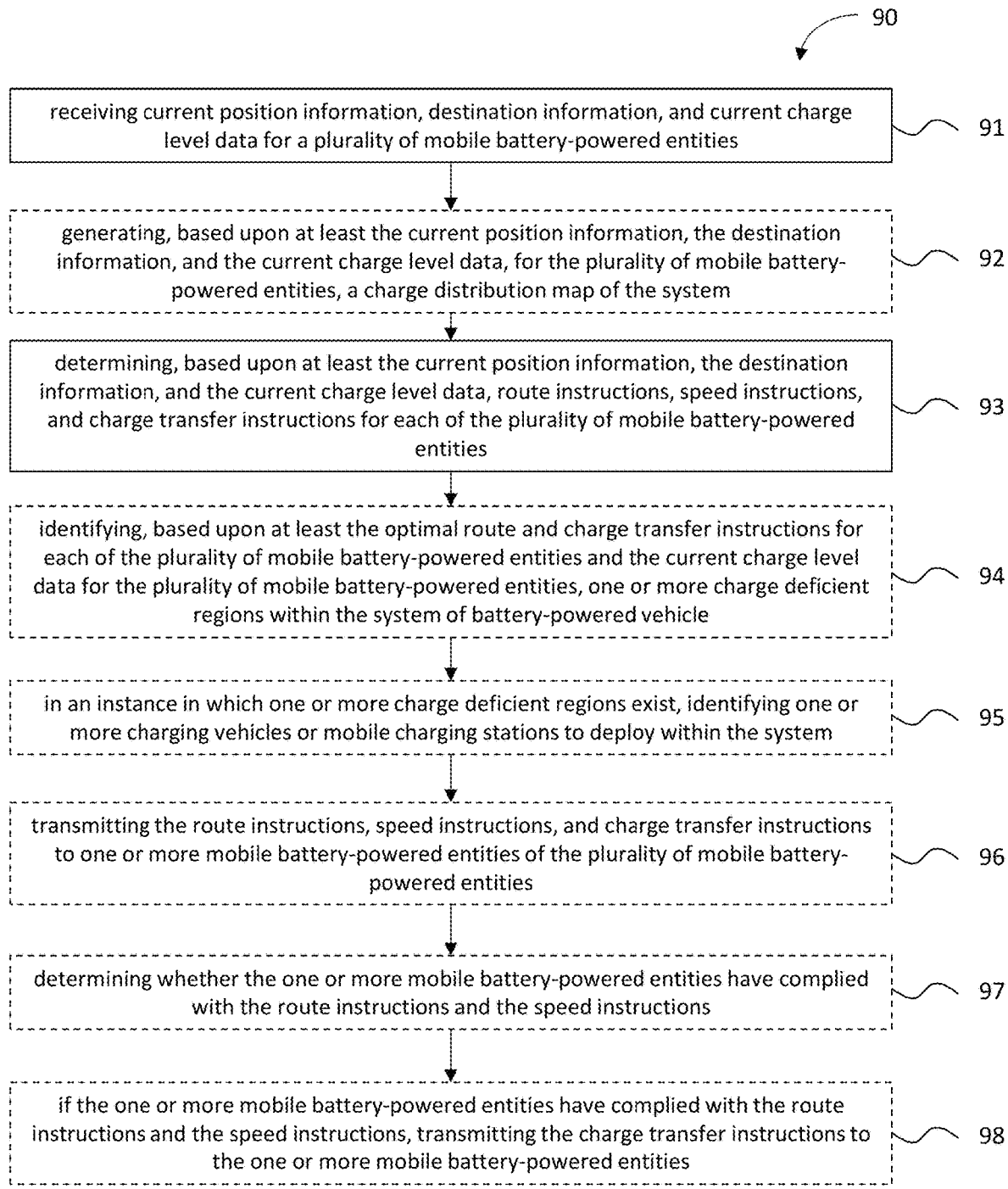
FIG. 24 provides a process flow diagram of an example method for distributing charge through a network of mobile battery-powered entities, according to some embodiments discussed herein.

For yet another example, FIG. 24 provides a method 90 for distributing charge within a system or network of mobile battery-powered entities and/or mobile charging stations that can be carried out in part or in full by, e.g., one or more of the computing device 200 and/or the external computing device 300. The method 90 can comprise receiving current position information, destination information, and current charge level data for a plurality of mobile battery-powered entities, at 91. The method 90 can, optionally, further include generating, based upon at least the current position information, the destination information, and the current charge level data, for the plurality of mobile battery-powered entities, a charge distribution map of the system, at 92. The method 90 can further include determining, based upon at least the current position information, the destination information, and the current charge level data, route instructions, speed instructions, and charge transfer instructions for each of the plurality of mobile battery-powered entities, at 93. The method 90 can, optionally, further include identifying, based upon at least the optimal route and charge transfer instructions for each of the plurality of mobile battery-powered entities and the current charge level data for the plurality of mobile battery-powered entities, one or more charge deficient regions within the system of battery-powered vehicle, at 94. The method 90 can, optionally, further include, in an instance in which one or more charge deficient regions exist, identifying one or more charging vehicles or mobile charging stations to deploy within the system, at 95. The method 90 can, optionally, further include transmitting the route instructions, speed instructions, and charge transfer instructions to one or more mobile battery-powered entities of the plurality of mobile battery-powered entities, at 96. The method 90 can, optionally, further include determining whether the one or more mobile battery-powered entities have complied with the route instructions and the speed instructions, at 97. The method 90 can, optionally, further include, in an instance in which the one or more mobile battery-powered entities have complied with the route instructions and the speed instructions, transmitting the charge transfer instructions to the one or more mobile battery-powered entities, at 98. In some embodiments, the method 90 can, optionally, further include causing the one or more mobile battery-powered entities to transfer an electric charge to a corresponding one or more other mobile battery-powered entities according to the charge transfer instructions (not shown). In some embodiments, the charge transfer instructions can comprise one or more of a current position of the corresponding mobile battery-powered entity, a current charge level for the corresponding mobile battery-powered entity, a charge capacity for the corresponding mobile battery-powered entity, a charge transfer rate capacity for the corresponding mobile battery-powered entity, charging cable configurational information for the corresponding mobile battery-powered entity, transport speed information for the corresponding mobile battery-powered entity, pre-determined route information for the corresponding mobile battery-powered entity, a destination for the corresponding mobile battery-powered entity, vehicle identification information for the corresponding mobile battery-powered entity, or charge transfer payment information for the corresponding mobile battery-powered entity. In some embodiments, the plurality of mobile battery-powered entities can be selected from among battery-powered terrestrial vehicles, battery-powered aerial vehicles, battery-powered aquatic vehicles, charge relay vehicles, and charge storage vehicles. In some embodiments, the method 90 can further comprise receiving, from the plurality of mobile battery-powered entities and the one or more charging vehicles or mobile charging stations, updated current position information, updated destination information, and updated current charge level data (not shown); and updating the charge distribution map of the system to include one or more of an updated charge level, an updated current position, and an updated speed for the plurality of mobile battery-powered entities and the one or more charge vehicles or mobile charging stations (not shown).

Figure 25:
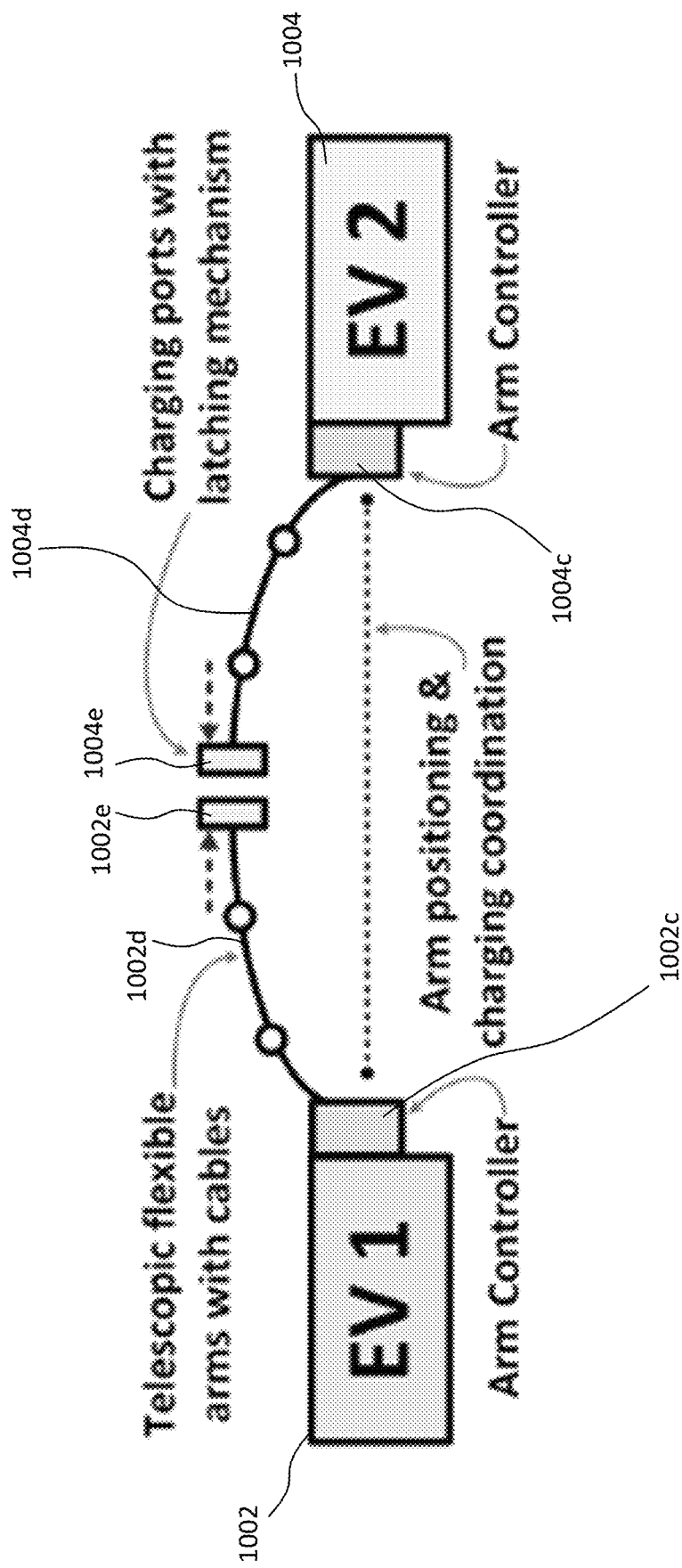
FIG. 25 illustrates an apparatus for electrically coupling two or more electric vehicles in an on-the-go charging system, according to an embodiment.

FIG. 25 provides an example of a connection apparatus for establishing an electrical connection between one or more vehicles or other entities during an electric charge transfer event. In some embodiments, the first vehicle 1002 can be sufficiently positioned nearby the second vehicle 1004 on the roadway or elsewhere (e.g., in the air, etc.) such that the components of the first and second vehicles 1002, 1004 can reach therebetween. In some embodiments, one of the first vehicle 1002 or the second vehicle 1004 can be designated as the lead with regard to vehicle positioning, speed, velocity, and commencement of charge transfer, with the other of the two vehicles being subject to the direction of the lead vehicle. In some embodiments, the first vehicle 1002 can comprise a charging arm controller 1002c coupled to a proximal end of a charging cable arm 1002d and configured to control the movements of the charging cable arm 1002d. In some embodiments, the charging cable arm 1002d can comprise a connection interface 1002e at a distal end of the charging cable arm 1002d, the connection interface 1002e configured to maintain an electrical connection of another vehicle. Likewise, the second vehicle 1004 can also include a charging arm controller 1004c configured to control the movements of a charging cable arm 1004d, the charging cable arm 1004d having a connection interface 1004e at the distal end of the charging cable arm 1004d. In some embodiments, when a charge transfer event is initiated between the first vehicle 1002 and the second vehicle, the lead vehicle, e.g., the first vehicle 1002, may use the charging arm controller 1002c to move, orient, extend, retract, rotate, or otherwise position the charging cable arm 1002d such that the connection interface 1002e is positioned at a desired charging orientation or position with respect to the first vehicle 1002. Previously, concurrently, or subsequently, the first vehicle 1002 or another entity of the system can cause the second vehicle 1004 to use its charging arm controller 1004c to move its charging cable arm 1004d such that the connection interface 1004e of the second vehicle 1004 is located at or sufficiently near the connection interface 1002e of the first vehicle 1002 such that an electrical connection can be established between the first vehicle 1002 and the second vehicle 1004. Although not shown, in some embodiments, one or more of the first vehicle 1002 or the second vehicle 1004 may further include one or more sensors, cameras, processors, and/or the like such that the proximity, speed, and/or velocity of a paired vehicle, the location, orientation, and/or movement of a charging cable arm of the paired vehicle, and/or the location of a connection interface of a paired vehicle can be determined, measured, monitored, calculated, estimated, or the like, e.g., in real-time, before or during a charge transfer event.

In some embodiments, a charging cable arm (e.g., 1002d, 1004d) can comprise a safe, insulated, and firm telescopic arm carrying the charging cable. In some embodiments, after two EVs lock speed and are in range for charge sharing, they can extend their charging arms, as shown in FIG. 25. The arms heads can contain the charging ports, and they will latch together using, e.g., either magnetic pads or other means. The arms and the overall charging operation can be coordinated by the respective arm controllers of each EV. This is just one possible realization of the charge transfer mechanism. The entire charging operation can be safely orchestrated if the EVs involved follow a certain predefined protocol. For autonomous/semi-autonomous EVs, the pairing mechanism can be further streamlined. Wireless charging is also contemplated, such as by way of inductive charging, wireless radio-frequency-to-direct current (RF-to-DC) charging, or the like.

As mentioned briefly hereinabove, to analyze the effectiveness of a cloud control system and the scheduling algorithms, an open-source traffic simulator, SUMO (Simulation of Urban Mobility), was integrated with a peer-to-peer car charging (P2C2) scheduler. Modifications to SUMO were made to support peer-to-peer car charging and the mobilization of one or more MoCS. In the resulting quantitative analysis, the P2C2 scheduler communicated with SUMO periodically to gather traffic information and send instructions. For this analysis, a 240 km stretch of highway was tested. Each simulation instance was run for 5 hours in real-time, with each EV traveling at least 50 km. Each EV was assumed to weigh 2,109 kg with a battery capacity of 75 kWh. Unless otherwise mentioned, in this simulation the EVs and MoCS enter the simulation with a full charge. The weight of each MoCS is 11,793 kgs, which is the gross vehicle weight rating for a class 6 truck. Each MoCS is assumed to carry about 850 kWh charge and are battery powered themselves. From the simulation, the effect(s) of parameters such as (1) MoCS-to-EV charge transfer rate, (2) amount of MoCS in the network, and (3) battery capacity reduction of the EVs in later sections were observed.

Three different traffic scenarios were tested. The internal parameters defining each of these scenarios are as follows:

1) Light Traffic: Initially 500 EVs are inserted with a new EV entering the simulation every 4 seconds. A total of 5,000 EVs will be inserted over 5 hours.

2) Medium Traffic: Initial traffic of 1,000 EVs with a new EV entering the simulation every 3 seconds. A total of 7,000 EVs will be inserted over 5 hours.

3) High Traffic: Initially 2,000 EVs are inserted with a new EV entering the simulation every 2 seconds. A total of 11,000 EVs will be inserted over 5 hours.

A charging rate of 1 kW/min was assumed for simulation based on a realistic EV-to-EV charging estimate. For purposes of the simulations, an EV is considered to be "halted" when its charge reaches zero. All charge transfer events were carried out with 95% efficiency (i.e., assuming a 5% charge loss during transfer).

Figure 26:
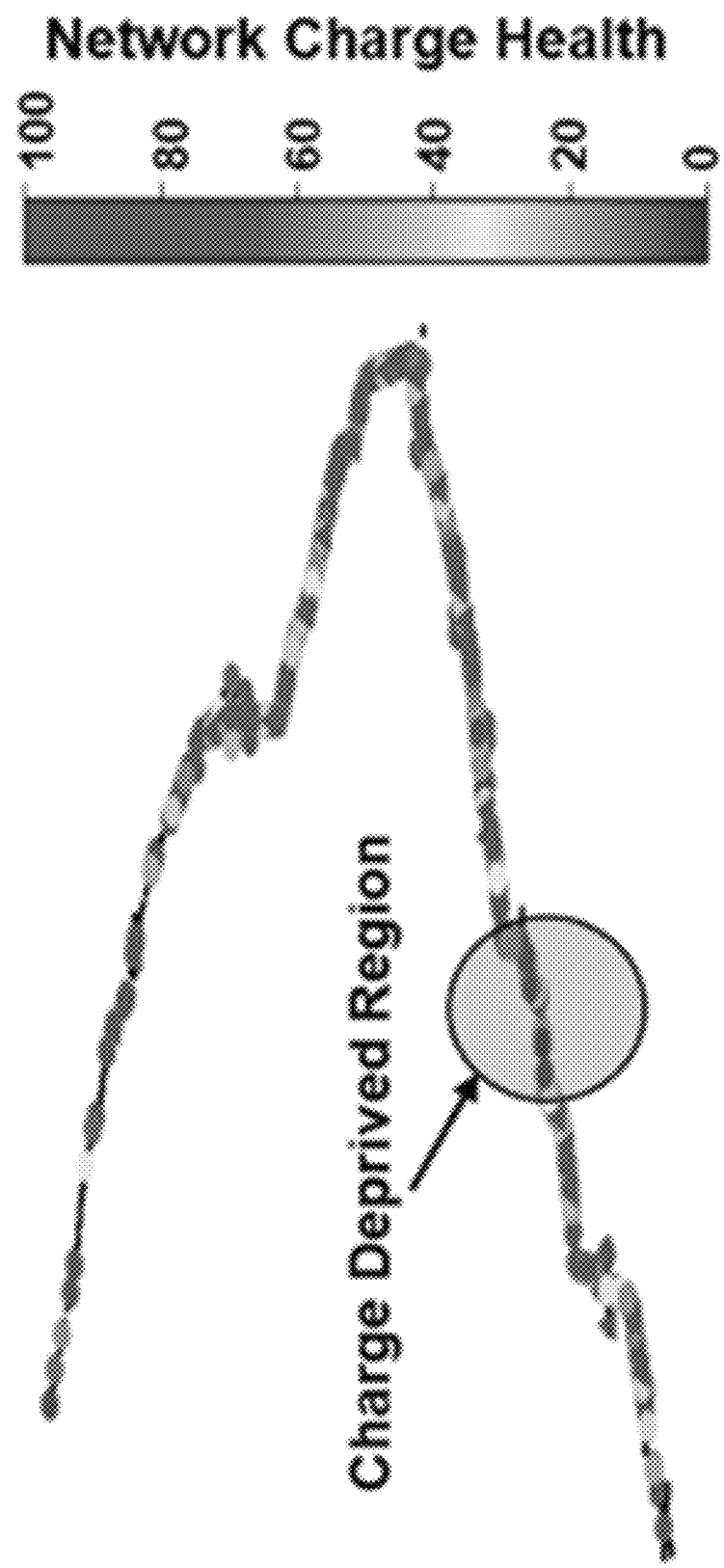
FIG. 26 provides an example of a charge distribution map of electric charge within a distributed on-the-go charging system at a point in time, according to some embodiments discussed herein.
Figure 27A:
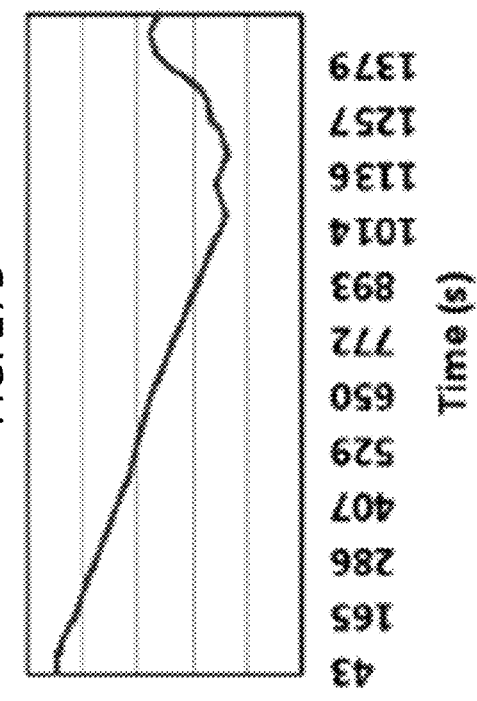
FIG. 27A-FIG. 27H provide a series of charge graphs illustrating changes in battery charge level over time for exemplary EVs (FIGS. 27A-27E and FIG. 27G) and MoCS (FIGS. 27F and 27H) in an on-the-go EV charging network, according to some embodiments discussed herein.
Figure 27B:
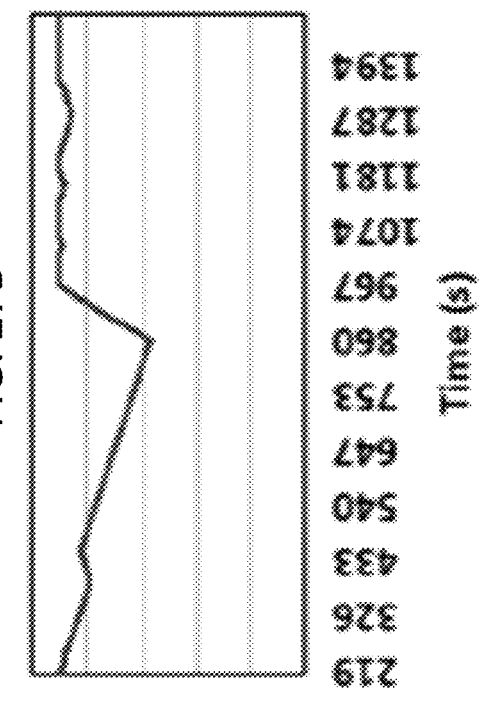
Figure 27C:
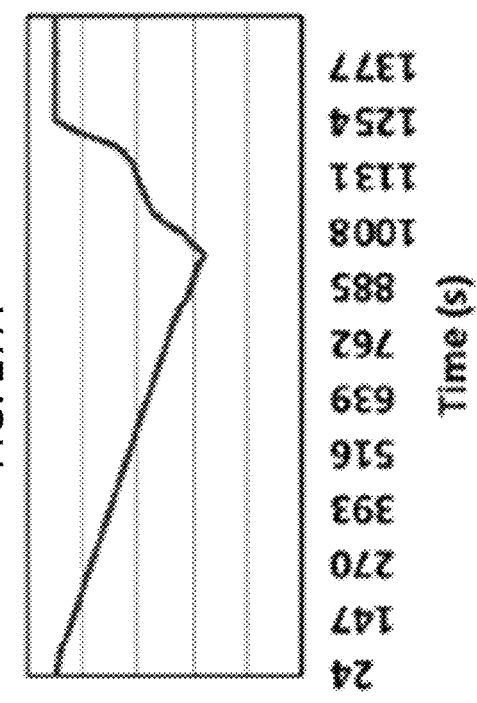
Figure 27D:
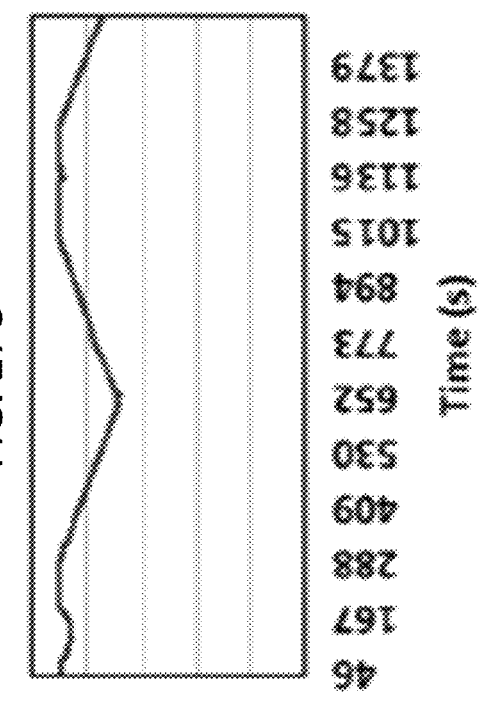
Figure 27E:
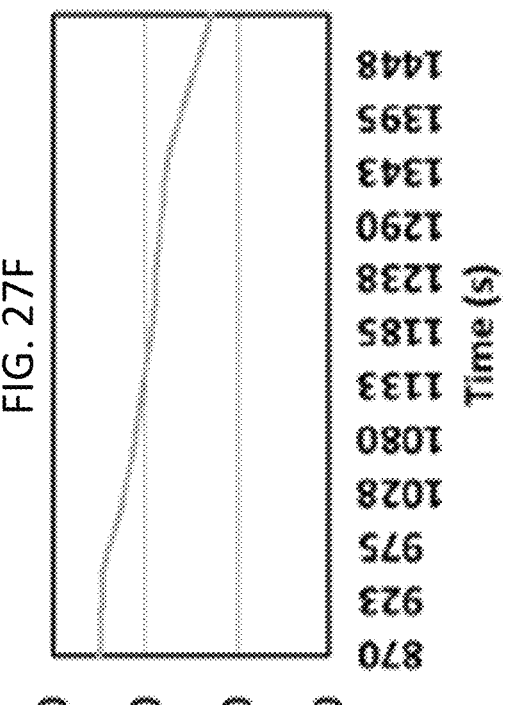
Figure 27F:
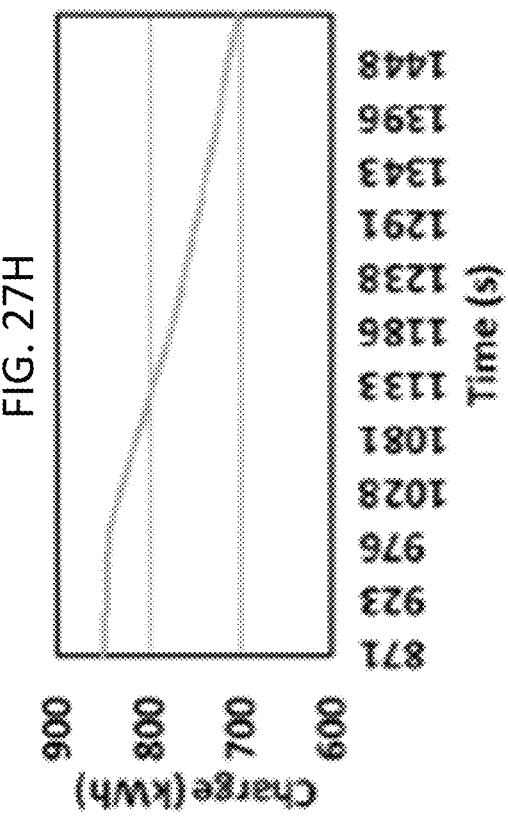
Figure 27G:
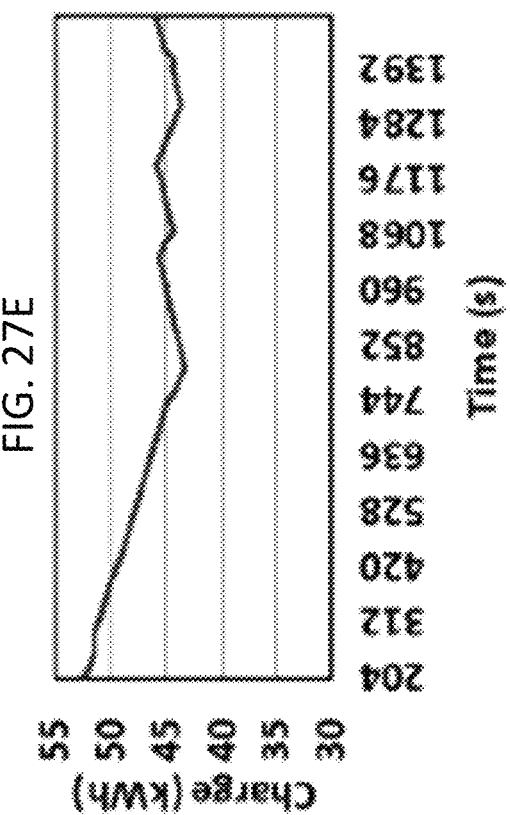
Figure 27H:
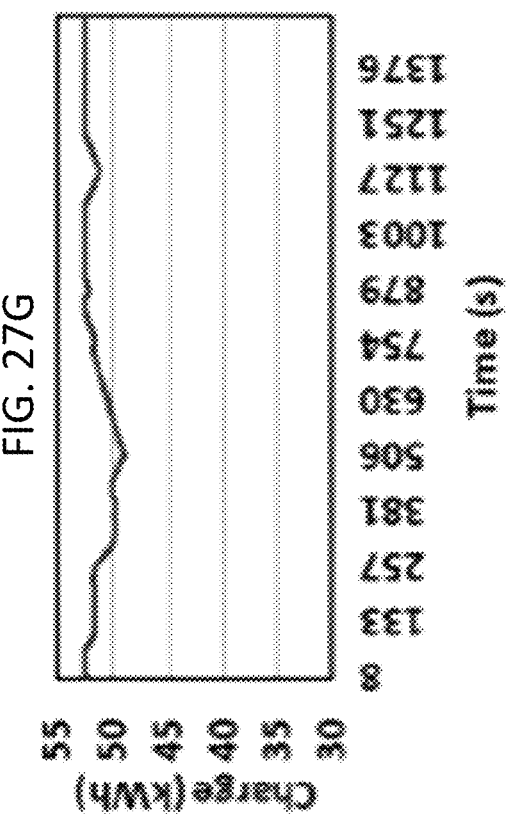

FIG. 26 illustrates the overall charge distribution in the highway. Each point on the plot indicates the average charge of vehicles in the region. In the charge distribution map shown, a potential charge deprived region (within the circle) can be identified. Depending upon the preferences and optimization goals for the scheduler, the scheduler would likely deploy one or more MoCS to the identified charge deprived region within the charge distribution map.

FIGS. 27A-27H provide a series of charge graphs illustrating changes in battery charge level over time for exemplary EVs (FIGS. 27A-27E and FIG. 27G) and MoCS (FIGS. 27F and 27H) in an on-the-go EV charging network, according to some embodiments discussed herein. FIGS. 27A-27H illustrate the battery charge trend for 6 sampled EVs and 2 sampled MoCS from the network. The EVs generally experienced an initial drop in the battery charge before they were assigned another EV as a charge provider. After that point, most of the EVs maintained a particular battery level sufficient for continued operation and continue to move perpetually. The purpose of deploying a MoCS is to deposit a relatively large amount of charge in the network quickly; hence, they constantly lose charge as can be seen from the plots of FIGS. 27F and 27H.

One observation was the effect of different MoCS-to-EV charge transfer rates on the percentage of EV halts. For purposes of these simulations, a 1× charge rate is 1 kWh per minute. In some embodiments, the charge transfer rate was changed for charge transfer events between an MoCS and an EV while the EV-to-EV charge transfer rate remained 1 kWh per minute throughout the simulations.

Figure 28:
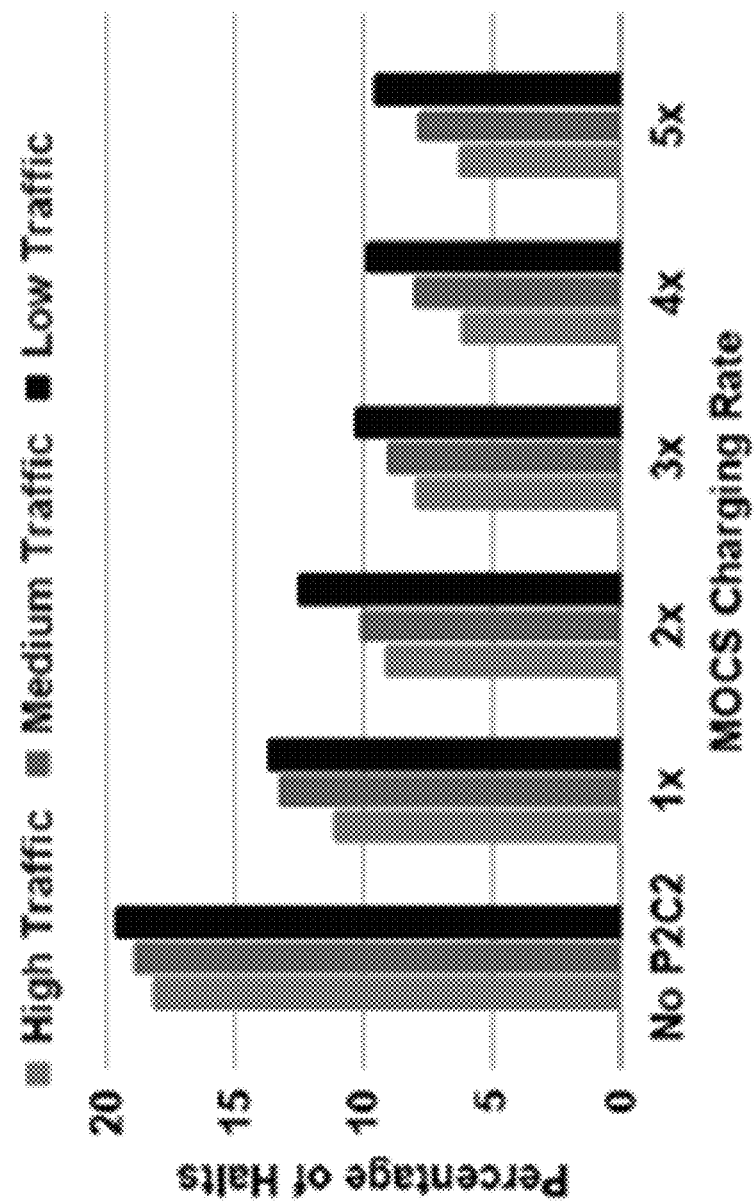
FIG. 28 provides a graph illustrating the percentage of EV halts for systems having a variety of MoCS-to-EV charge transfer rates, according to some embodiments.
Figure 29:
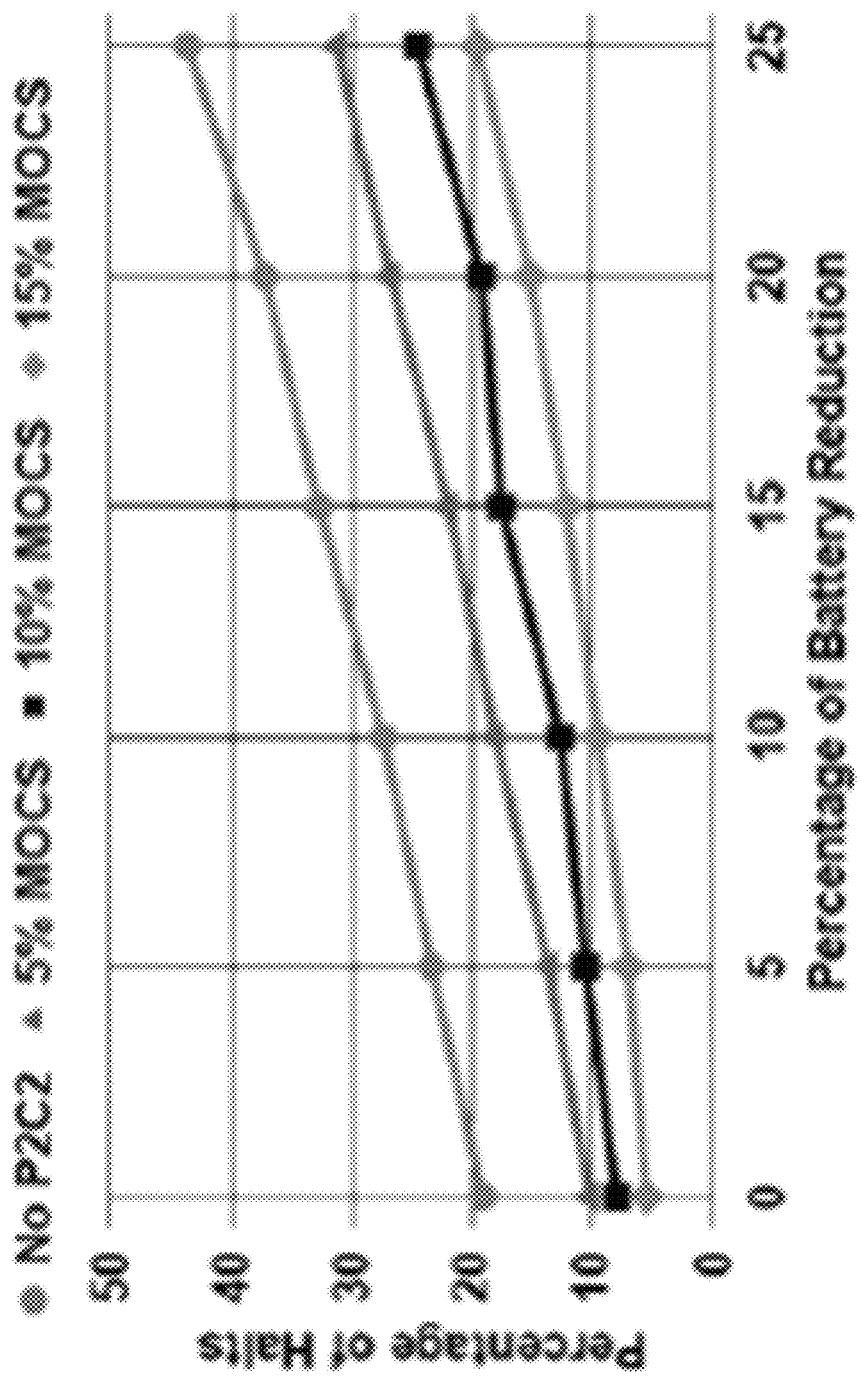
FIG. 29 provides a graph illustrating percentage of EV halts compared to changes in battery capacity for a variety of systems having different MoCS densities, according to some embodiments.

FIG. 28 illustrates that the percentage of halts for all the three traffic scenarios decreased in conjunction with increases in the MoCS charge transfer rate. If fast charge transfer batteries can be used in the EVs/MoCS, then the effectiveness of EV-to-EV and/or MoCS-to-EV (e.g., P2C2) scenarios is increased. In some embodiments, such charging schemes appear to be more effective in denser traffic scenarios. As can be seen in FIG. 29, the percentage of halts for high traffic is least. With more EVs in the network, less rerouting may be needed, and an EV with a critical battery state can be quickly assigned to a provider EV which is close by.

Figure 30:
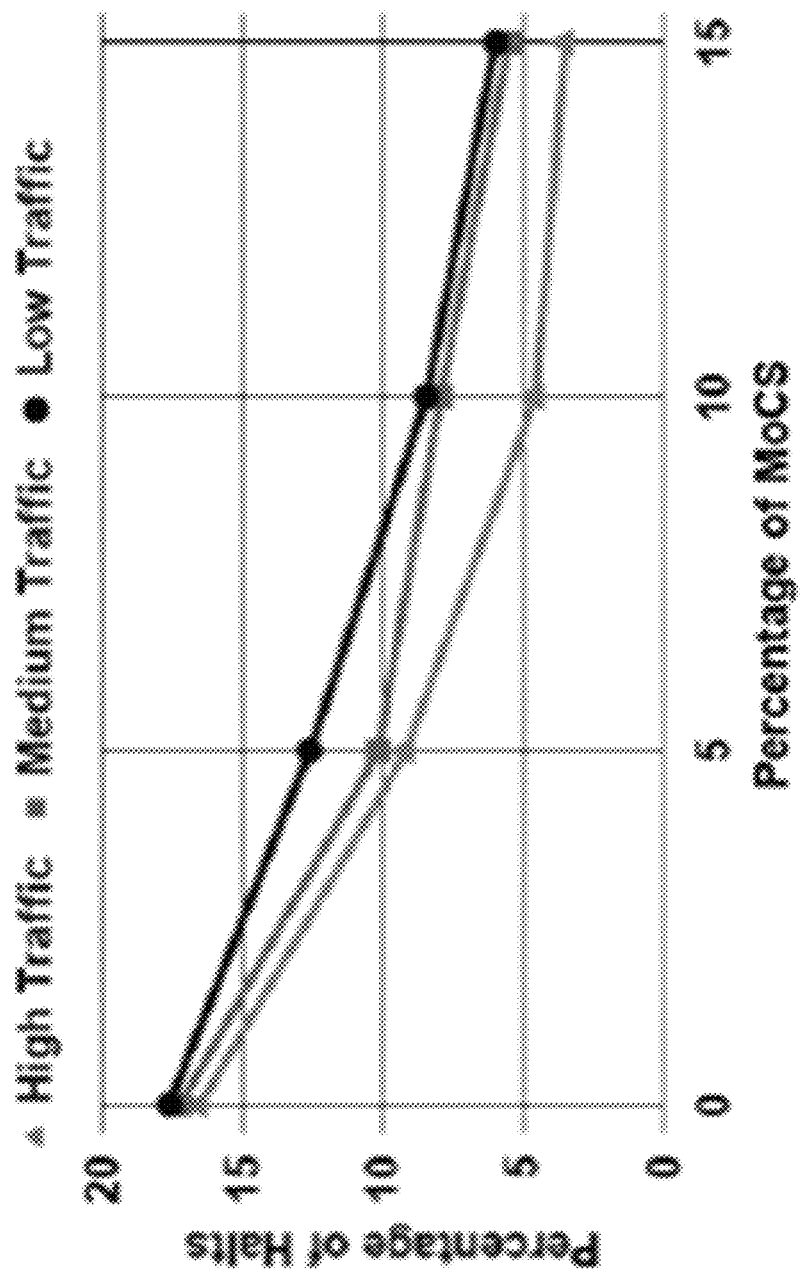
FIG. 30 provides a graph illustrating how the percentage of EV halts changes as the limit on the percentage of MoCS in the network is increased, according to some embodiments.

To observe the effect of the number of MoCS in the network on the percentage of EV halts, the MoCS-to-EV charge transfer rate was set to 2× (2 kWh per minute), the EV-to-EV charging rate was set to 1× (1 kWh per minute), and the limit on the percentage of MoCS in the network was varied. The percentage of MoCS refers to the maximum allowable MoCS for every 100 EVs in the network. FIG. 30 illustrates that, as we increase the limit of the percentage of MoCS, the percentage of EV halts decreases. As such, a higher quantity of charge influx also helps to reduce EV halts.

Based on the battery capacity of the cars used in the simulation, it should take approximately 10 hours to fully charge on National Electrical Manufacturers Association (NEMA) 14-50 plugs through a 240 v outlet. By multiplying the average time charging for each EV halt with the total number of halts from Table 2, the total charge time for all traffic scenarios was obtained. As shown in Table 2, the total time spent for stationary charging reduces significantly due to an EV-to-EV and MoCS-to-EV charge sharing scenario. The percent reduction for P2C2 was calculated compared to the required charge time results for no P2C2 (without EV-to-EV and MoCS-to-EV charge sharing). A MoCS-to-EV charging rate of 2× and a limit of 5% MoCS in the system were used for obtaining the P2C2 results in Table 2.

TABLE 2

Percentage of halt induced charging time reduction in different traffic scenarios

|  | Light Traffic | | Medium Traffic | | High Traffic | |
| --- | --- | --- | --- | --- | --- | --- |
|  | Baseline | P2C2 | Baseline | P2C2 | Baseline | P2C2 |
| % of Halts | 19.68 | 12.62 | 19.02 | 10.18 | 18.25 | 9.16 |
| Num of EVs | 5,000 | 5,000 | 7,000 | 7,000 | 11,000 | 11,000 |
| Halt time (hrs.) | 9,840 | 6,310 | 13,314 | 7,126 | 20,075 | 10,076 |
| Halt Time Cut (%) | — | 35.87 | — | 46.48 | — | 49.81 |

FIG. 29 illustrates the effect of reducing the battery capacity of the EVs on the percentage of halts for the medium-traffic scenario. We see the percentage of faults increase as the battery capacity is reduced. There is therefore a trade-off between the number of MoCS deployed and the battery capacity of EVs. If the number of MoCS deployed is within 15% of the total EVs in the network, the necessary minimum battery capacity of all EVs can be reduced by 24.4% while the number of EV halts does not increase compared to the baseline scenario. As such, the battery capacities of all EVs can be reduced by having more MoCS deployed in the system.

Apparatus, systems, and methods described herein relate generally to entity-to-entity charging of mobile battery-powered entities. For example, according to a first embodiment, a method can be provided that comprises determining that a mobile battery-powered entity is within a pre-determined proximity of another mobile battery-powered entity, determining a charge level and a transport speed of the mobile battery-powered entity, determining the charge level and the transport speed of the other mobile battery-powered entity, in an instance in which the charge level of the mobile battery-powered entity is below a pre-determined (e.g., configurable) charge level and less than the charge level of the other mobile battery-powered entity, causing the mobile battery-powered entity to receive an electric charge from the other mobile battery-powered entity, and in an instance in which the charge level of the other mobile battery-powered entity is below the pre-determined (e.g., configurable) charge level and less than the charge level of the other mobile battery-powered entity, causing the other mobile battery-powered entity to receive the electric charge from the mobile battery-powered entity.

According to a second embodiment, an apparatus can be provided that comprises at least one processor and at least one memory including computer program code, the at least one memory and the computer program code configured to, with the processor, cause the apparatus to at least receive current charge level data for a plurality of mobile battery-powered entities, determine, based on the current charge level data, one or more mobile battery-powered entities of the plurality of mobile battery-powered entities to be charged, determine, based on the current charge level data, one or more other mobile battery-powered entities of the plurality of mobile battery-powered entities to be caused to charge the one or more mobile battery-powered entities; and cause, while the one or more mobile battery-powered entities and are being transported within a pre-determined proximity of the one or more other mobile battery-powered entities, the one or more other mobile battery-powered entities to charge the one or more mobile battery-powered entities.

According to a third embodiment, a method can be provided that comprises receiving current charge level data for a plurality of mobile battery-powered entities, determining, based on the current charge level data, one or more mobile battery-powered entities of the plurality of mobile battery-powered entities to be charged, determining, based on the current charge level data, one or more other mobile battery-powered entities of the plurality of mobile battery-powered entities to be caused to charge the one or more mobile battery-powered entities, and causing, while the one or more mobile battery-powered entities and are being transported within a pre-determined proximity of the one or more other mobile battery-powered entities, the one or more other mobile battery-powered entities to charge the one or more mobile battery-powered entities.

According to a fourth embodiment, a method can be provided that comprises wirelessly transmitting, from a mobile battery-powered entity while the mobile battery-powered entity is being transported through a predefined area, a current charge level to a computing device, receiving an indication from the computing device as to whether the mobile battery-powered entity is to charge another mobile battery-powered entity, to be charged by the other mobile battery-powered entity, or neither charge nor be charged by the other mobile battery-powered entity, and in an instance in which the indication received indicates that the mobile battery-powered entity is either to charge or be charged by the other mobile battery-powered entity: determining a geospatial location and a transport speed of the mobile battery-powered entity, receiving the geospatial location and the transport speed of the other mobile battery-powered entity, causing the mobile battery-powered entity to speed lock with the other mobile battery-powered entity based on the geospatial location and the transport speed of the mobile battery-powered entity and the other mobile battery-powered entity, in an instance in which the indication received indicates that the mobile battery-powered entity is to charge the other mobile battery-powered entity, causing the mobile battery-powered entity to transmit a charge to the other mobile battery-powered entity, and in an instance in which the indication received indicates that the mobile battery-powered entity is to be charged by the other mobile battery-powered entity, causing the mobile battery-powered entity to receive the charge from the other mobile battery-powered entity.

According to a fifth embodiment, a method can be provided that comprises determining a charge level, a current position, and a transport speed for a mobile battery-powered entity in a transportation network; determining the charge level, the current position, and the transport speed for another mobile battery-powered entity in the mobile charging network; and, in an instance in which the charge level of the mobile battery-powered entity is below a pre-determined charge level and less than the charge level of the other mobile battery-powered entity, causing the mobile battery-powered entity to receive an electric charge from the other mobile battery-powered entity while the mobile battery-powered entity and the other mobile battery-powered entity continue traveling through the transportation network. In some embodiments, the method can further comprise determining that the mobile battery-powered entity is within a pre-determined proximity of the other mobile battery-powered entity. In some embodiments, the method can further comprise, in an instance in which the charge level of the mobile battery-powered entity is below a pre-determined charge level and less than the charge level of the other mobile battery-powered entity, transmitting route instructions and transport speed instructions to the other mobile battery-powered entity; determining whether the other mobile battery-powered entity has complied with the route instructions and the transport speed instructions; and if the other mobile battery-powered entity has complied with the route instructions and the transport speed instructions, transmitting charge transfer instructions to the other mobile battery-powered entity. In some embodiments, the method can further comprise causing the other mobile battery-powered entity to transfer an electric charge to the mobile battery-powered entity according to the charge transfer instructions. In some embodiments, the charge transfer instructions can comprise one or more of the current position of the mobile battery-powered entity, a current charge level for the mobile battery-powered entity, a charge capacity for the mobile battery-powered entity, a charge transfer rate capacity for the mobile battery-powered entity, charging cable configurational information, transport speed information for the mobile battery-powered entity, pre-determined route information for the mobile battery-powered entity, a destination for the mobile battery-powered entity, vehicle identification information for the mobile battery-powered entity, or charge transfer payment information for the mobile battery-powered entity. In some embodiments, the method can further comprise, in an instance in which the charge level of the other mobile battery-powered entity is below the pre-determined charge level and less than the charge level of the other mobile battery-powered entity, causing the other mobile battery-powered entity to receive the electric charge from the mobile battery-powered entity. In some embodiments, the method can further comprise, in an instance in which the charge levels of the mobile battery-powered entity and the other mobile battery-powered entity are both below the pre-determined charge level, causing deployment of at least one charging vehicle or at mobile charging station. In some embodiments, the mobile battery-powered entity and the other mobile battery-powered entity are selected from among battery-powered terrestrial vehicles, battery-powered aerial vehicles, battery-powered aquatic vehicles, charge relay vehicles, and charge storage vehicles. In some embodiments, the method can further comprise updating a charge distribution map of the transportation network to include one or more of the charge level, current position, and transport speed for the mobile battery-powered entity and the other mobile battery-powered entity.

According to a sixth embodiment, a method can be provided that comprises receiving current position information and current charge level data for a plurality of mobile battery-powered entities; determining, based on the current position information and the current charge level data, one or more mobile battery-powered entities of the plurality of mobile battery-powered entities to be charged; and determining, based on the current charge level data, one or more other mobile battery-powered entities of the plurality of mobile battery-powered entities to transfer charge to the one or more mobile battery-powered entities. In some embodiments, the method can further comprise determining whether the one or more mobile battery-powered entities are within a pre-determined proximity of corresponding ones of the one or more other mobile battery-powered entities. In some embodiments, the method can further comprise, in an instance in which the one or more mobile battery-powered entities are within the pre-determined proximity of corresponding ones of the one or more other mobile battery-powered entities, transmitting route instructions and transport speed instructions to the one or more other mobile battery-powered entities; determining whether the one or more other mobile battery-powered entities have complied with the route instructions and the transport speed instructions; and if the one or more other mobile battery-powered entities have complied with the route instructions and the transport speed instructions, transmitting charge transfer instructions to the one or more other mobile battery-powered entities. In some embodiments, the method can further comprise causing the one or more other mobile battery-powered entities to transfer an electric charge to a corresponding one of the one or more mobile battery-powered entities according to the charge transfer instructions. In some embodiments, the charge transfer instructions comprise one or more of the current position of the mobile battery-powered entity, a current charge level for the mobile battery-powered entity, a charge capacity for the mobile battery-powered entity, a charge transfer rate capacity for the mobile battery-powered entity, charging cable configurational information, transport speed information for the mobile battery-powered entity, pre-determined route information for the mobile battery-powered entity, a destination for the mobile battery-powered entity, vehicle identification information for the mobile battery-powered entity, or charge transfer payment information for the mobile battery-powered entity. In some embodiments, the method can further comprise, in an instance in which the charge levels of the mobile battery-powered entity and the other mobile battery-powered entity are both below the pre-determined charge level, causing deployment of at least one charging vehicle or at mobile charging station. In some embodiments, the plurality of mobile battery-powered entities are selected from among battery-powered terrestrial vehicles, battery-powered aerial vehicles, battery-powered aquatic vehicles, charge relay vehicles, and charge storage vehicles. In some embodiments, the method can further comprise updating a charge distribution map of the transportation network to include one or more of the charge level, current position, and transport speed for the mobile battery-powered entity and the other mobile battery-powered entity.

According to a seventh embodiment, an apparatus is provided that comprises at least one processor and at least one memory including computer program code, the at least one memory and the computer program code configured to, with the processor, cause the apparatus to at least: receive current position information and current charge level data for a plurality of mobile battery-powered entities; determine, based on the current position information and the current charge level data, one or more mobile battery-powered entities of the plurality of mobile battery-powered entities to be charged; and determine, based on the current charge level data, one or more other mobile battery-powered entities of the plurality of mobile battery-powered entities to transfer charge to the one or more mobile battery-powered entities. In some embodiments, the at least one memory and the computer program code are configured to, with the processor, cause the apparatus to at least: determine whether the one or more mobile battery-powered entities are within a pre-determined proximity of corresponding ones of the one or more other mobile battery-powered entities; in an instance in which the one or more mobile battery-powered entities are within the pre-determined proximity of corresponding ones of the one or more other mobile battery-powered entities, transmit route instructions and transport speed instructions to the one or more other mobile battery-powered entities; determine whether the one or more other mobile battery-powered entities have complied with the route instructions and the transport speed instructions; and, if the one or more other mobile battery-powered entities have complied with the route instructions and the transport speed instructions, transmit charge transfer instructions to the one or more other mobile battery-powered entities. In some embodiments, the at least one memory and the computer program code are configured to, with the processor, cause the apparatus to at least: cause the one or more other mobile battery-powered entities to transfer an electric charge to a corresponding one of the one or more mobile battery-powered entities according to the charge transfer instructions, said charge transfer instructions comprising one or more of the current position of the mobile battery-powered entity, a current charge level for the mobile battery-powered entity, a charge capacity for the mobile battery-powered entity, a charge transfer rate capacity for the mobile battery-powered entity, charging cable configurational information, transport speed information for the mobile battery-powered entity, pre-determined route information for the mobile battery-powered entity, a destination for the mobile battery-powered entity, vehicle identification information for the mobile battery-powered entity, or charge transfer payment information for the mobile battery-powered entity.

According to an eight embodiment, a method is provided for distributing charge within a system of battery-powered vehicles. In some embodiments, the method can comprise receiving current position information, destination information, and current charge level data for a plurality of mobile battery-powered entities; and determining, based upon at least the current position information, the destination information, and the current charge level data, route instructions, speed instructions, and charge transfer instructions for each of the plurality of mobile battery-powered entities. In some embodiments, the method can further comprise generating, based upon at least the current position information, the destination information, and the current charge level data, for the plurality of mobile battery-powered entities, a charge distribution map of the system. In some embodiments, the method can further comprise identifying, based upon at least the optimal route and charge transfer instructions for each of the plurality of mobile battery-powered entities and the current charge level data for the plurality of mobile battery-powered entities, one or more charge deficient regions within the system of battery-powered vehicle; and, in an instance in which one or more charge deficient regions exist, identifying one or more charging vehicles or mobile charging stations to deploy within the system. In some embodiments, the method can further comprise transmitting the route instructions, speed instructions, and charge transfer instructions to one or more mobile battery-powered entities of the plurality of mobile battery-powered entities; determining whether the one or more mobile battery-powered entities have complied with the route instructions and the speed instructions; and in an instance in which the one or more mobile battery-powered entities have complied with the route instructions and the speed instructions, transmitting the charge transfer instructions to the one or more mobile battery-powered entities. In some embodiments, the method can further comprise causing the one or more mobile battery-powered entities to transfer an electric charge to a corresponding one or more other mobile battery-powered entities according to the charge transfer instructions. In some embodiments, the charge transfer instructions can comprise one or more of a current position of the corresponding mobile battery-powered entity, a current charge level for the corresponding mobile battery-powered entity, a charge capacity for the corresponding mobile battery-powered entity, a charge transfer rate capacity for the corresponding mobile battery-powered entity, charging cable configurational information for the corresponding mobile battery-powered entity, transport speed information for the corresponding mobile battery-powered entity, pre-determined route information for the corresponding mobile battery-powered entity, a destination for the corresponding mobile battery-powered entity, vehicle identification information for the corresponding mobile battery-powered entity, or charge transfer payment information for the corresponding mobile battery-powered entity. In some embodiments, the plurality of mobile battery-powered entities can be selected from among battery-powered terrestrial vehicles, battery-powered aerial vehicles, battery-powered aquatic vehicles, charge relay vehicles, and charge storage vehicles. In some embodiments, the method can further comprise receiving, from the plurality of mobile battery-powered entities and the one or more charging vehicles or mobile charging stations, updated current position information, updated destination information, and updated current charge level data; and updating the charge distribution map of the system to include one or more of an updated charge level, an updated current position, and an updated speed for the plurality of mobile battery-powered entities and the one or more charge vehicles or mobile charging stations.

According to a ninth embodiment, an apparatus can be provided for charge distribution within a system of mobile battery-powered entities. In some embodiments, the apparatus can comprise at least one processor and at least one memory including computer program code. In some embodiments, the at least one memory and the computer program code can be configured to, with the processor, cause the apparatus to at least: receive current position information, destination information, and current charge level data for a plurality of mobile battery-powered entities and one or more mobile charging stations; generate, based upon at least the current position information, the destination information, and the current charge level data, for the plurality of mobile battery-powered entities and the one or more mobile charging stations, a charge distribution map; and determine, based upon at least the charge distribution map, route instructions, speed instructions, and charge transfer instructions for one or more mobile battery-powered entities of the plurality of mobile battery-powered entities. In some embodiments, the at least one memory and the computer program code are configured to, with the processor, cause the apparatus to at least: transmit the route instructions and speed instructions to the one or more mobile battery-powered entities; determine whether the one or more mobile battery-powered entities have complied with the route instructions and the speed instructions; and, in an instance in which the one or more mobile battery-powered entities have complied with the route instructions and the speed instructions, transmit the charge transfer instructions to the one or more mobile battery-powered entities. In some embodiments, the at least one memory and the computer program code are configured to, with the processor, cause the apparatus to at least: identify, based upon at least the charge distribution map, one or more charge deficient regions within the charge distribution map; and, in an instance in which one or more charge deficient regions exist, transmit deployment instructions to the one or more charging vehicles or mobile charging stations.

To provide an overall understanding, certain illustrative embodiments have been described; however, it will be understood by one of ordinary skill in the art that systems, apparatuses, and methods described herein can be adapted and modified to provide systems, apparatuses, and methods for other suitable applications and that other additions and modifications can be made without departing from the scope of systems, apparatuses, and methods described herein.

The embodiments described herein have been particularly shown and described, but it will be understood that various changes in form and details may be made. Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems, apparatuses, or methods of the present disclosure.

Conventional terms in the field of electrochemical cells have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Although specific embodiments have been illustrated and described herein, it will be appreciated by those of ordinary skill in the art that any arrangement that is adapted to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements or any relative order of operations or organization on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure and is submitted with the understanding that it will not be used to interpret or limit the scope or meaning of the claims.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

The invention claimed is:

1. A method comprising:
   determining a charge level, a current position, and a transport speed for a mobile battery-powered entity in a transportation network;
   determining the charge level, the current position, and the transport speed for another mobile battery-powered entity in the mobile charging network; and
   in an instance in which the charge level of the mobile battery-powered entity is below a pre-determined charge level and less than the charge level of the other mobile battery-powered entity, causing the mobile battery-powered entity to receive an electric charge from the other mobile battery-powered entity while the mobile battery-powered entity and the other mobile battery-powered entity continue traveling through the transportation network.

2. The method of claim 1, further comprising:
   determining that the mobile battery-powered entity is within a pre-determined proximity of the other mobile battery-powered entity.

3. The method of claim 1, further comprising:
   in an instance in which the charge level of the mobile battery-powered entity is below a pre-determined charge level and less than the charge level of the other mobile battery-powered entity, transmitting route instructions and transport speed instructions to the other mobile battery-powered entity;
   determining whether the other mobile battery-powered entity has complied with the route instructions and the transport speed instructions; and
   if the other mobile battery-powered entity has complied with the route instructions and the transport speed instructions, transmitting charge transfer instructions to the other mobile battery-powered entity.

4. The method of claim 3, further comprising:
   causing the other mobile battery-powered entity to transfer an electric charge to the mobile battery-powered entity according to the charge transfer instructions.

5. The method of claim 4, wherein said charge transfer instructions comprise one or more of the current position of the mobile battery-powered entity, a current charge level for the mobile battery-powered entity, a charge capacity for the mobile battery-powered entity, a charge transfer rate capacity for the mobile battery-powered entity, charging cable configurational information, transport speed information for the mobile battery-powered entity, pre-determined route information for the mobile battery-powered entity, a destination for the mobile battery-powered entity, vehicle identification information for the mobile battery-powered entity, or charge transfer payment information for the mobile battery-powered entity.

6. The method of claim 1, further comprising:
   in an instance in which the charge level of the other mobile battery-powered entity is below the pre-determined charge level and less than the charge level of the other mobile battery-powered entity, causing the other mobile battery-powered entity to receive the electric charge from the mobile battery-powered entity.

7. The method of claim 1, further comprising:
in an instance in which the charge levels of the mobile battery-powered entity and the other mobile battery-powered entity are both below the pre-determined charge level, causing deployment of at least one charging vehicle or at mobile charging station.

8. The method of claim 1, wherein the mobile battery-powered entity and the other mobile battery-powered entity are selected from among battery-powered terrestrial vehicles, battery-powered aerial vehicles, battery-powered aquatic vehicles, charge relay vehicles, and charge storage vehicles.

9. The method of claim 1, further comprising:
updating a charge distribution map of the transportation network to include one or more of the charge level, current position, and transport speed for the mobile battery-powered entity and the other mobile battery-powered entity.

10. A method for distributing charge within a system of battery-powered vehicles, the method comprising:
receiving current position information, destination information, and current charge level data for a plurality of mobile battery-powered entities; and
determining, based upon at least the current position information, the destination information, and the current charge level data, route instructions, speed instructions, and charge transfer instructions for each of the plurality of mobile battery-powered entities.

11. The method of claim 10, further comprising:
generating, based upon at least the current position information, the destination information, and the current charge level data, for the plurality of mobile battery-powered entities, a charge distribution map of the system.

12. The method of claim 11, further comprising:
identifying, based upon at least the optimal route and charge transfer instructions for each of the plurality of mobile battery-powered entities and the current charge level data for the plurality of mobile battery-powered entities, one or more charge deficient regions within the system of battery-powered vehicle; and
in an instance in which one or more charge deficient regions exist, identifying one or more charging vehicles or mobile charging stations to deploy within the system.

13. The method of claim 12, further comprising:
transmitting the route instructions, speed instructions, and charge transfer instructions to one or more mobile battery-powered entities of the plurality of mobile battery-powered entities;
determining whether the one or more mobile battery-powered entities have complied with the route instructions and the speed instructions; and
if the one or more mobile battery-powered entities have complied with the route instructions and the speed instructions, transmitting the charge transfer instructions to the one or more mobile battery-powered entities.

14. The method of claim 13, further comprising:
causing the one or more mobile battery-powered entities to transfer an electric charge to a corresponding one or more other mobile battery-powered entities according to the charge transfer instructions.

15. The method of claim 14, wherein said charge transfer instructions comprise one or more of a current position of the corresponding mobile battery-powered entity, a current charge level for the corresponding mobile battery-powered entity, a charge capacity for the corresponding mobile battery-powered entity, a charge transfer rate capacity for the corresponding mobile battery-powered entity, charging cable configurational information for the corresponding mobile battery-powered entity, transport speed information for the corresponding mobile battery-powered entity, pre-determined route information for the corresponding mobile battery-powered entity, a destination for the corresponding mobile battery-powered entity, vehicle identification information for the corresponding mobile battery-powered entity, or charge transfer payment information for the corresponding mobile battery-powered entity.

16. The method of claim 10, wherein the plurality of mobile battery-powered entities are selected from among battery-powered terrestrial vehicles, battery-powered aerial vehicles, battery-powered aquatic vehicles, charge relay vehicles, and charge storage vehicles.

17. The method of claim 13, further comprising:
receiving, from the plurality of mobile battery-powered entities and the one or more charging vehicles or mobile charging stations, updated current position information, updated destination information, and updated current charge level data; and
updating the charge distribution map of the system to include one or more of an updated charge level, an updated current position, and an updated speed for the plurality of mobile battery-powered entities and the one or more charge vehicles or mobile charging stations.

18. An apparatus comprising at least one processor and at least one memory including computer program code, the at least one memory and the computer program code configured to, with the processor, cause the apparatus to at least:
receive current position information, destination information, and current charge level data for a plurality of mobile battery-powered entities and one or more mobile charging stations;
generate, based upon at least the current position information, the destination information, and the current charge level data, for the plurality of mobile battery-powered entities and the one or more mobile charging stations, a charge distribution map; and
determine, based upon at least the charge distribution map, route instructions, speed instructions, and charge transfer instructions for one or more mobile battery-powered entities of the plurality of mobile battery-powered entities.

19. The apparatus of claim 18, wherein the at least one memory and the computer program code are configured to, with the processor, cause the apparatus to at least:
transmit the route instructions and speed instructions to the one or more mobile battery-powered entities;
determine whether the one or more mobile battery-powered entities have complied with the route instructions and the speed instructions; and
in an instance in which the one or more mobile battery-powered entities have complied with the route instructions and the speed instructions, transmit the charge transfer instructions to the one or more mobile battery-powered entities.

20. The apparatus of claim 19, wherein the at least one memory and the computer program code are configured to, with the processor, cause the apparatus to at least:
identify, based upon at least the charge distribution map, one or more charge deficient regions within the charge distribution map; and in an instance in which one or more charge deficient regions exist, transmit deployment instructions to the one or more charging vehicles or mobile charging stations.

* * * * *